(12) United States Patent
Mochida

(10) Patent No.: US 11,327,296 B2
(45) Date of Patent: May 10, 2022

(54) LIGHT DEFLECTOR, IMAGE PROJECTION APPARATUS, VEHICLE, AND ADJUSTING METHOD

(71) Applicant: Akitoshi Mochida, Osaka (JP)

(72) Inventor: Akitoshi Mochida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 245 days.

(21) Appl. No.: 16/872,724

(22) Filed: May 12, 2020

(65) Prior Publication Data

US 2020/0371345 A1 Nov. 26, 2020

(30) Foreign Application Priority Data

May 21, 2019 (JP) .............................. JP2019-095463

(51) Int. Cl.
G02B 26/08 (2006.01)
G02B 26/10 (2006.01)
G01S 7/481 (2006.01)

(52) U.S. Cl.
CPC ....... *G02B 26/0858* (2013.01); *G02B 26/101* (2013.01); *G01S 7/4817* (2013.01)

(58) Field of Classification Search
None
See application file for complete search history.

(56) References Cited

U.S. PATENT DOCUMENTS

| 8,841,821 | B2 * | 9/2014 | Aimono | G02B 26/0858 |
| | | | | 310/317 |
| 11,169,372 | B2 * | 11/2021 | Kimura | G02B 26/101 |
| 2014/0125873 | A1 | 5/2014 | Nakamura | |

FOREIGN PATENT DOCUMENTS

| JP | 2014-201057 | 10/2014 |
| JP | 2015-230326 | 12/2015 |
| JP | 2016-090665 | 5/2016 |
| JP | 2017-010005 | 1/2017 |
| JP | 2017-081089 | 5/2017 |
| JP | 2017138375 | 8/2017 |

OTHER PUBLICATIONS

Extended European Search Report for EP20173198.1 dated Nov. 3, 2020.
U.S. Appl. No. 16/658,247, filed Oct. 21, 2019, Akitoshi Mochida, et al.

* cited by examiner

*Primary Examiner* — Jennifer D. Carruth
(74) *Attorney, Agent, or Firm* — IPUSA, PLLC

(57) ABSTRACT

A light deflector includes a reflector having a reflection plane, a pair of movable parts that support the reflector, a supporting unit configured to support the pair of movable parts, a piezoelectric drive circuit provided for the pair of movable parts, the piezoelectric drive circuit being configured to drive the reflector in response to waveform of driving voltage, and circuitry configured to output two different driving voltages to the piezoelectric drive circuit. Each one of the two different driving voltages has waveform, and the waveform of each one of the two different driving voltages includes, in one cycle, a step-up period where voltage increases, a step-down period where voltage decreases, a first constant-voltage period where voltage is constant after the step-up period and before the step-down period, and a second constant-voltage period where voltage is constant before the step-up period and after the step-down period.

7 Claims, 35 Drawing Sheets

LIGHT DEFLECTOR, IMAGE PROJECTION APPARATUS, VEHICLE, AND ADJUSTING METHOD

CROSS-REFERENCE TO RELATED APPLICATION

This patent application is based on and claims priority pursuant to 35 U.S.C. § 119(a) to Japanese Patent Application No. 2019-095463, filed on May 21, 2019, in the Japan Patent Office, the entire disclosure of which is hereby incorporated by reference herein.

BACKGROUND

Technical Field

Embodiments of the present disclosure relate to a light deflector, an image projection apparatus, a vehicle, and an adjusting method.

Background Art

Light deflectors are known in the art in which a reflection unit such as a micro-electromechanical systems (MEMS) mirror is rotated by piezoelectric elements in the horizontal and vertical directions to deflect the light incident on the reflection unit.

Light deflectors are known in the art in which driving voltage has a pair of trapezoidal waves where their waveforms are approximately the same but their phases are shifted by 180 degrees and the driving voltage is applied to a piezoelectric element.

SUMMARY

Embodiments of the present disclosure described herein provide a light deflector, an image projection apparatus, and a method of adjusting the light deflector. The light deflector includes a reflector having a reflection plane, a pair of movable parts that support the reflector, a supporting unit configured to support the pair of movable parts, a piezoelectric drive circuit provided for the pair of movable parts, the piezoelectric drive circuit being configured to drive the reflector in response to waveform of driving voltage, and circuitry configured to output two different driving voltages to the piezoelectric drive circuit. Each one of the two different driving voltages has waveform, and the waveform of each one of the two different driving voltages includes, in one cycle, a step-up period where voltage increases, a step-down period where voltage decreases, a first constant-voltage period where voltage is constant after the step-up period and before the step-down period, and a second constant-voltage period where voltage is constant before the step-up period and after the step-down period. In at least one of the waveform of the two different driving voltages, a ratio of the first constant-voltage period in the one cycle is different from a ratio of the second constant-voltage period in the one cycle. The image projection apparatus includes the light deflector. The method includes, in at least one of the waveform of the two different driving voltages, making a ratio of the first constant-voltage period in the one cycle different from a ratio of the second constant-voltage period in the one cycle.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 20A is a diagram illustrating the waveform that is applied to a piezoelectric drive circuit group A, according to embodiments of the present disclosure.

FIG. 20B is a diagram illustrating the waveform that is applied to a piezoelectric drive circuit group B, according to embodiments of the present disclosure.

FIG. 20C is a graph illustrating the waveform of FIG. 25A and the waveform of FIG. 25B that are superimposed on top of one another.

FIG. 25A is a diagram illustrating the waveform of driving voltage, according to the first embodiment of the present disclosure.

FIG. 25B is a diagram illustrating the temporal changes of the deflection angle of a reflector caused by the driving voltage as illustrated in FIG. 25A.

FIG. 25C is a graph of the harmonic components extracted from FIG. 25B.

FIG. 25D is another diagram illustrating the waveform of driving voltage, according to the first embodiment of the present disclosure.

FIG. 25E is a diagram illustrating the temporal changes of the deflection angle of a reflector caused by the driving voltage as illustrated in FIG. 25D.

FIG. 25F is a graph of the harmonic components extracted from FIG. 25E.

FIG. 26A is a diagram illustrating waveform, according to the first embodiment of the present disclosure.

FIG. 26B is a diagram illustrating the temporal change of the deflection angle, according to the first embodiment of the present disclosure.

FIG. 26C is a graph of the harmonic components extracted from FIG. 26B.

FIG. 27A is a diagram illustrating waveform, according to the first embodiment of the present disclosure.

FIG. 27B is a diagram illustrating the temporal change of the deflection angle, according to the first embodiment of the present disclosure.

FIG. 27C is a graph of the harmonic components extracted from FIG. 27B.

FIG. 29A is a diagram illustrating waveform, according to the first embodiment of the present disclosure.

FIG. 29B is a graph of the harmonic components extracted from FIG. 25A.

Figure 1:
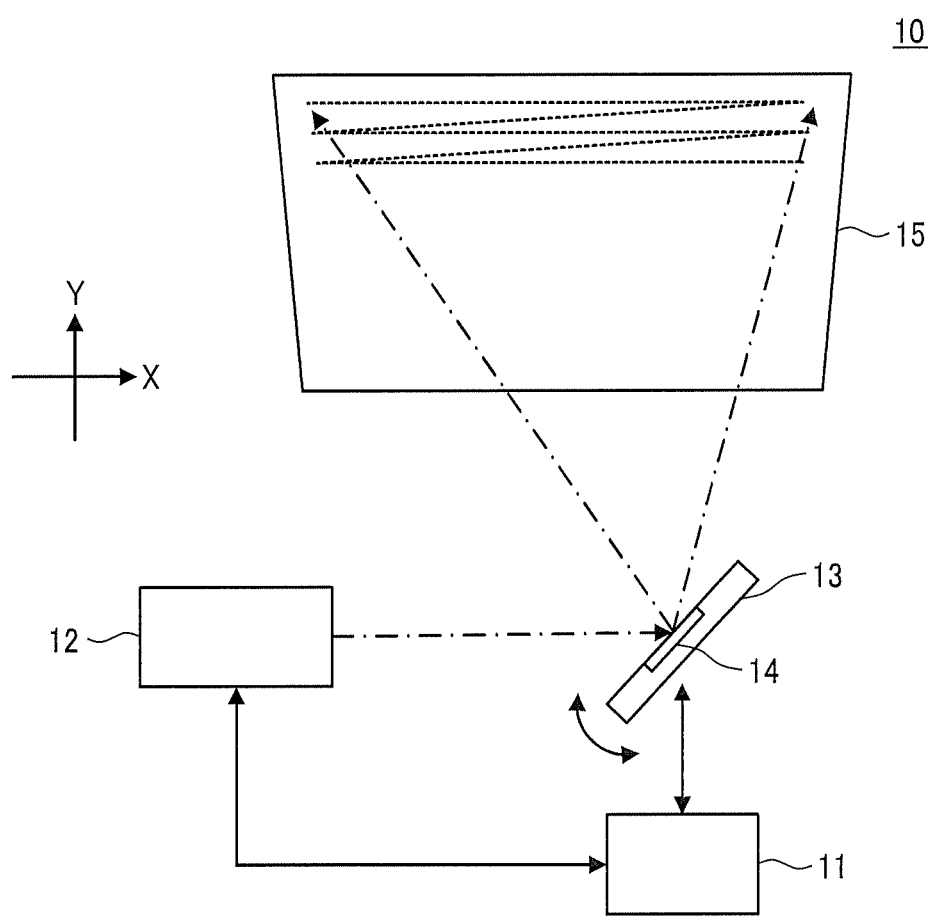
FIG. 1 is a schematic diagram illustrating a light deflector according to embodiments of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific integrated circuits (ASICs), field-programmable gate arrays (FPGAs), computers or the like. These terms may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of the present disclosure are described below with reference to the accompanying drawings. In the drawings, like reference signs denote like elements, and overlapping description may be omitted.

Firstly, a light deflector that adopts a movable device is described below in detail with reference to FIG. 1 to FIG. 4.

FIG. 1 is a schematic diagram illustrating a configuration of a light deflector 10 according to the present embodiment.

As illustrated in FIG. 1, the light deflector 10 deflects the light emitted from a light-source device 12 in accordance with the control of a controller 11, with a reflection plane 14 provided for a movable device 13, so as to optically scan a target surface 15.

The light deflector 10 includes the controller 11, the light-source device 12, and the movable device 13 provided with the reflection plane 14.

For example, the controller 11 is an electronic circuit unit provided with a central processing unit (CPU) and a field-programmable gate array (FPGA). For example, the movable device 13 is provided with the reflection plane 14, and the movable device 13 serves as a micro-electromechanical systems (MEMS) device that can move the reflection plane 14. For example, the light-source device 12 is a laser device that emits laser beams. Note also that the target surface 15 is, for example, a screen.

The controller 11 generates control instructions for the light-source device 12 and the movable device 13 based on the optical scanning information obtained from an external device, and outputs a driving signal to the light-source device 12 and the movable device 13 based on the generated control instructions.

The light-source device 12 emits light based on the received driving signal. The movable device 13 drives the reflection plane 14 at least in uniaxial directions or biaxial directions, based on the received driving signal.

Due to such a configuration, for example, the reflection plane 14 of the movable device 13 can biaxially be moved in a reciprocating manner within a predetermined range, and the light that is emitted from the light-source device 12 to enter the reflection plane 14 can be deflected around a prescribed axis to perform optical scanning, under control of the controller 11, which is based on the image data that is an example of the optical scanning information. Accordingly, an image can be projected onto the target surface 15 as desired. The movable device 13 and the control that is performed by the controller 11 according to the present embodiment are described later in detail.

A hardware configuration of the light deflector 10 is described below with reference to FIG. 2.

Figure 2:
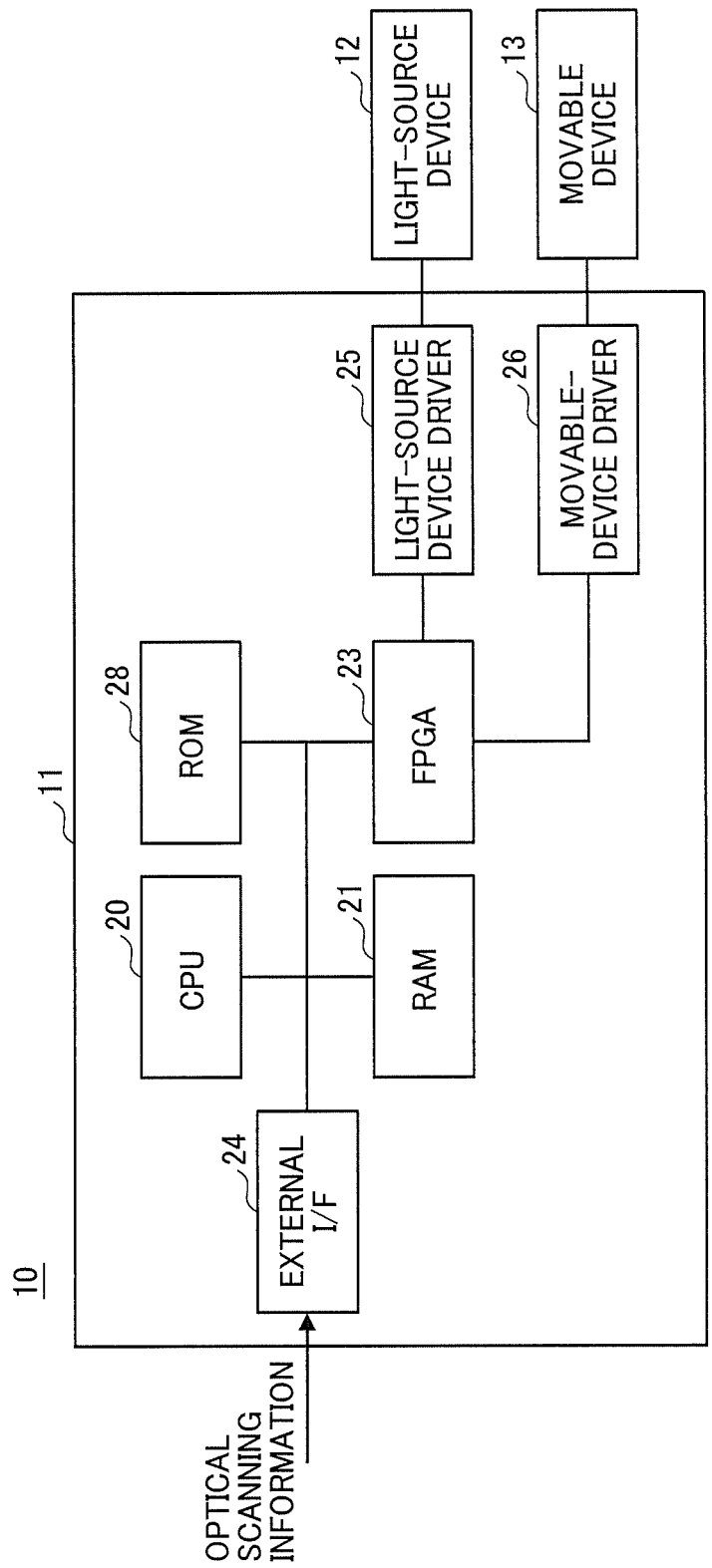
FIG. 2 is a schematic block diagram illustrating a hardware configuration of a light deflector, according to embodiments of the present disclosure.

FIG. 2 is a schematic block diagram illustrating a hardware configuration of the light deflector 10, according to the present embodiment.

As illustrated in FIG. 2, the light deflector 10 includes the controller 11, the light-source device 12, and the movable device 13, which are electrically connected to each other. Among those elements, the controller 11 is provided with A central processing unit (CPU) 20, a random access memory (RAM) 21, a read only memory (ROM) 28, a field-programmable gate array (FPGA) 23, an external interface (I/F) 24, a light-source device driver 25, and a movable-device driver 26.

The CPU 20 loads into the RAM 21 a program or data from a storage device such as the ROM 28 and performs processes. Accordingly, the controls or functions of the entirety of the controller 11 are implemented.

The RAM 21 is a volatile storage device that temporarily stores data or a computer program.

The ROM 28 is a read-only nonvolatile storage device that can store a computer program or data even when the power is switched off, and stores, for example, data or a processing program that is executed by the CPU 20 to control the multiple functions of the light deflector 10.

The FPGA 23 is a circuit that outputs a control signal to the light-source device driver 25 and the movable-device driver 26 appropriately, according to the processes performed by the CPU 20.

For example, the external interface 24 is an interface with an external device or the network. For example, the external device may be a host device such as a personal computer (PC) and a storage device such as a universal serial bus (USB) memory, a secure digital (SD) card, a compact disc (CD), a digital versatile disc (DVD), a hard disk drive (HDD), and a solid state drive (SSD). For example, the network may be a controller area network (CAN) of a vehicle, a local area network (LAN), and the Internet. The external interface 24 is satisfactory as long as it has a configuration by which connection to an external device or communication with an external device is achieved. The external interface 24 may be provided for each external device.

The light-source driver is an electric circuit that outputs a driving signal such as a driving voltage to the light source 12 in accordance with the received control signal.

The movable-device driver 26 is an electric circuit that outputs a driving signal such as a driving voltage to the movable device 13, in accordance with the received control signal.

In the controller 11, the CPU 20 acquires the optical scanning information from an external device or a network through the external interface 24. Note that any configuration may be used as long as the CPU 20 can acquire the optical scanning information, and the optical scanning information may be stored in the ROM 28 or in the FPGA 23 in the controller 11, or a storage device such as an SSD may be newly provided in the controller 11 and the optical scanning information may be stored in the storage device.

The optical scanning information in the present embodiment is information about the way of optical scanning to be performed on the target surface 15. For example, the optical scanning information is image data in a case where an image is to be displayed by optical scanning, and the optical scanning information is writing data indicating the order and portion of writing in a case where optical writing is to be performed by optical scanning. Furthermore, for example, the optical scanning information is irradiation data indicating the timing and range of irradiation of light for distance in a case where the distance to an object is to be measured by optical scanning.

The controller 11 according to the present embodiment can implement the functional configuration described below by using commands from the CPU 20 and the hardware configuration illustrated in FIG. 2.

A functional configuration of the controller 11 of the light deflector 10 is described below with reference to FIG. 3.

Figure 3:
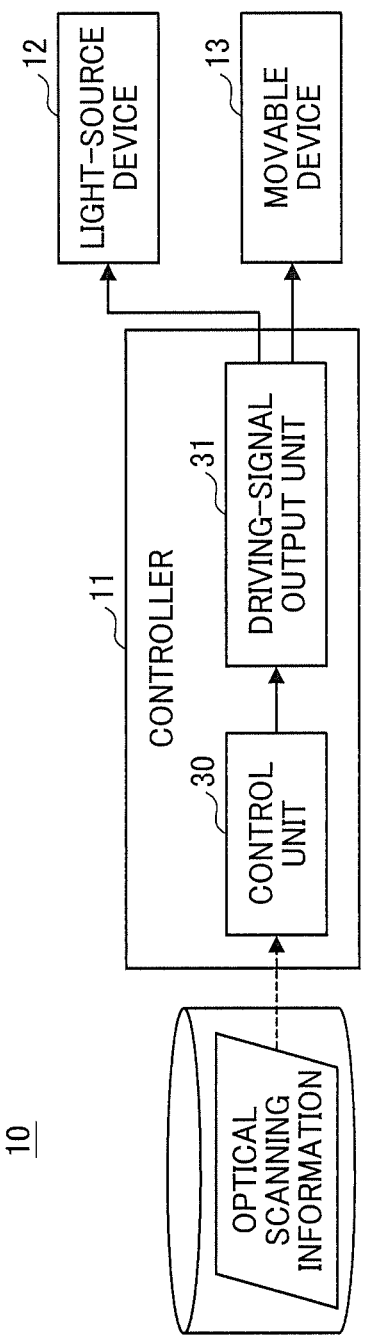
FIG. 3 is a diagram illustrating functional blocks of a controller, according to embodiments of the present disclosure.

FIG. 3 is a diagram illustrating functional blocks of the controller 11 of the light deflector 10, according to the present embodiment.

As illustrated in FIG. 3, the controller 11 has the functions of a control unit 30 and a driving-signal output unit 31.

For example, the controller 30 is implemented by the CPU 20 or the FPGA 23, and obtains optical scanning information from an external device and converts the obtained optical scanning information into a control signal and outputs the obtained control signal to the driving-signal output unit 31. For example, the controller 30 acquires image data from an external device or the like as the optical scanning information, generates a control signal from the image data through predetermined processing, and outputs the control signal to the drive-signal output unit 31.

For example, the driving-signal output unit 31 is implemented by the light-source driver 25 and the movable-device driver 26, and outputs a driving signal to the light-source device 12 or the movable device 13 based on the received control signal.

Note that the driving signal is a signal used to control operation of the light source 12 or the movable device 13. For example, the driving signal in the light source 12 is a driving voltage used to control the timing at which light is emitted and the irradiation intensity. Moreover, for example, the driving signal in the movable device 13 is a driving voltage used to control the timing and range of motion where the reflection plane 14 provided for the movable device 13 is moved.

Processes in which the light deflector 10 performs optical scanning on the target surface 15 are described below with reference to FIG. 4.

Figure 4:
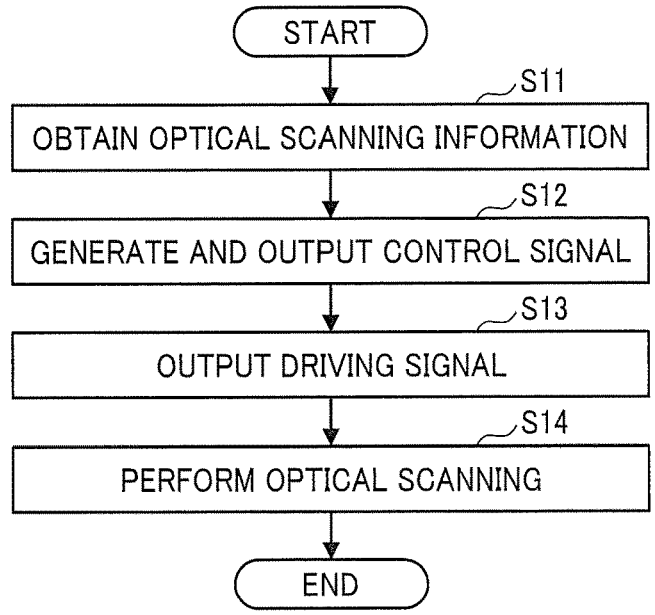
FIG. 4 is a flowchart of the processes performed by a light deflector, according to embodiments of the present disclosure.

FIG. 4 is a flowchart of the processes performed by the light deflector 10, according to the present embodiment.

In a step S11, the control unit 30 obtains optical scanning information from, for example, an external device.

In a step S12, the control unit 30 generates a control signal from the obtained optical scanning information, and outputs the generated control signal to the driving-signal output unit 31.

In a step S13, the driving-signal output unit 31 outputs a driving signal to each of the light-source device 12 and the movable device 13, based on the received control signal.

In a step S14, the light-source device 12 emits light based on the received driving signal. The movable device 13 moves the reflection plane 14 based on the received driving signal. The driving of the light source 12 and the movable device 13 causes light to be deflected in a given direction, and optical scanning is performed.

In the light deflector 10 as described above, a single controller 11 includes a device and functions used to control the light-source device 12 and the movable device 13. However, a controller for the light-source device and a controller for the movable-device may separately be provided.

In the light deflector 10 as described above, a single controller 11 includes functions of the control unit 30 used to control the light-source device 12 and the movable device 13, and functions of the driving-signal output unit 31. However, these functions may separately be provided, and for example, a separate drive-signal output device with the drive-signal output unit 31 may be provided in addition to the controller 11 including the controller 30. An optical deflection system that performs optical deflection may be configured by the controller 11 and the movable device 13 provided with the reflection plane 14, which are elements of the above light deflector 10.

An image projection apparatus that is provided with the movable device 13 according to the above embodiment is described below in detail with reference to FIG. 5 and FIG. 6.

Figure 5:
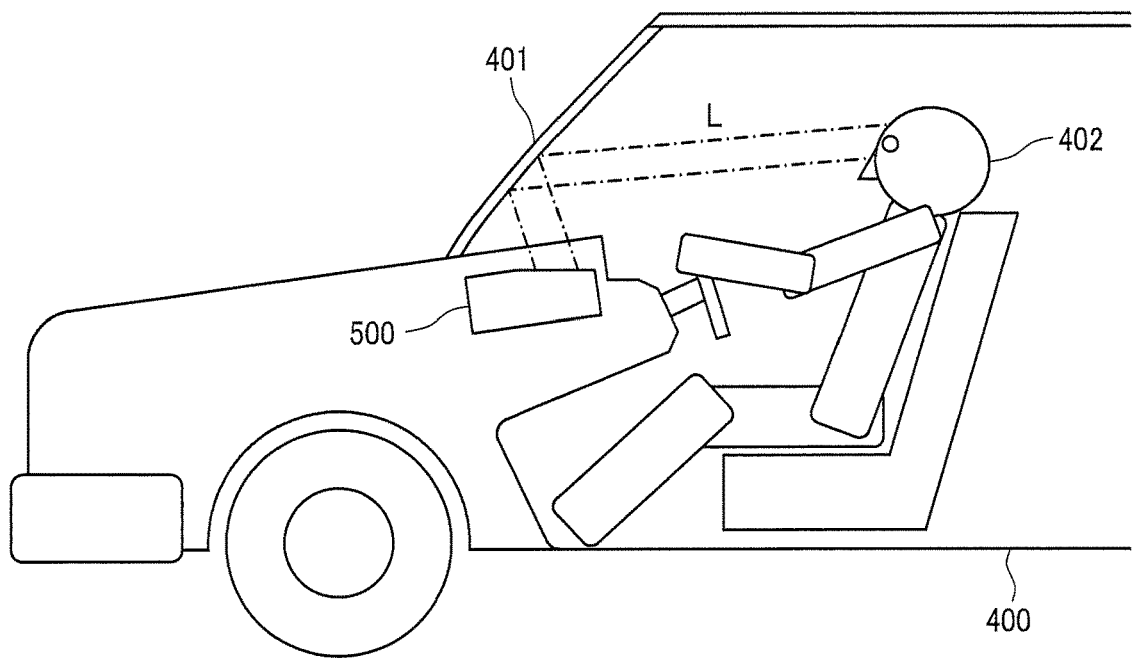
FIG. 5 is a schematic diagram illustrating a vehicle provided with a heads-up display according to embodiments of the present disclosure.

FIG. 5 is a diagram illustrating a vehicle 400 provided with a heads-up display 500 that serves as an image projection apparatus, according to the present embodiment.

Figure 6:
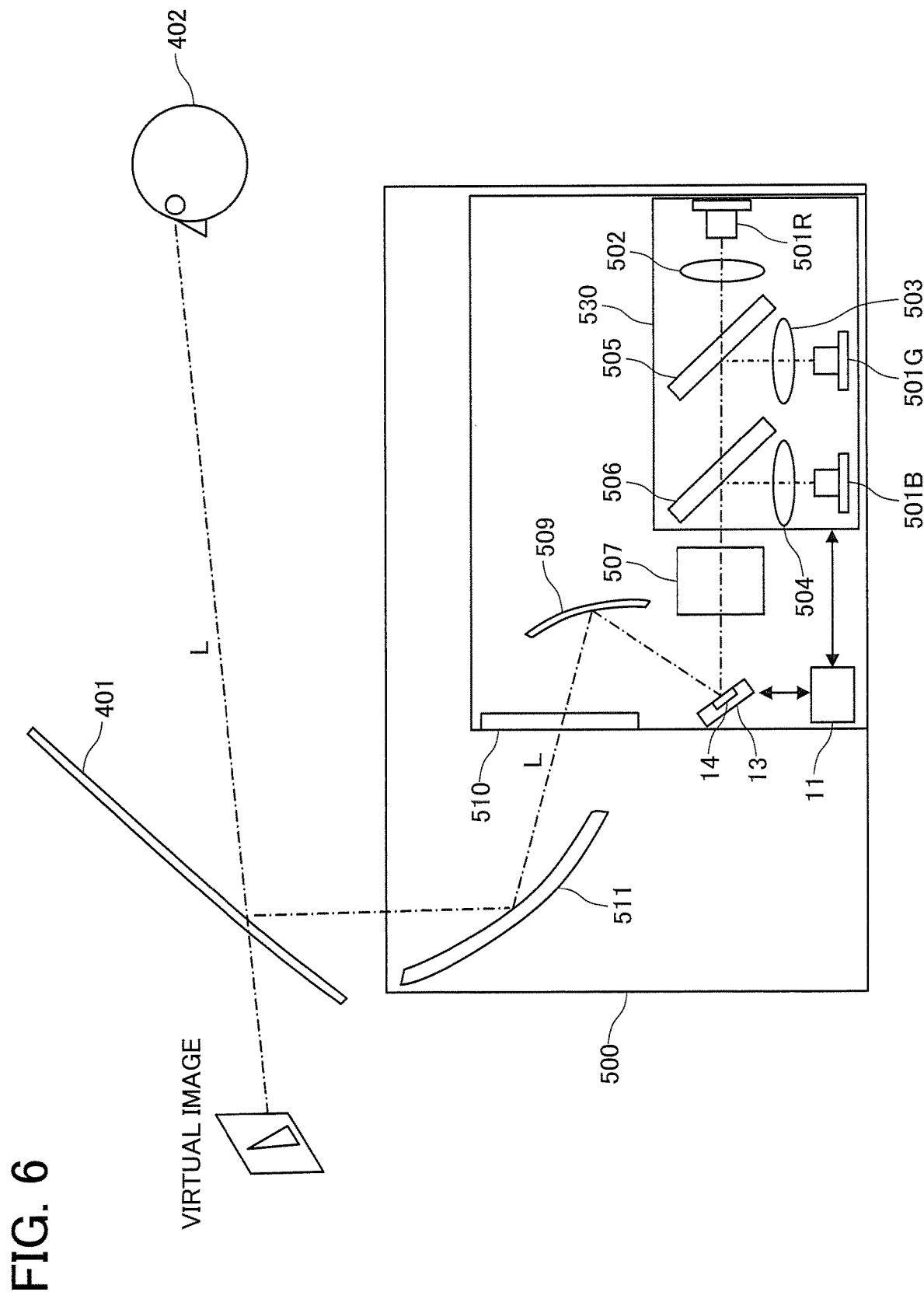
FIG. 6 is a schematic diagram illustrating a heads-up display according to embodiments of the present disclosure.

FIG. 6 is a schematic diagram illustrating the heads-up display 500 according to the present embodiment.

The image projection apparatus is an apparatus that performs optical scanning to project an image, and is, for example, the heads-up display 500.

As illustrated in FIG. 5, for example, the heads-up display 500 is provided near a front windshield such as a front windshield 401 of the vehicle 400. A projection light L, which is the light for projecting an image, that is emitted from the heads-up display 500 is reflected by the front windshield 401, and is headed for a user. In the present embodiment, the user is also referred to as observer or a driver 402. Accordingly, the driver 402 can visually recognize an image or the like projected by the heads-up display 500 as a virtual image. Note that a combiner may be disposed on the inner wall of the front windshield, and the user may visually recognize a virtual image formed by the projection light L that is reflected by the combiner.

As illustrated in FIG. 6, the heads-up display 500 emits laser beams from red, green, and blue laser beam sources 501R, 501G, and 501B, respectively. The emitted laser beam passes through an incident optical system and is then deflected by the movable device 13 having the reflection plane 14. The incident optical system includes collimator lenses 502, 503, and 504, which are provided for the respective laser beam sources, two dichroic mirrors 505 and 506, and a light-intensity adjuster 507. Then, the deflected laser beams pass through a projection optical system composed of a free-form surface mirror 509, an intermediate screen 510, and a projection mirror 511, and are projected onto a screen. In the heads-up display 500, the laser beam sources 501R, 501G, and 501B, the collimator lenses 502, 503, and 504, and the dichroic mirrors 505 and 506 are unitized as a light source unit 530 in an optical housing.

The heads-up display 500 as described above projects an intermediate image that is displayed on the intermediate screen 510, on the front windshield 401 of the vehicle 400, thereby allowing the driver 402 to visually recognize the intermediate image as a virtual image.

The laser beams of the respective colors emitted from the laser beam sources 501R, 501G, and 501B are approximately collimated by the collimator lenses 502, 503, and 504 and are combined by the two dichroic mirrors 505 and 506. The light intensity of the combined laser beams is adjusted by the light-intensity adjuster 507, and then two-dimensional scanning is performed by the movable device 13 provided with the reflection plane 14. The projection light L that has been two-dimensionally scanned by the movable device 13 is reflected by the free-form surface mirror 509 so as to correct the distortion, and then is concentrated onto the intermediate screen 510. Accordingly, an intermediate image is displayed. The intermediate screen 510 is constituted by a microlens array in which a plurality of microlenses are two-dimensionally arranged, and expands the projected light L incident on the intermediate screen 510 in units of microlens.

The movable device 13 moves the reflection plane 14 biaxially in a reciprocating manner to perform two-dimensional scanning by using the projected light L incident on the reflection plane 14. The driving of the movable device 13 is controlled in synchronization with the light-emitting timing of the laser beam sources 501R, 501G, and 501B.

In the above description, the heads-up display 500 is described as an example of the image projection apparatus. However, no limitation is indicated thereby, and the image projection apparatus may be any apparatus that performs optical scanning, using the movable device 13 provided with the reflection plane 14, to project an image. For example, the present disclosure is also applicable to a projector that is placed on a desk or the like to project an image on a display screen, a head-mounted display that is incorporated in a wearable member on the head of the observer, for example, and that projects an image on a reflective-and-transmissive screen of the wearable member or on an eye ball as a screen, and the like.

The image projection apparatus may be incorporated in, not only a vehicle or the wearable member, but also, for example, a mobile object such as an aircraft, a ship, or a moving robot, and an immobile object such as an operation robot that operates a driving target such as a manipulator without moving from the installed location.

An optical writing device that is provided with the movable device 13 according to the above embodiment is described below in detail with reference to FIG. 7 and FIG. 8.

Figure 7:
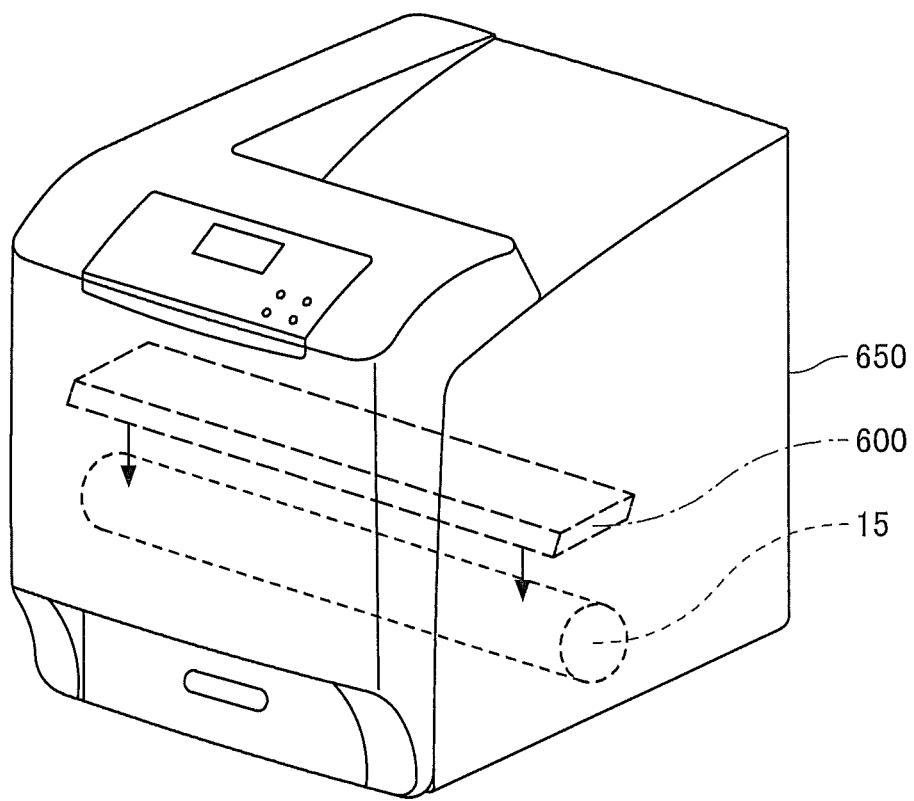
FIG. 7 is a schematic diagram illustrating an image forming apparatus provided with an optical writing device, according to embodiments of the present disclosure.

FIG. 7 is a diagram illustrating an image forming apparatus provided with an optical writing device 600, according to the present embodiment.

Figure 8:
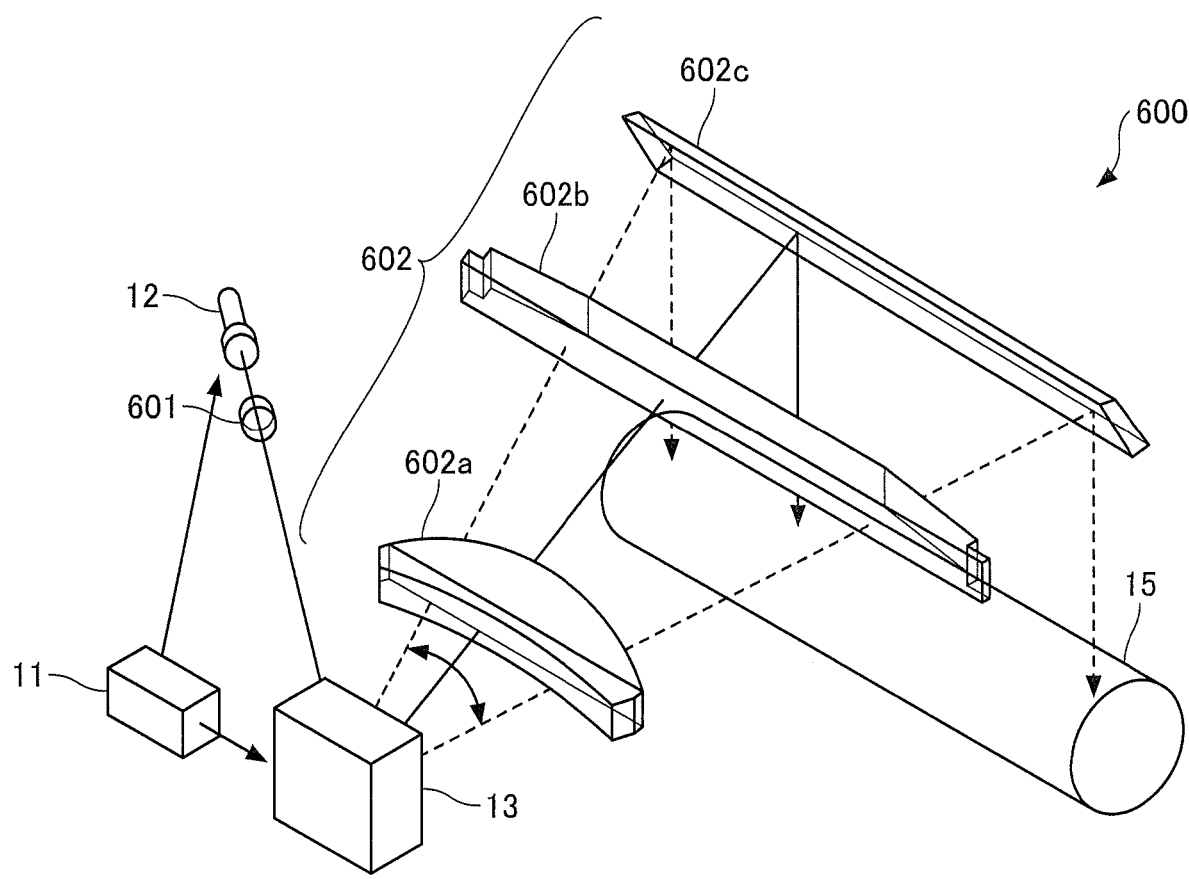
FIG. 8 is a schematic diagram illustrating a configuration of an optical writing device according to embodiments of the present disclosure.

FIG. 8 is a schematic diagram illustrating a configuration of the optical writing device 600 according to the present embodiment.

As illustrated in FIG. 7, the optical writing device 600 is used as a component of an image forming apparatus typified by a laser-beam printer 650 or the like. The laser-beam printer 650 serves as a printer that uses laser beams, and the optical writing device 600 in the image forming apparatus performs optical scanning on a photoconductor drum, which is the target surface 15, by using one or more laser beams, thereby performing optical writing on the photoconductor drum.

As illustrated in FIG. 8, in the optical writing device 600, the laser beam from the light source 12 such as a laser element passes through an imaging optical system 601 such as a collimator lens and is then deflected uniaxially or biaxially by the movable device 13 having the reflection plane 14. The laser beam deflected by the movable device 13 passes through a scanning optical system 602 constituted by a first lens 602a, a second lens 602b, and a reflecting mirror unit 602c, and is emitted onto the target surface 15 (e.g., a photoconductor drum or photosensitive paper), and thereby optical writing is performed. The scanning optical system 602 forms a laser beam in the form of a spot on the target surface 15. The movable device 13 that includes the light-source device 12 and the reflection plane 14 are driven based on the control performed by the controller 11.

As described above, the optical writing device 600 can be used as a component of the image forming apparatus that serves as a printer using laser beams. By modifying the scanning optical system so as to enable not only uniaxial optical scanning but also biaxial optical scanning, the optical writing device 600 can also be used as a component of an image forming apparatus such as a laser labeling device that deflects laser beam to perform optical scanning on thermal media and print letters by heating.

The movable device 13 having the reflection plane 14 to be applied to the optical writing device is advantageous in saving power of the optical writing device because power consumption for driving the movable device 13 is less than that for driving a polygon mirror or the like. The movable device 13 makes a smaller wind noise when the mirror substrate oscillates compared with a polygon mirror, and thus is advantageous in achieving low noise of an optical writing device. The optical writing device requires much smaller footprint than that of a polygon mirror, and the amount of heat generated by the movable device 13 is small. Accordingly, downsizing is easily achieved, and thus the optical writing device is advantageous in downsizing the image forming apparatus.

A distance measuring equipment that is provided with the movable device 13 according to the above embodiment is described below in detail with reference to FIG. 9 and FIG. 10.

Figure 9:
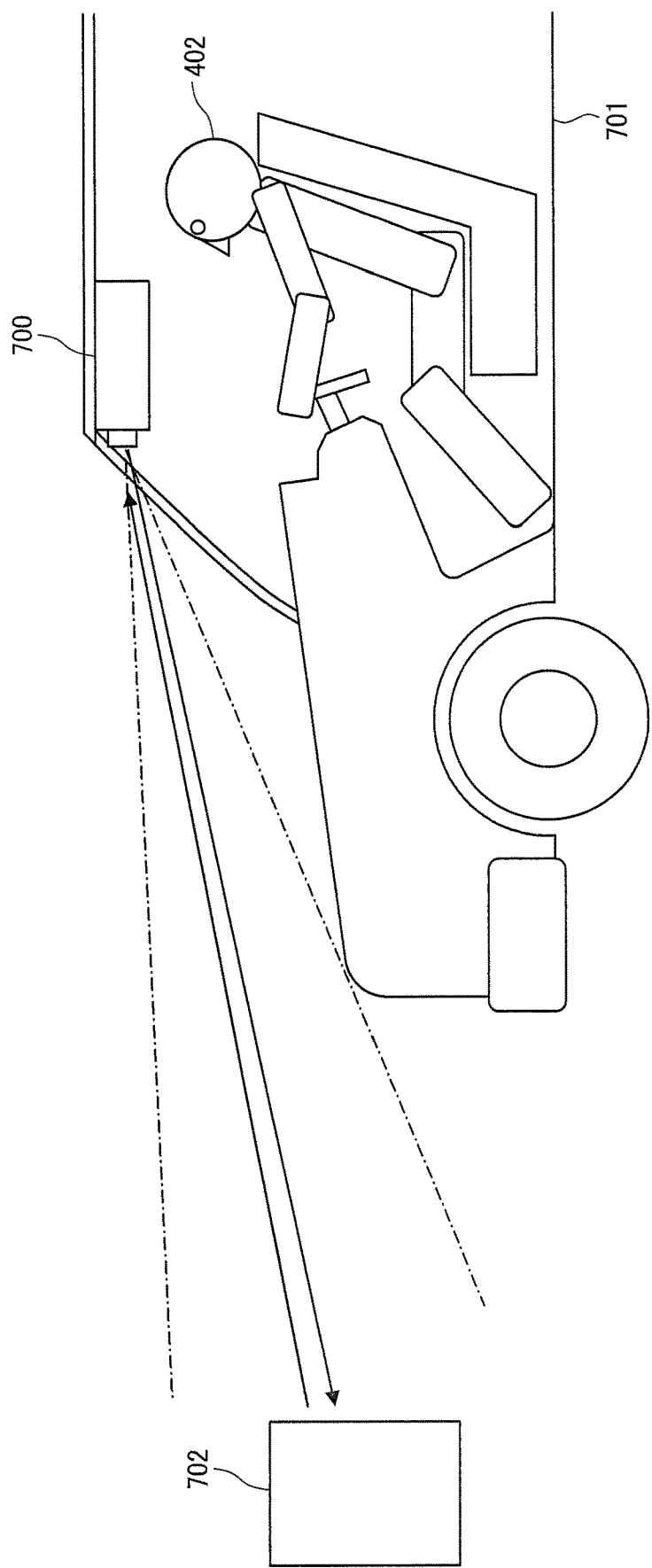
FIG. 9 is a schematic diagram illustrating a vehicle provided with a light detection and ranging (LiDAR) device, according to embodiments of the present disclosure.

FIG. 9 is a schematic diagram illustrating a vehicle provided with a light detection and ranging (LiDAR) device that serves as a distance measuring equipment, according to the present embodiment.

Figure 10:
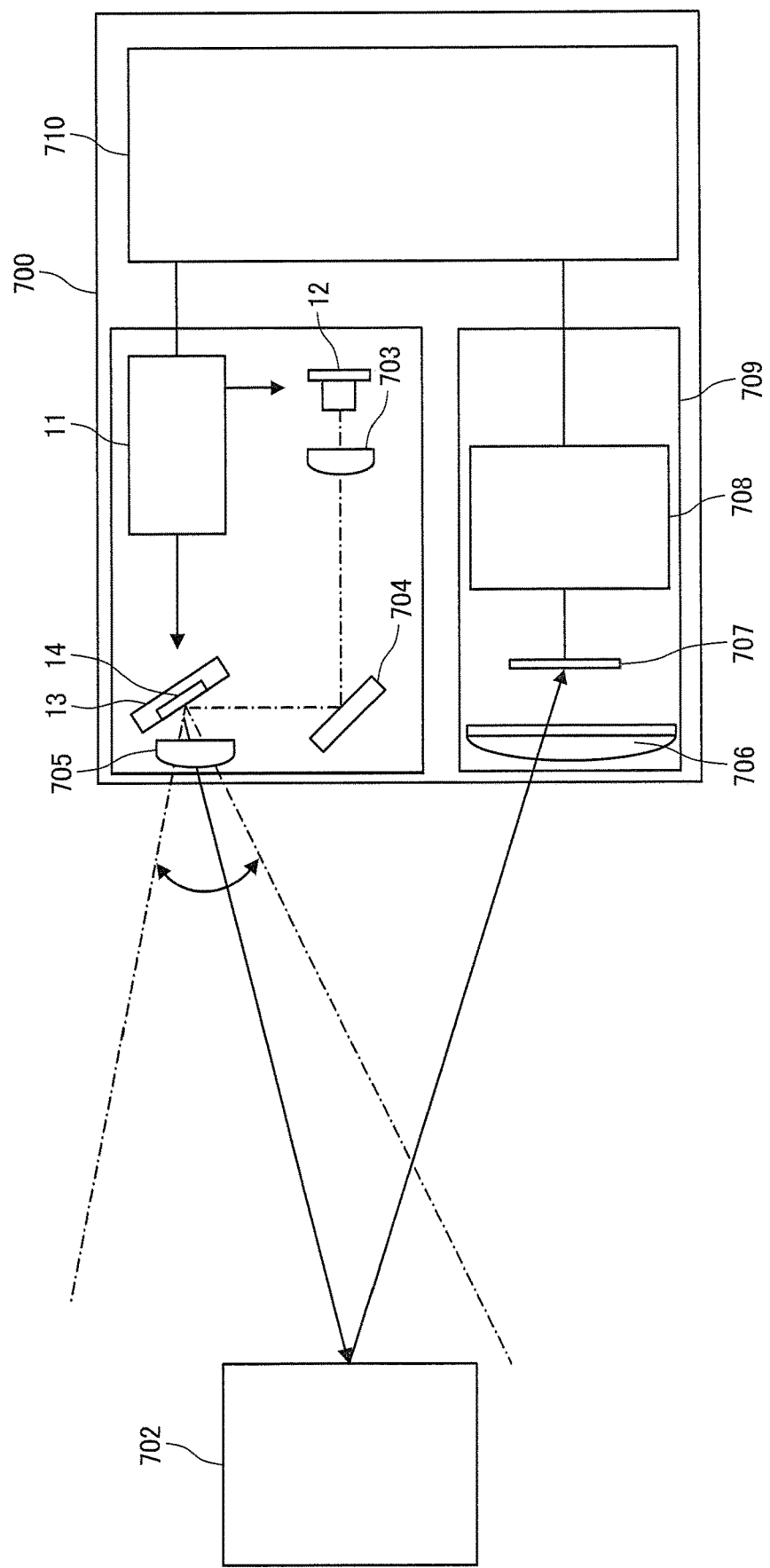
FIG. 10 is a schematic diagram illustrating a configuration of a LiDAR device according to embodiments of the present disclosure.

FIG. 10 is a schematic diagram illustrating a configuration of the LiDAR device according to the present embodiment.

The distance measuring equipment is an apparatus that measures the distance in a target direction, and is, for example, a LiDAR device.

As illustrated in FIG. 9, for example, a LiDAR device 700 is provided for a vehicle 701 to perform optical scanning in a target direction and receive the light reflected from an object 702 that exists in the target direction. Accordingly, the LiDAR device 700 can measure the distance to the object 702.

As illustrated in FIG. 10, the laser beam that is emitted from the light source 12 passes through an incident optical system constituted by a collimator lens 703, which is an optical system approximately collimating diverging light, and a plane mirror 704, and then is uniaxially or biaxially scanned by the movable device 13 provided with the reflection plane 14. Then, the laser beam is emitted to the object 702 ahead of the LiDAR device 700, as passing through, for example, a projection lens 705 that serves as a projection optical system. The operation of the light-source device 12 and the movable device 13 is controlled by the controller 11. The light that is reflected by the object 702 is detected by a photodetector 709. In other words, the reflected light passes through, for example, a condenser lens 706 that serves as a incident-light detective and light-receptive optical system, and is received by an image sensor 707. Then, the image sensor 707 outputs a detected signal to a signal processing circuit 708. The signal processing circuit 708 performs predetermined processing on the input detected signal, such as binarization or noise processing, and outputs the result to a distance measuring circuit 710.

The distance measuring circuit 710 determines whether the object 702 is present based on the time difference between the timing at which the light source 12 emits laser beam and the timing at which the photodetector 709 receives the laser beam or the phase difference among pixels of the image sensor 707 that receives light, and calculates the distance to the object 702.

The movable device 13 that is provided with the reflection plane 14 cannot easily be broken and is compact compared with a polygon mirror, and thus, a highly durable and compact LiDAR device can be provided. Such a LiDAR device is attached to, for example, a vehicle, an aircraft, a ship, a robot, or the like, and can perform optical scanning within a predetermined range to determine whether an obstacle is present or to measure the distance to the obstacle. Note that the position to which the LiDAR device 700 is attached is not limited to the front and upper side of the vehicle 701, but may be attached to a side or on the rear of the vehicle 701.

In the present embodiment, the LiDAR device 700 is described as an example of the distance measuring equipment. However, no limitation is intended thereby. The distance measuring equipment may be any apparatus that performs optical scanning by controlling the movable device 13 provided with the reflection plane 14, using the controller 11, and that receives the receives the reflected laser beam using a photodetector to measure the distance to the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

A laser headlamp 50 in which the movable device 13 according to the above embodiment is used as a headlight of a vehicle is described below in detail with reference to FIG. 11.

Figure 11:
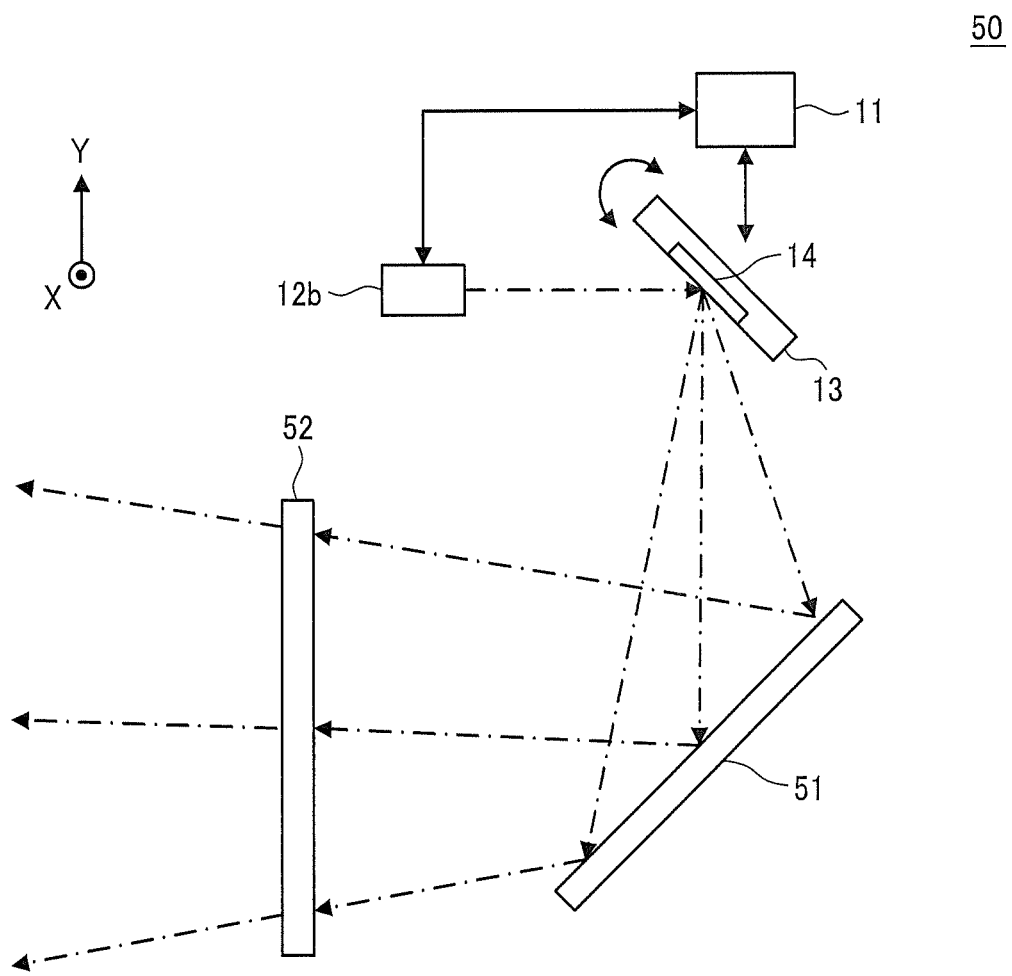
FIG. 11 is a diagram illustrating a configuration of a laser headlamp device according to embodiments of the present disclosure.

FIG. 11 is a diagram illustrating a configuration of the laser headlamp 50 according to the present embodiment.

The laser headlamp 50 includes the controller 11, the light-source device 12, the movable device 13 provided with the reflection plane 14, a mirror 51, and a transparent plate 52.

The light-source device 12b is a light source that emits blue laser beams. The laser beams that are emitted from the light-source device 12b are incident on the movable device 13, and are reflected by the reflection plane 14. The movable device 13 drives the reflection plane 14 in the XY-directions based on a signal sent from the controller 11, and two-dimensionally scans the blue laser beams that are emitted from the light-source device 12 in the XY-directions.

The scanning light of the movable device 13 is reflected by the mirror 51, and is incident on the transparent plate 52. The transparent plate 52 is coated with a fluorescent material whose surface or back side is in yellow. The blue laser beams that are reflected by the mirror 51 are converted into white laser beams, where the range of white color is legally prescribed as the color of a headlight, as passing through the coating of the yellow fluorescent material of the transparent plate 52. Due to this configuration, the sight ahead of the vehicle is illuminated with the white illumination light that has passed through the transparent plate 52.

The scanning light of the movable device 13 scatters at a predetermined degree as passing through the fluorescent material of the transparent plate 52. Due to this configuration, glare is attenuated at an illuminated target in the area ahead of the car.

When the movable device 13 is applied to the headlights of the vehicle, the colors of the light-source device 12b and the fluorescent material are not limited to blue and yellow, respectively. For example, the light-source device 12b may emit near-ultraviolet light, and the transparent plate 52 may be coated with homogenized mixture of a plurality of kinds of fluorescent materials of red-green-blue (RGB) trichromatic colors. Also in such a configuration as above, the light that passes through the transparent plate 52 can be converted into white light, and the sight ahead of the vehicle can be irradiated with white light.

A head-mounted display 60 to which the movable device 13 according to the above embodiment is applied is described below in detail with reference to FIG. 12 and FIG. 13. In the present embodiment, the head-mounted display 60 is a display that is mountable onto a human head. For example, the head-mounted display 60 may be shaped like glasses. In the following description, such a head-mounted display may be referred to simply as an HMD.

Figure 12:
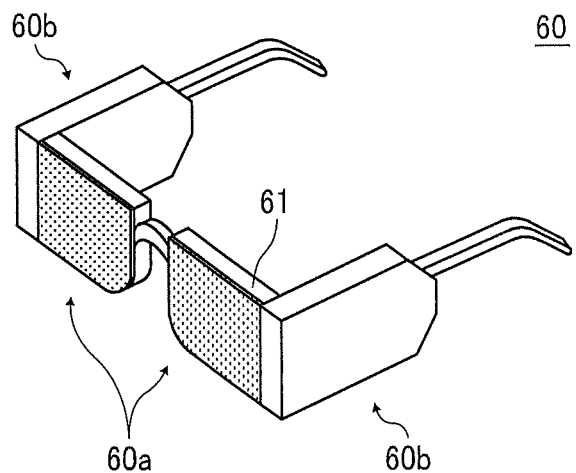
FIG. 12 is a schematic perspective view illustrating a configuration of a head-mounted display according to embodiments of the present disclosure.

FIG. 12 is a perspective view of an example external appearance of the HMD 60, according to the present embodiment.

In FIG. 12, the HMD 60 includes a pair of right and left front parts 60a and temples 60b that are approximately symmetrically arranged. For example, each of the pair of front parts 60a may be configured by a light guide plate 61, and an optical system or controller may be incorporated into at least one of the temples 60b.

Figure 13:
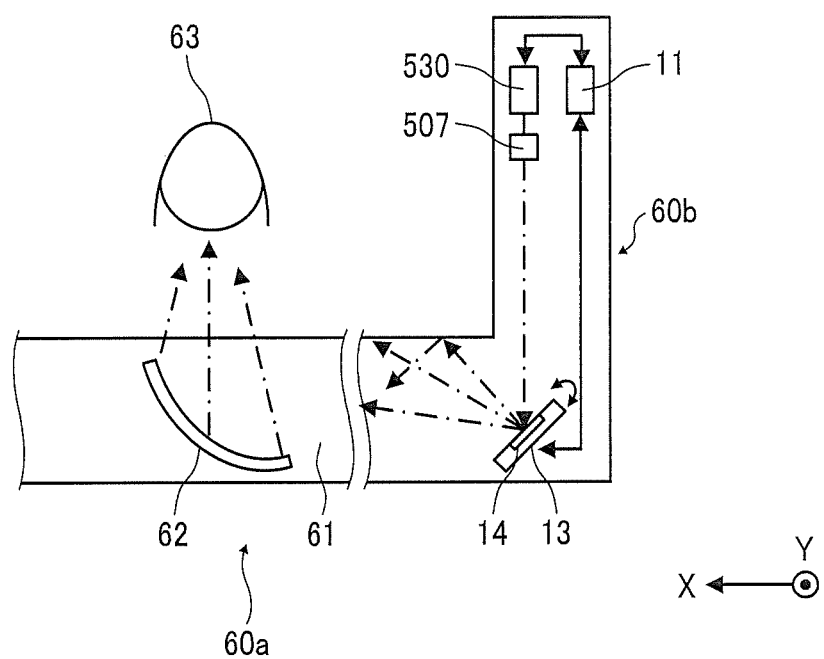
FIG. 13 is a diagram illustrating a configuration of a part of a head-mounted display according to embodiments of the present disclosure.

FIG. 13 is a partial view of an example configuration of the HMD 60, according to the present embodiment.

In FIG. 13, a configuration or structure for the left eye is illustrated, but the HMD 60 may have a similar configuration or structure on the other side for the right eye.

The HMD 60 includes the controller 11, a light source unit 530, a light-intensity adjuster 507, the movable device 13 provided with the reflection plane 14, the light guide plate 61, and a half mirror 62.

As described as above, the light source unit 530 according to the present embodiment includes the laser beam sources 501R, 501G, and 501B, the collimator lenses 502, 503, and 504, and the dichroic mirrors 505 and 506, and these elements are unitized by an optical housing. In the light source unit 530, the laser beams of three colors that are emitted from the laser beam sources 501R, 501G, and 501B are combined by the dichroic mirrors 505 and 506. The combined parallel light is emitted from the light source unit 530.

The light is emitted from the light source unit 530, and the light-intensity adjuster 507 adjusting the intensity of light. Then, the adjusted light is incident on the movable device 13. The movable device 13 drives the reflection plane 14 in the XY-directions based on a signal sent from the controller 11, and two-dimensionally scans the light emitted from the light source unit 530. The driving of the movable device 13 is controlled in synchronization with the light-emitting timing of the laser beam sources 501R, 501G, and 501B, and a color image is formed by the scanning light.

The scanning light of the movable device 13 is incident on the light guide plate 61. The light guide plate 61 reflects the scanning light on the inner wall, and guides the scanning light to the half mirror 62. The light guide plate 61 is formed by, for example, resin that has transparency to the wavelength of the scanning light.

The half mirror 62 reflects the light that is guided through the light guide plate 61 to the rear side of the HMD 60, and the reflected light exits towards an eye of an wearer 63 of the HMD 60. For example, the half mirror 62 may have a free-form curved surface. The scanning light is reflected by the half mirror 62, and the image is formed on the retina of wearer 63. Alternatively, the image is formed on the retina of wearer 63 due to the reflection by the half mirror 62 and the lens effect of the crystalline lens of the eye. The spatial distortion on the image is corrected due to the reflection by the half mirror 62. The wearer 63 can observe an image formed by the light that is scanned in the XY-directions.

As the half mirror 62 is a half mirror, the wearer 63 observes both an image formed by extraneous light and an image formed by scanning light in an overlapping manner. The half mirror 62 may be replaced with a mirror to exclude the extraneous light. In such a configuration, only the image that is formed by scanning light can be observed.

The movable device 13 that is packaged, according to the present embodiment, is described below with reference to FIG. 14.

Figure 14:
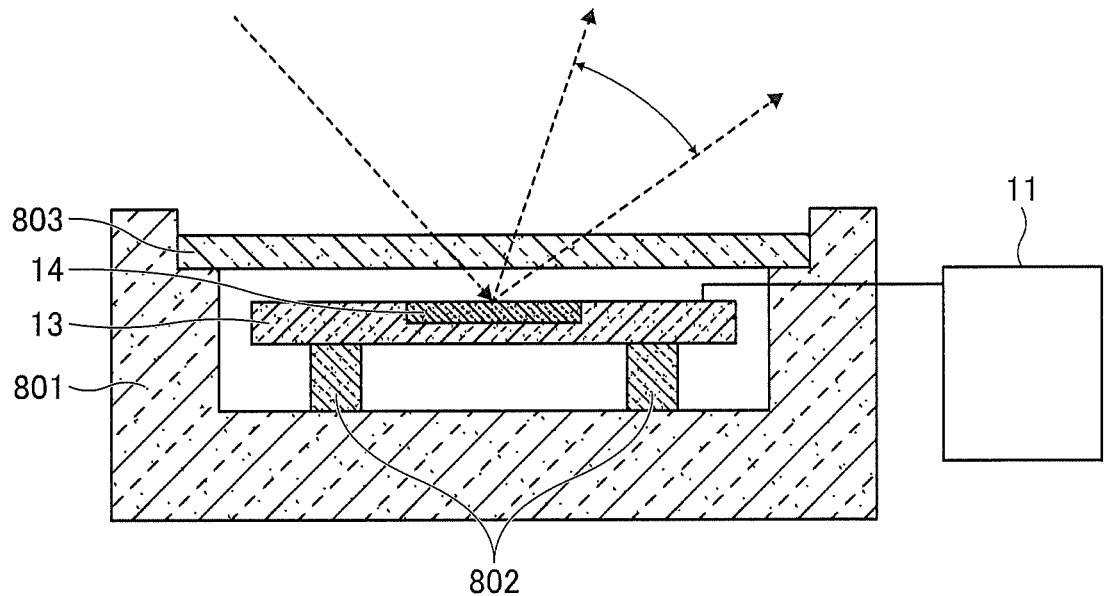
FIG. 14 is a schematic diagram illustrating a packaged movable device, according to embodiments of the present disclosure.

FIG. 14 is a schematic diagram illustrating the movable device 13 that is packaged, according to the present embodiment.

As illustrated in FIG. 14, the movable device 13 is attached to an attaching component 802 arranged inside the package 801, and is hermetically sealed and packaged as a part of the package 801 is covered with a light transmission member 803. Further, inert gas such as nitrogen is hermetically sealed inside the package. Due to this configuration, deterioration due to oxidization can be prevented in the movable device 13, and durability against changes in the environment such as temperature can further be improved.

Figure 15:
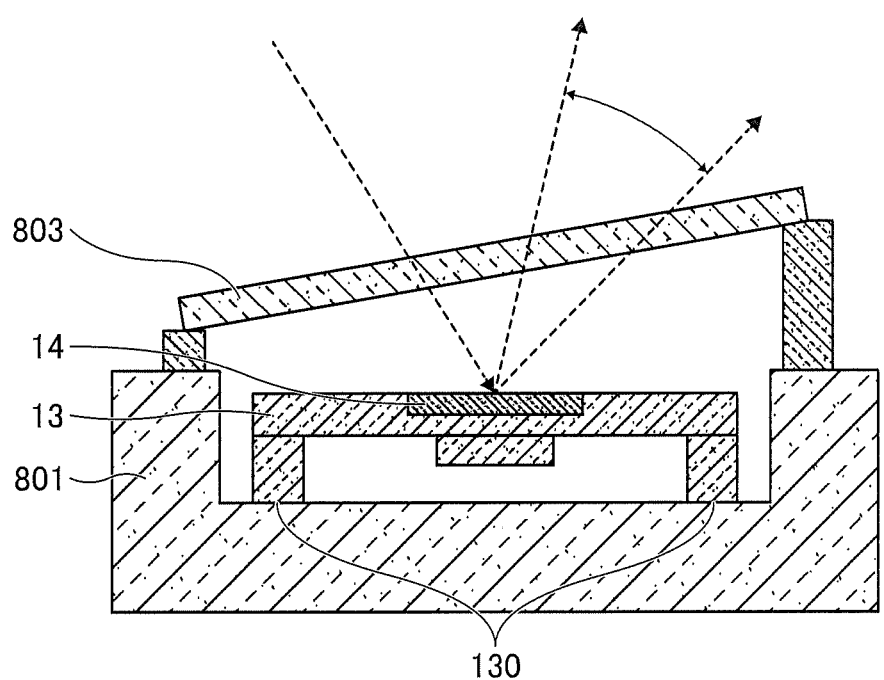
FIG. 15 is another schematic diagram illustrating a packaged movable device, according to embodiments of the present disclosure.

FIG. 15 is another diagram illustrating the movable device 13 that is packaged, where the light transmission member 803 is inclined relative to the movable device 13.

In the present embodiment, the light transmission member 803 is inclined with reference to the package 801 when the light transmission member 803 is attached to the package 801. Due to such a configuration, the planar light transmission member 803 is inclined with reference to the movable device 13 that is arranged inside the package 801. The angle of inclination is set such that the light that is reflected in a reciprocating manner does not go out of the package 801 between the light transmission member 803 and the reflection plane 14 included in the movable device 13. Due to such a configuration as above, image noise or the like due to the light that is reflected in a reciprocating manner can be prevented.

The movable device 13 according to the present embodiment, which is used for the light deflector, the image projection apparatus, the optical writing device, the distance measuring equipment, the laser headlamp, and the head-mounted display as described above, is described below in detail with reference to the accompanying drawings. In the drawings, like reference signs denote like elements, and overlapping description may be omitted.

First Embodiment

Firstly, a configuration or structure of the movable device 13 according to the present embodiment is described below with reference to FIG. 16 to FIG. 18.

Figure 16:
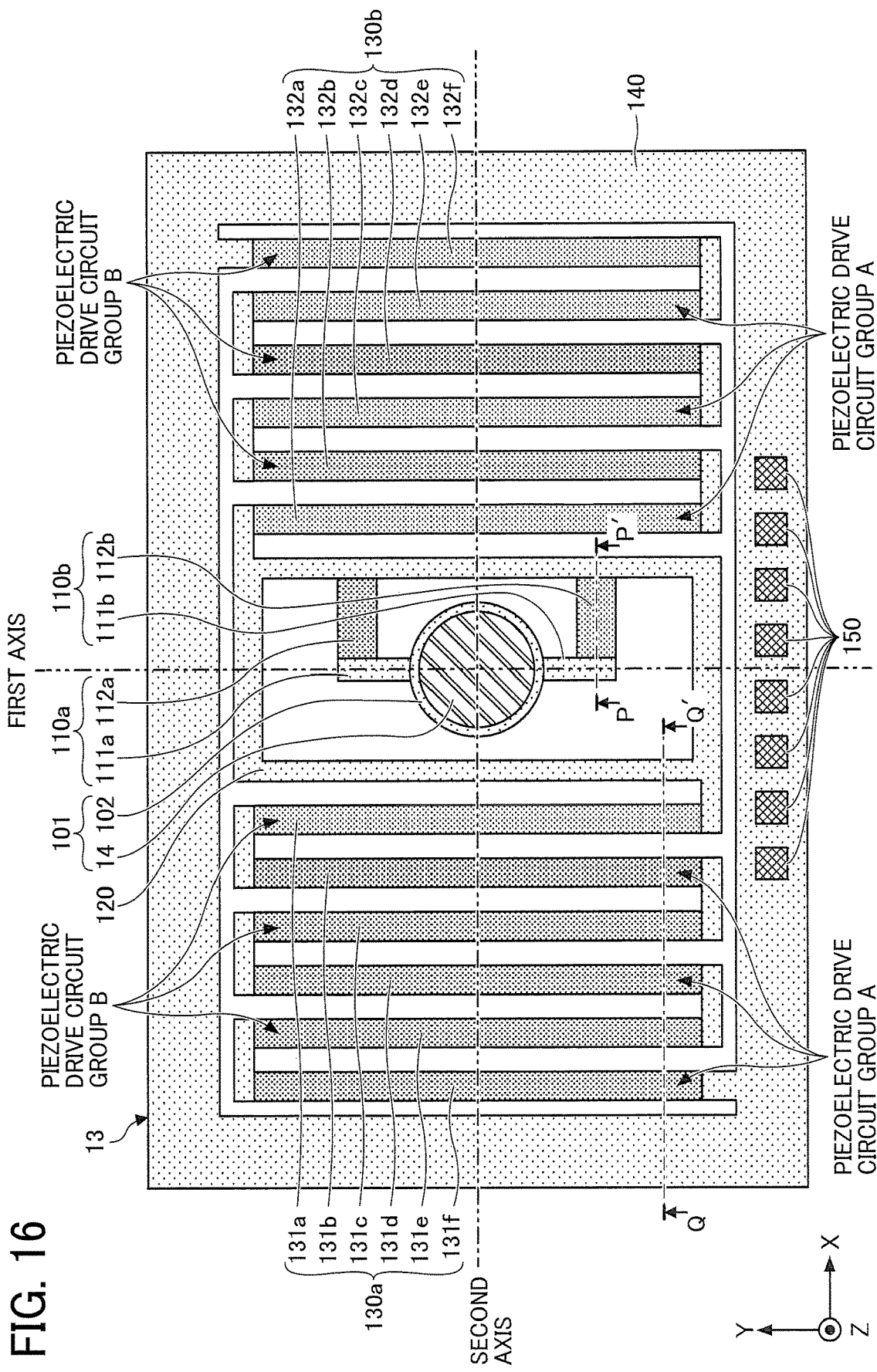
FIG. 16 is a plan view of a movable device of a cantilever-supported type, by which light can be deflected biaxially, according to embodiments of the present disclosure.

FIG. 16 is a plan view of the movable device 13 of a cantilever-supported type, by which light can be deflected biaxially, according to the present embodiment.

Figure 17:
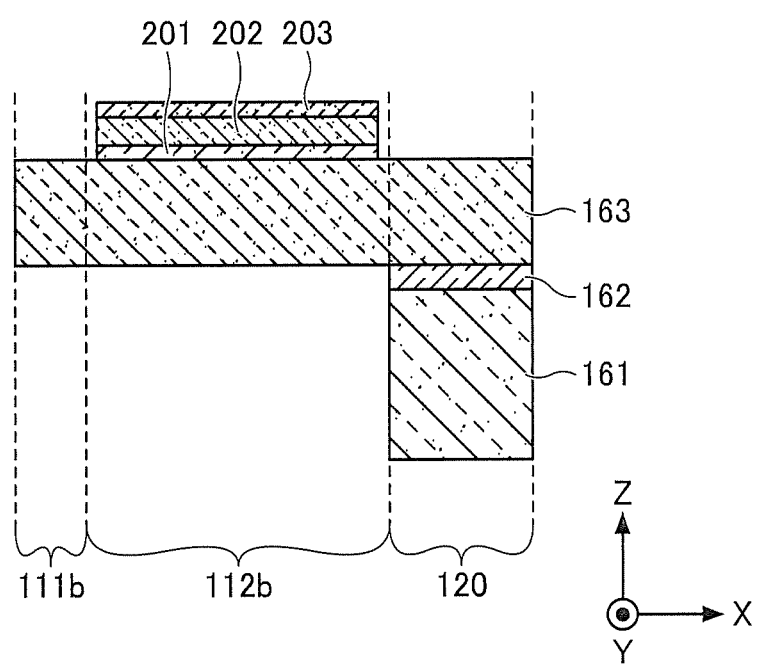
FIG. 17 is a diagram illustrating a P-P' sectional view as indicated in FIG. 16.

FIG. 17 is a diagram illustrating a P-P' sectional view as indicated in FIG. 16. FIG. 18 is a diagram illustrating a Q-Q' sectional view as indicated in FIG. 16.

In the present disclosure, a movable device of cantilever-supported type is described. However, no limitation is indicated thereby, and a movable device of both-side-supported type may be used.

As illustrated in FIG. 16, the movable device 13 includes a reflector 101 that reflects incident light, first driving units 110a and 110b that are coupled to the reflector 101 and drive the reflector 101 around a first axis parallel to the Y-axis, and a first supporting unit 120 that supports the reflector 101 and the first driving units 110a and 110b. Moreover, the movable device 13 includes second driving units 130a and 130b that are coupled to the first supporting unit 120 and drive the reflector 101 and the first supporting unit 120 around a second axis parallel to the X-axis, a second supporting unit 140 that supports the second driving units 130a and 130b, and a plurality of electrode connecting parts 150 to which the first driving units 110a and 110b, the second driving units 130a and 130b, and the controller 11 are electrically connected. In the present disclosure, each one of the second driving units 130a and 130b is an example of a movable part, and the second supporting unit 140 is an example of a supporting unit.

In the movable device 13, for example, components are integrally formed as follows. On a single silicon-on-insulator (SOI) substrate, the reflection plane 14, first piezoelectric drive circuits 112a and 112b, second piezoelectric drive circuits 131a to 131f and 132a to 132f, the electrode connecting parts 150, and the like are formed, and then the substrate is processed by etching or the like. The above-described multiple elements may be formed after the SOI substrate is molded, or may be formed while the SOI substrate is being molded. In the present disclosure, each one of the second piezoelectric drive circuits 131a to 131f and 132a to 132f is an example of a piezoelectric drive circuit.

As illustrated in FIG. 17, the SOI substrate is a substrate in which, on a first silicon layer formed of single crystal silicon (Si), an oxidized silicon layer 162 is formed, and on the oxidized silicon layer 162, a second silicon layer formed of single crystal silicon is further formed. In the following description, the first silicon layer and the second silicon layer may be referred to as a silicon supporting layer 161 and a silicon active layer 163, respectively.

The silicon active layer 163 has a small thickness in the Z-axis direction compared with the X-axis direction or the Y-axis direction. Due to this configuration, a member that is made of the silicon active layer 163 serve as an elastic member.

Note also that the SOI substrate does not always have to be planar, and may have, for example, curvature. As long as the substrate can be integrally processed by etching or the like and can be partially elastic, the member used for forming the movable device 13 is not limited to the SOI substrate.

The reflector 101 includes, for example, a circular reflector base 102 and the reflection plane 14 that is formed on the +Z surface of the reflector base 102. The reflector base 102 includes, for example, the silicon active layer 163. The reflection plane 14 includes a thin metal film made of, for example, aluminum (Al), gold (Au), and silver (Ag). The reflector 101 may include a rib for strengthening the reflector on the −Z-side surface of the reflector base 102. The rib includes, for example, the silicon supporting layer 161 and the oxidized silicon layer 162, and can prevent distortion on the reflection plane 14 caused by the movement.

As illustrated in FIG. 16, the first driving units 110a and 110b include two torsion bars 111a and 111b and first piezoelectric drive circuits 112a and 112b. An end of each of the torsion bars 111a and 111b is coupled to the reflector base 102, and the torsion bars 111a and 111b extend in a first axis direction to support the reflector 101 in a movable manner. An end of each of the first piezoelectric drive circuits 112a and 112b is coupled to a corresponding one of the torsion bars 111a and 111b, and the other end thereof is connected to an internal circumferential portion of the first supporting unit 120.

As illustrated in FIG. 17, the torsion bars 111a and 111b include the silicon active layer 163. Moreover, the first piezoelectric drive circuits 112a and 112b include the silicon active layer 163, the lower electrode 201, a piezoelectric circuit 202, and an upper electrode 203. The lower electrode 201, the piezoelectric circuit 202, and the upper electrode 203 are formed in this order on the +Z surface of the silicon active layer 163 serving as an elastic member. For example, each of the upper electrode 203 and the lower electrode 201 is made of gold (Au) or platinum (Pt). For example, the piezoelectric circuit 202 is made of lead zirconate titanate (PZT), which is a piezoelectric material.

Return to FIG. 16. The first supporting unit 120 is, for example, a rectangular support body including the silicon supporting layer 161, the oxidized silicon layer 162, the silicon active layer 163, and is formed to surround the reflector 101.

The second driving units 130a and 130b include, for example, the multiple second piezoelectric drive circuits 131a to 131f and 132a to 132f that are joined so as to turn. An end of each of the second driving units 130a and 130b is coupled to an perimeter zone of the first supporting unit 120, and the other end thereof is coupled to an internal circumferential portion of the second supporting unit 140. In the present embodiment, a connection part of the second driving unit 130a and the first supporting unit 120 and a connection part of the second driving unit 130b and the first supporting unit 120 are in point symmetry with respect to the center of the reflection plane 14. Furthermore, a connection part of the second driving unit 130a and the second supporting unit 140 and a connection part of the second driving unit 130b and the second supporting unit 140 are in point symmetry with respect to the center of the reflection plane 14.

Figure 18:
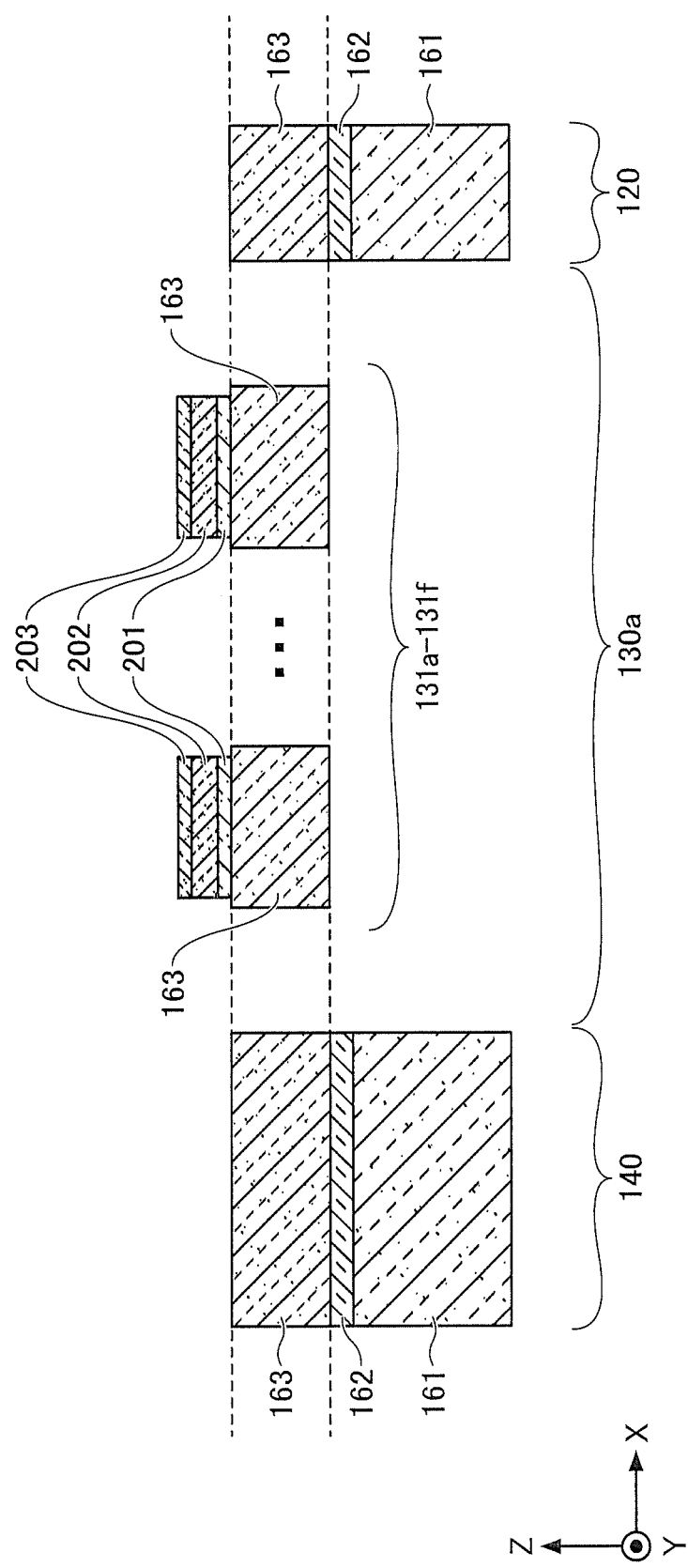
FIG. 18 is a diagram illustrating a Q-Q' sectional view as indicated in FIG. 16.

As illustrated in FIG. 18, the second driving units 130a and 130b include the silicon active layer 163, the lower electrode 201, a piezoelectric circuit 202, and an upper electrode 203. The lower electrode 201, the piezoelectric circuit 202, and the upper electrode 203 are formed in this order on the +Z surface of the silicon active layer 163 serving as an elastic member. For example, each of the upper electrode 203 and the lower electrode 201 is made of gold (Au) or platinum (Pt). For example, the piezoelectric circuit 202 is made of lead zirconate titanate (PZT), which is a piezoelectric material.

Return to FIG. 16. The second supporting unit 140 is, for example, a rectangular base including the silicon supporting layer 161, the oxidized silicon layer 162, and the silicon active layer 163, and is formed to surround the reflector 101, the first driving units 110a and 110b, the first supporting unit 120, and the second driving units 130a and 130b.

The electrode connecting part 150 is, for example, formed on the +Z surface of the second supporting unit 140 and are electrically connected to the upper electrode 203 and the lower electrode 201 of each of the first piezoelectric drive circuits 112a and 112b and the second piezoelectric drive circuits 131a to 131f, and the controller 11 via electrode wiring of aluminum (Al) or the like. Each of the upper electrodes 203 and the lower electrodes 201 may be directly coupled to the electrode connecting parts 150. Alternatively, in some embodiments, the upper electrodes 203 and the lower electrodes 201 may be indirectly coupled to the electrode connecting parts 150 through a wire or the like that connects a pair of electrodes.

Although this embodiment has illustrated an example in which the piezoelectric circuit 202 is formed on a surface (+Z surface) of the silicon active layer 163 serving as the elastic member, the piezoelectric circuit 202 may be formed on another surface (e.g., −Z surface) of the elastic member, or on both the surface and the other surface of the elastic member.

The shapes of the components are not limited to the shapes in the embodiment as long as the reflector 101 can be driven around the first axis or the second axis. For example, the torsion bars 111a and 111b and the first piezoelectric drive circuits 112a and 112b may have a shape with curvature.

Furthermore, an insulating layer formed of a silicon oxide film may be formed on at least one of the +Z surface of the upper electrode 203 of the first driving units 110a and 110b, the +Z surface of the first supporting unit 120, the +Z surface of the upper electrode 203 of the second driving units 130a and 130b, and the +Z surface of the second supporting unit 140. In this case, electrode wiring is provided on the insulating layer, and the insulating layer is partially removed as an opening or is not formed at a connection spot where the upper electrode 203 or the lower electrode 201 and the electrode wiring are coupled to each other, so that the first driving units 110a and 110b, the second driving units 130a and 130b, and the electrode wiring can be designed with a higher degree of freedom, and furthermore, a short circuit as a result of contact between electrodes can be controlled. The silicon oxide film may serve as antireflection coating.

The operation of the controller 11 that drives the first driving units 110a and 110b and the second driving units 130a and 130b of the movable device 13 is described below in detail.

When a positive or negative voltage is applied in a polarizing direction, the piezoelectric circuit 202 included in the first driving units 110a and 110b and the second driving units 130a and 130b is deformed (for example, expansion and contraction) proportionate to the potential of the applied voltage and exerts a so-called inverse piezoelectric effect. With the above inverse piezoelectric effect, the first driving units 110a and 110b and the second driving units 130a and 130b move the reflector 101.

In the present embodiment, the angle that the XY plane forms with the reflection plane 14 when the reflection plane 14 of the reflector 101 is inclined with reference to the XY plane in the +Z-direction or the −Z-direction is referred to as a deflection angle. Note also that the +Z-direction is referred to as a positive deflection angle and the −Z-direction is referred to as a negative deflection angle.

In the first driving units 110a and 110b, when a driving voltage is applied in parallel with the piezoelectric circuit 202 of the first piezoelectric drive circuits 112a and 112b through the upper electrode 203 and the lower electrode 201, the piezoelectric circuit 202 is deformed. The deformation of the piezoelectric circuit 202 causes the first piezoelectric drive circuits 112a and 112b to be bent. As a result, through the torsion of the two torsion bars 111a and 111b, a driving force acts on the reflector 101 around the first axis, and the reflector 101 is moved around the first axis. The driving voltage to be applied to the first driving units 110a and 110b is controlled by the controller 11.

Concurrently, the controller 11 applies a driving voltage with a predetermined sine waveform to the first piezoelectric drive circuits 112a and 112b of the first driving units 110a and 110b, and thereby, the reflector 101 can be moved around the first axis in the period of the driving voltage with a predetermined sine waveform.

In particular, for example, if the frequency of the sinusoidal-waveform voltage is set to about 20 kHz, which is substantially equal to a resonant frequency of the torsion bars 111a and 111b, by using mechanical resonance as a result of the torsion of the torsion bars 111a and 111b, the reflector 101 can be resonated at about 20 kHz.

FIG. 19A, FIG. 19B, FIG. 19C, and FIG. 19D are schematic diagrams each illustrating the driving of the second driving unit and 130b of the movable device 13, according to the present embodiment.

The reflector 101 or the like is indicate by dotted lines. In each one of FIG. 19A, FIG. 19B, FIG. 19C, and FIG. 19D, an obliquely downward direction to the right indicates the +X-direction, and an obliquely upward direction to the right indicates the +Y-direction. Moreover, the upward direction indicates the +Z-direction, which is orthogonal to the +X-direction and the +Y-direction.

Figure 19B:
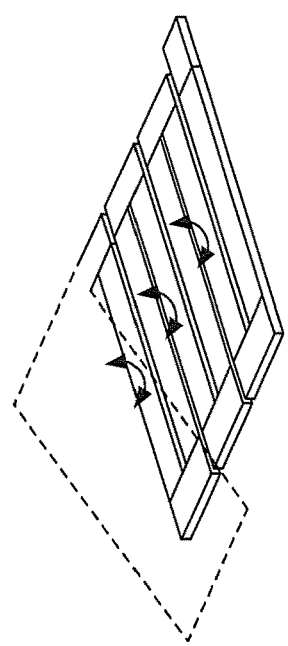
FIG. 19A, FIG. 19B, FIG. 19C, and FIG. 19D are schematic diagrams each illustrating the driving of a second driving unit and of a movable device, according to embodiments of the present disclosure.
Figure 19D:
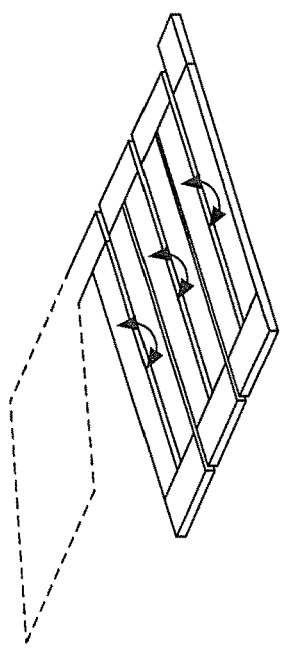
Figure 19A:
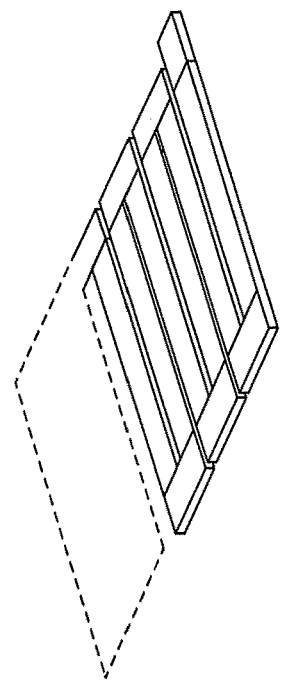

As illustrated in FIG. 19A, when no driving voltage is applied to the second driving unit 130b, no deflection angle is caused by the second driving unit.

Among the plurality of second piezoelectric drive circuits 131a to 131f of the second driving unit 130a, even-numbered second piezoelectric drive circuits counted from the second piezoelectric drive circuit 131a, which is the closest to the reflector 101, are called piezoelectric drive circuit group A. In other words, the second piezoelectric drive circuits 131b, 131d, and 131f are called piezoelectric drive circuit group A. In a similar manner to the above, among the plurality of second piezoelectric drive circuits 132a to 132f of the second driving unit 130b, odd-numbered second piezoelectric drive circuits counted from the second piezoelectric drive circuit 132a, which is the closest to the reflector 101, are called piezoelectric drive circuit group A. In other words, the second piezoelectric drive circuits 132a, 132c, and 132e are called piezoelectric drive circuit group A. When the driving voltage is applied in parallel with the piezoelectric drive circuit group A, the piezoelectric drive circuit group A is elastically deformed in one direction as illustrated in FIG. 19B, and the reflector 101 is moved around the second axis in the −Z-direction.

Furthermore, among the plurality of second piezoelectric drive circuits 131a to 131f of the second driving unit 130a, odd-numbered second piezoelectric drive circuits counted from the second piezoelectric drive circuit 131a, which is the closest to the reflector 101, are called piezoelectric drive circuit group B. In other words, the second piezoelectric drive circuits 131a, 131c, and 131e are called piezoelectric drive circuit group B. In a similar manner to the above, among the plurality of second piezoelectric drive circuits 132a to 132f of the second driving unit 130b, even-numbered second piezoelectric drive circuits counted from the second piezoelectric drive circuit 132a, which is the closest to the reflector 101, are called piezoelectric drive circuit group B. In other words, the second piezoelectric drive circuits 132b, 132d, and 132f are called piezoelectric drive circuit group B. When the driving voltage is applied in parallel with the piezoelectric drive circuit group B, the piezoelectric drive circuit group B is elastically deformed in one direction as illustrated in FIG. 19D, and the reflector 101 is moved around the second axis in the +Z-direction.

As illustrated in FIG. 19B and FIG. 19D, in the second driving units 130a and 130b, the multiple piezoelectric circuits 202 of the piezoelectric drive circuit group A or the multiple piezoelectric circuits 202 of the piezoelectric drive circuit group B are elastically deformed, and thereby the amounts of movement as a result of bending can be accumulated so as to obtain a large deflection angle of the reflector 101 around the second axis. For example, as illustrated in FIG. 16, the second driving units 130a and 130b are coupled to each other in point symmetry with reference to the center of the first supporting unit 120. Due to this configuration, when driving voltage is applied to the piezoelectric drive circuit group A, driving force in the +Z-direction is caused to a connecting part between the first supporting unit 120 and the second driving unit 130a. On the other hand, driving force in the −Z-direction is caused to a connecting part between the first supporting unit 120 and the second driving unit 130b, and the amounts of movement are accumulated and the deflection angle of the reflector 101 around the second axis can be increased.

Figure 19C:
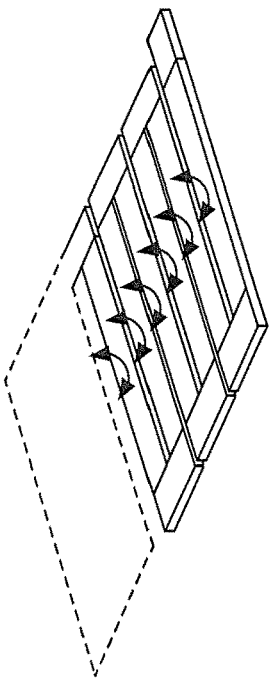

As illustrated in FIG. 19C, when the amount by which the reflector 101 is moved by the piezoelectric drive circuit group A by using voltage application is equal to the amount by which the reflector 101 is moved by the piezoelectric drive circuit group B by using voltage application, the deflection angle becomes zero.

The driving voltage is applied to the second piezoelectric drive circuit in a manner that the states illustrated in FIG. 19B, FIG. 19C, and FIG. 19D are repeated in a continuous manner. By so doing, the reflector 101 can be driven around the second axis.

The driving voltage that is to be applied to the second driving units 130a and 130b is controlled by the controller 11.

The driving voltage to be applied to the piezoelectric drive circuit group A (such driving voltage may be referred to as "driving voltage A" in the following description) and the driving voltage to be applied to the piezoelectric drive circuit group B (such driving voltage may be referred to as "driving voltage B" in the following description) are described below with reference to FIG. 20A, FIG. 20B, and FIG. 20C.

Figure 20A:
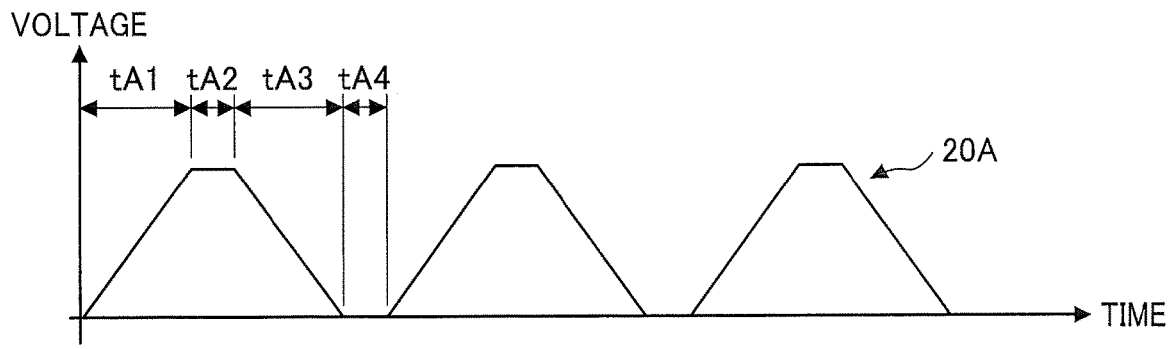
FIG. 20A, FIG. 20B, and FIG. 20C are diagrams each illustrating the waveform of the driving voltage that is applied to a movable device, according to the first embodiment.
Figure 20B:
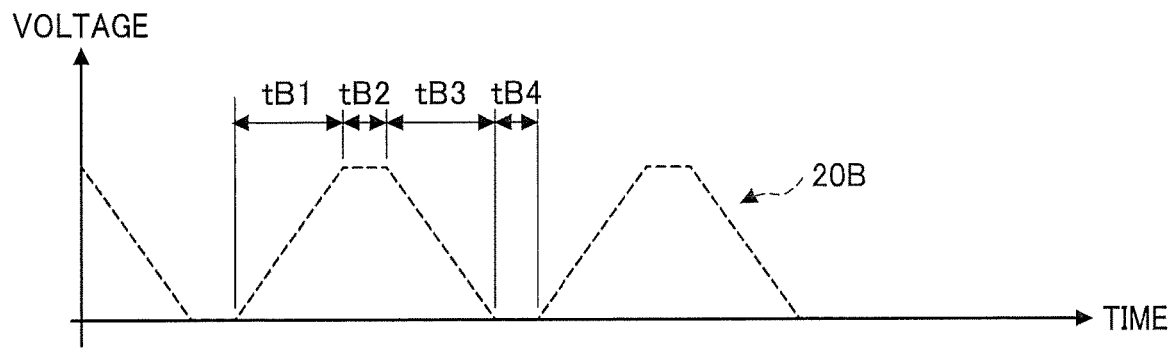
Figure 20C:
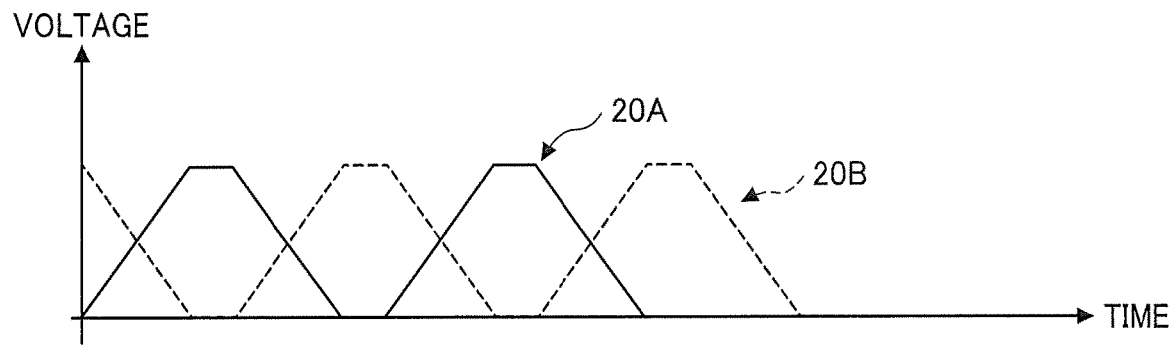

FIG. 20A, FIG. 20B, and FIG. 20C are diagrams each illustrating the waveform of the driving voltage that is applied to the piezoelectric drive circuit groups A and B of the movable device 13, according to the first embodiment of the present disclosure.

FIG. 20A is a diagram illustrating waveform 20A of the driving voltage A to be applied to the piezoelectric drive circuit group A, according to the first embodiment of the present disclosure.

FIG. 20B is a diagram illustrating waveform 20B of the driving voltage B to be applied to the piezoelectric drive circuit group B, according to the first embodiment of the present disclosure.

FIG. 20C is a graph illustrating the waveform 20A of the driving voltage A and the waveform 20B of the driving voltage B that are superimposed on top of one another, according to the present embodiment. In the present disclosure, the driving voltage A and the driving voltage B are an example of "two different driving voltages."

As illustrated in FIG. 20A, the driving voltage A to be applied to the piezoelectric drive circuit group A includes waveform 20A in a trapezoidal waveform, and its frequency is, for example, 60 hertz (Hz). The waveform 20A includes a step-up period tA1 in which the voltage value increases from a minimum value to a next maximum value, a first constant-voltage period tA2 in which the voltage value remains constant at the maximum value, a step-down period tA3 in which the voltage value decreases from the maximum value to the next minimum value, and a second constant-voltage period tA4 in which the voltage value remains constant at the minimum value.

As illustrated in FIG. 20B, the driving voltage B to be applied to the piezoelectric drive circuit group B includes waveform 20B in a trapezoidal waveform, and its frequency is, for example, 60 hertz (Hz). In a similar manner to the waveform 20A, the waveform 20B includes a step-up period tB1 in which the voltage value increases from a minimum value to a next maximum value, a first constant-voltage period tB2 in which the voltage value remains constant at the maximum value, a step-down period tB3 in which the voltage value decreases from the maximum value to the next minimum value, and a second constant-voltage period tB4 in which the voltage value remains constant at the minimum value.

In FIG. 20C, the cycle of the waveform 20A and the cycle of the waveform 20B are set so as to be equivalent to each other. Note also that the waveform of the driving voltage A and the waveform of the driving voltage B as described above are shaped by a pair of superimposing sinusoidal waves on top of one another.

The deflection angle of the reflector 101 when a driving voltage is applied to the above-described movable device 13 is described below with reference to FIG. 21 to FIG. 24.

Figure 21:
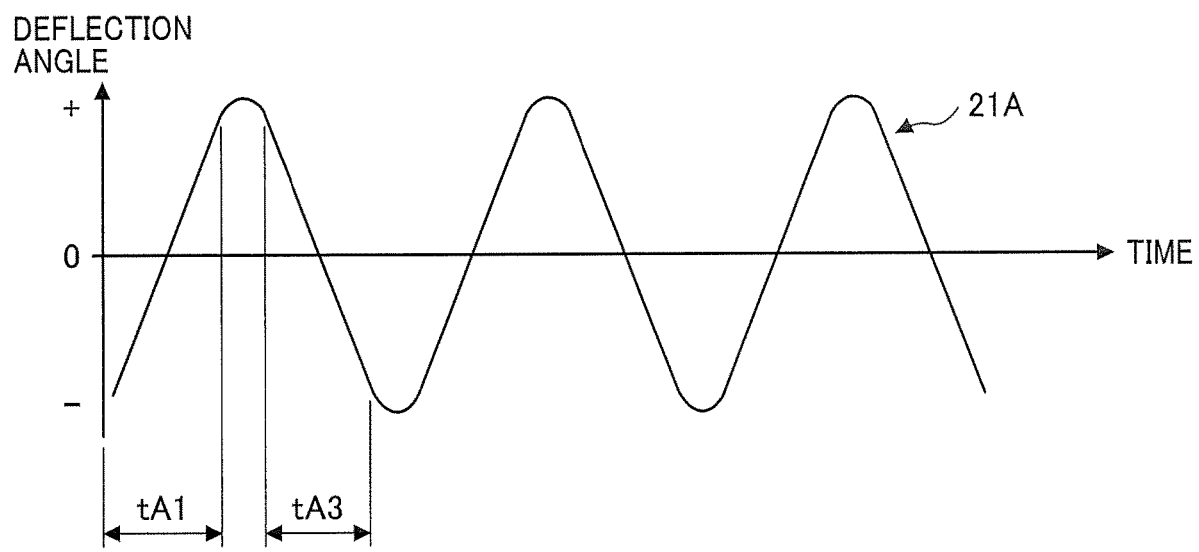
FIG. 21 is a diagram illustrating the temporal change of the deflection angle of a reflector when the moving speed is constant, according to the first embodiment of the present disclosure.

FIG. 21 is a diagram illustrating temporal changes 21A of the deflection angle of the reflector 101 around the second axis when a driving voltage of the waveform 20A is applied under the condition that the moving speed of the reflector 101 around the second axis is constant (even), according to the first embodiment of the present disclosure.

In FIG. 21, the horizontal axis indicates time, and the vertical axis indicates the deflection angle of the reflector 101. Note also that the upward direction of the vertical axis indicates the normal direction, and the downward direction of the vertical axis indicates the inverse direction. As illustrated in FIG. 21, the temporal change 21A of the deflection angle corresponds to the waveform 20A, and the deflection angle is widened in the normal direction during the step-up period tA1 and the deflection angle is widened in the inverse direction during the step-down period tA3.

Figure 22:
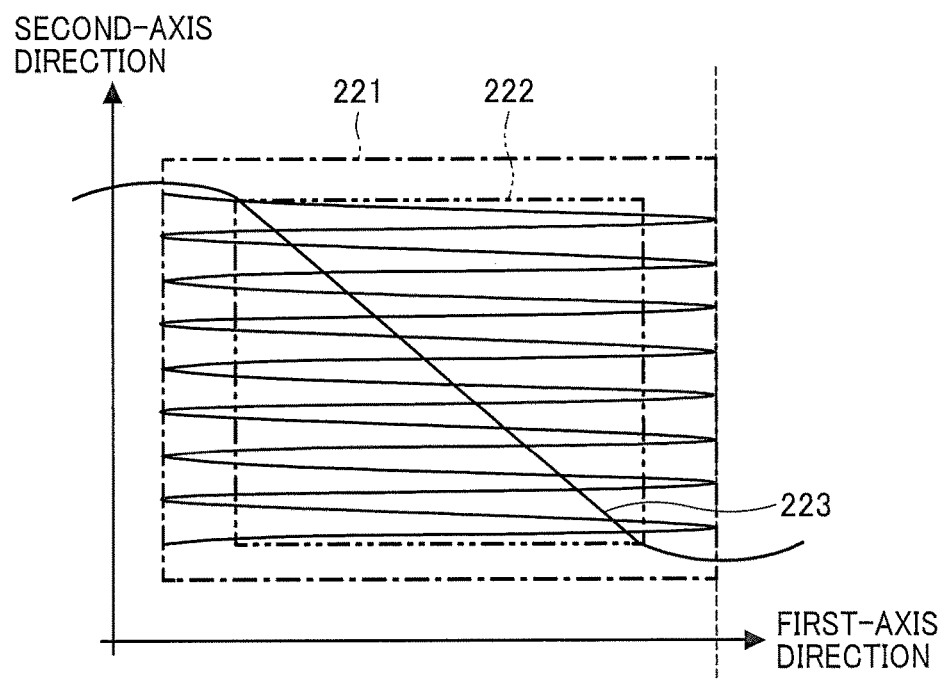
FIG. 22 is a diagram illustrating a scanning line when the moving speed is constant, according to the first embodiment of the present disclosure.

FIG. 22 is a diagram illustrating a scanning line on the target surface 15 (see FIG. 1) when the moving speed of the reflector 101 around the first axis and the second axis is constant (even), according to the present embodiment.

In FIG. 22, the horizontal axis indicates the first-axis direction, and the vertical axis indicates the second-axis direction. An area 221 that is surrounded by a broken line indicates the maximum scanning area of the light reflected by the reflector 101, and an area 222 that is surrounded by a dot-dot-dash line indicates the effective area of the target surface 15. The effective area of the target surface 15 corresponds to, for example, the effective image area of the image projected by the light deflector 10.

A curved line 223 indicates the temporal change of the deflection angle of the reflector 101 around the second axis. The movable device 13 can two-way scans the light within the area 221 to project an image within the area 222.

As the moving speed of the reflector 101 around the second axis is constant, the deflection angle linearly changes within the area 222, and the scanning line intervals in the second-axis direction become constant. As a result, an image with no distortion, variations in brightness, or the like is appropriately projected to the area 222.

One cycle of the driving voltage A and the driving voltage B corresponds to a set of go and return of the optical scanning performed by the reflector 101, and the step-up period tA1 and the step-down period tA3 in FIG. 21 correspond to the first half of the go and return optical scanning and the second half of the go and return optical scanning, respectively. Accordingly, in the following description, the step-up period tA1 and the step-down period tA3 may be referred to as the first half of the go and return optical scanning and the second half of the go and return optical scanning, respectively.

In the present embodiment, when the reflector 101 moves around the second axis, the moving speed of the deflection angle may change due to the elastic vibration caused at an elastic member where the second supporting unit 140 supports the second driving units 130a and 130b, and a harmonic component may be superimposed on the moving speed. Typically, harmonics are defined as a "sinusoidal wave whose frequency is an integral multiple of the fundamental wave, which is included in the distorted-wave alternating current". However, for the sake of explanatory convenience, it is assumed in the description of the embodiments of the present disclosure that harmonics also include a sinusoidal wave whose frequency is not an integral multiple of the fundamental wave but is, for example, an (integer+1/2)-multiple of the fundamental wave.

Figure 23:
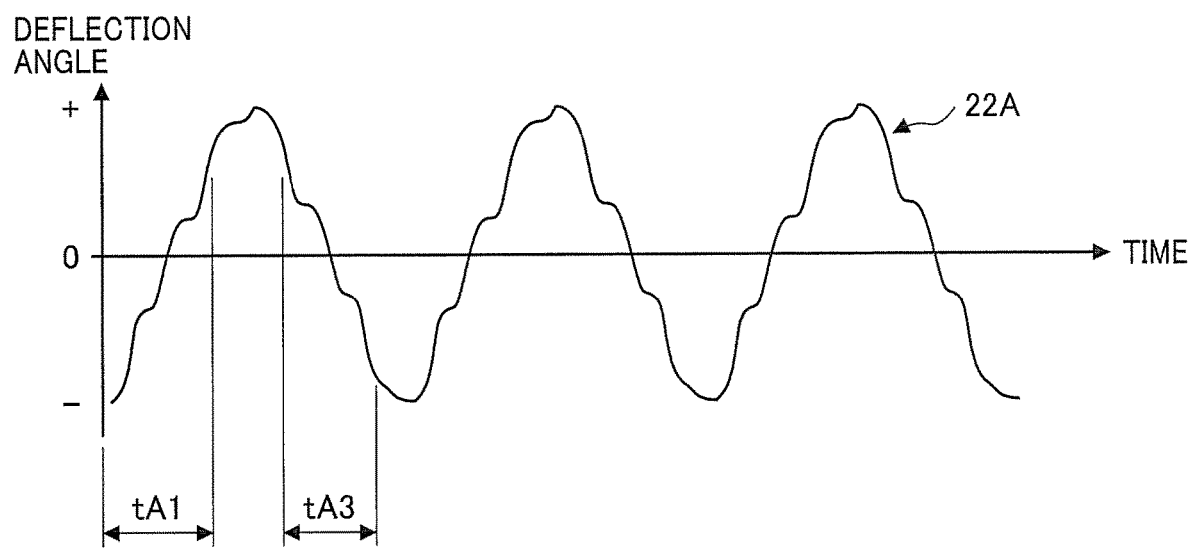
FIG. 23 is a diagram illustrating the temporal change of the deflection angle of a reflector when the moving speed changes, according to the first embodiment of the present disclosure.

FIG. 23 is a diagram illustrating temporal changes 22A of the deflection angle of the reflector 101 around the second axis when a driving voltage of the waveform 20A is applied under the condition that the moving speed of the reflector 101 around the second axis varies, according to the first embodiment of the present disclosure.

How FIG. 23 is to be interpreted is similar to that of FIG. 21, and thus its description is omitted. As illustrated in FIG. 23, due to the changes in moving speed, the temporal change 22A of the deflection angle is not linear during the step-up period tA1 and the step-down period tA3.

Figure 24:
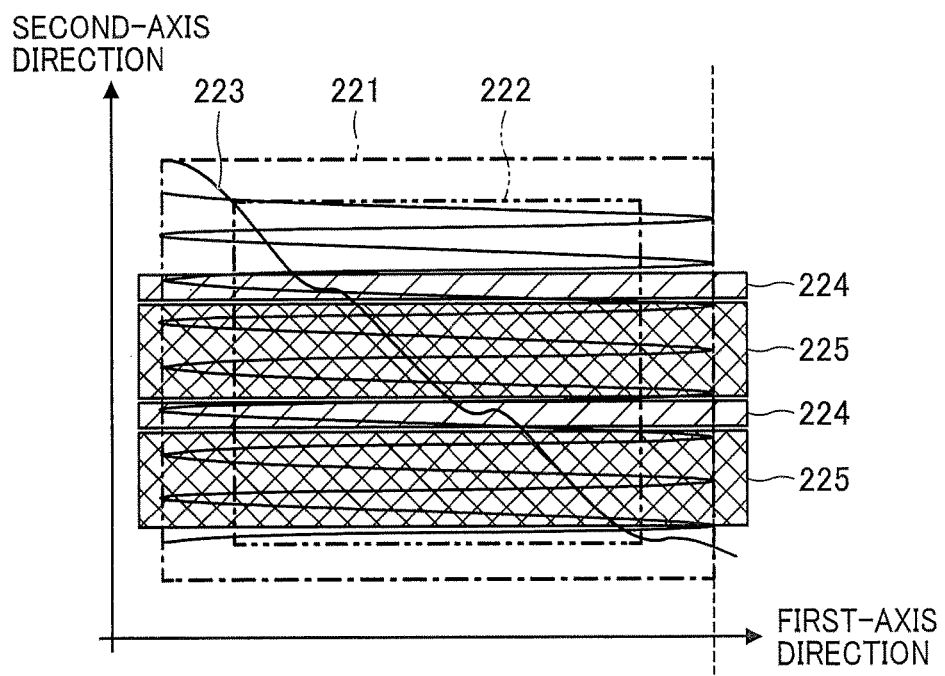
FIG. 24 is a diagram illustrating a scanning line when the moving speed changes, according to the first embodiment of the present disclosure.

FIG. 24 is a diagram illustrating a scanning line on the target surface 15 (see FIG. 1) when the moving speed of the reflector 101 around the first axis and the second axis changes, according to the first embodiment of the present disclosure.

How FIG. 24 is to be interpreted is similar to that of FIG. 22, and thus its description is omitted. Due to the changes in moving speed around the second axis, the deflection angle does not linearly change within the area 222. As a result, there are an area where the interval is short (i.e., an obliquely-hatched area 224) and an area where the interval is wide (i.e., an cross-hatched area 225) in the scanning line intervals in the second-axis direction, and the image quality of the image that is projected to the area 222 deteriorates due to distortion, variations in brightness, or the like.

A method of canceling the changes in moving speed (harmonic components) is described below.

FIG. 25A, FIG. 25B, FIG. 25C, FIG. 25D, FIG. 25E, and FIG. 25F are diagrams each illustrating the deflection angle of the reflector 101 when each of the driving voltage A and the driving voltage B is applied, according to the first embodiment of the present disclosure.

Figure 25A:
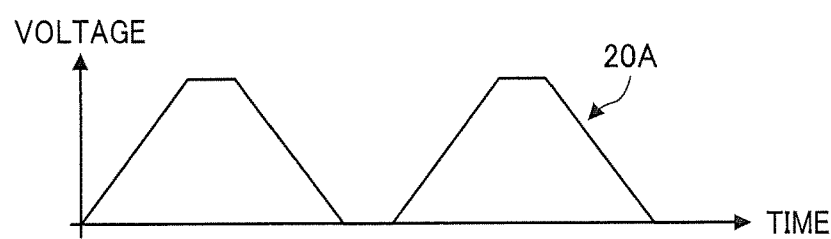
FIG. 25A, FIG. 25B, FIG. 25C, FIG. 25D, FIG. 25E, and FIG. 25F are diagrams each illustrating the deflection angle of a reflector, according to the first embodiment of the present disclosure.

FIG. 25A is a diagram illustrating the waveform 20A of the driving voltage A, according to the present embodiment.

Figure 25B:
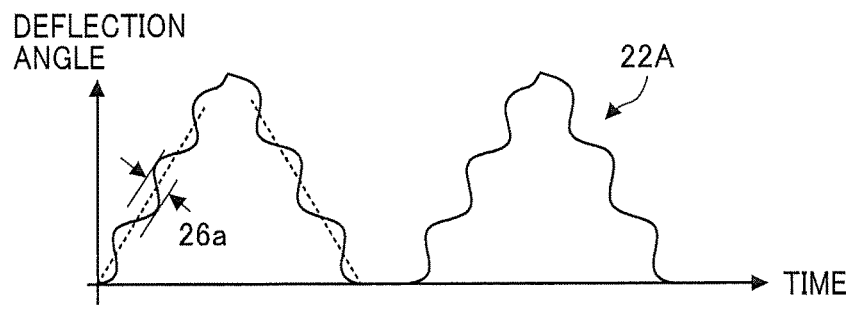

FIG. 25B is a diagram illustrating temporal changes 22A of the deflection angle of the reflector 101 caused by the driving voltage as illustrated in FIG. 25A.

Figure 25C:
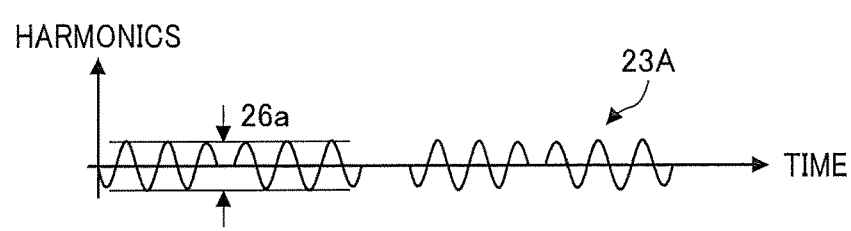

FIG. 25C is a graph of harmonic components 23A extracted from FIG. 25B.

Figure 25D:
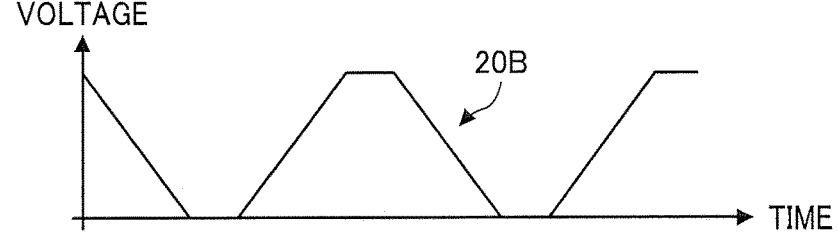

FIG. 25D is a diagram illustrating the waveform 20B of the driving voltage B, according to the present embodiment.

Figure 25E:
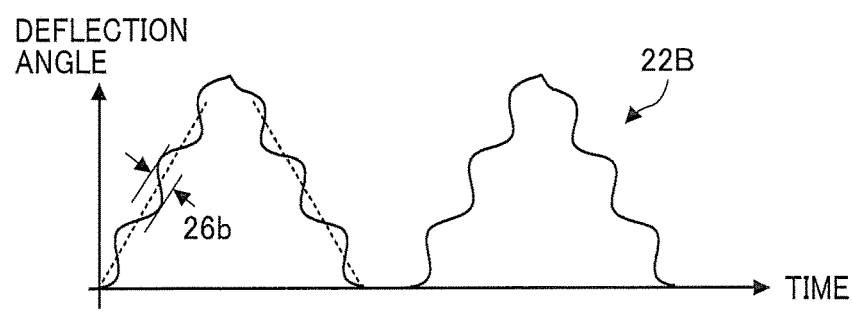

FIG. 25E is a diagram illustrating temporal changes 22B of the deflection angle of the reflector 101 caused by the driving voltage as illustrated in FIG. 25D.

Figure 25F:
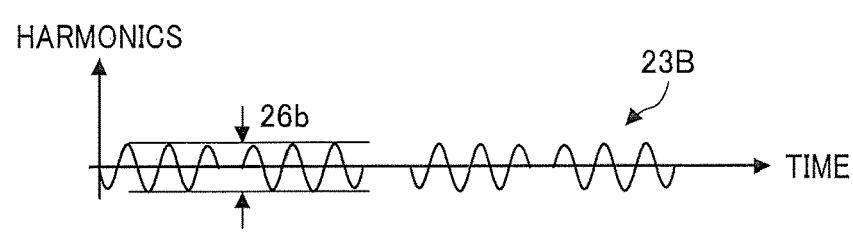

FIG. 25F is a graph of harmonic components 23B extracted from FIG. 25E.

In the configuration or structure of the movable device 13 according to the first embodiment of the present disclosure, the temporal change of the deflection angle of the reflector 101 when the driving voltage A and the driving voltage B are applied in parallel becomes approximately equal to the temporal change 22A of the deflection angle when the driving voltage A is independently applied from which the temporal change 22B of the deflection angle when the driving voltage B is independently applied is subtracted. When the absolute value of the variations in deflection angle during the step-up period tA1 is equal to the absolute value of the variations in deflection angle the step-down period tA3 in both the driving voltage A and the driving voltage B, the amplitude 26a of the harmonic components caused by the driving voltage A becomes approximately equal to the amplitude 26b of the harmonic components caused by the driving voltage B.

For this reason, the phase difference between the waveform of the driving voltage A and the waveform of the driving voltage 13 may be set such that the phase of the harmonic components 23B will be the antiphase of the harmonic components 23A. By so doing, the harmonic components 23A are canceled by the harmonic components 23B and the harmonic components in moving speed are canceled.

However, in actuality, due to, for example, the variations in the properties and characteristics of the piezoelectric circuit 202, there are some cases in which the phase difference between the harmonic components during the step-up period of the driving voltage A and the harmonic components during the step-down period of the driving voltage B is not equivalent to the phase difference between the harmonic components during the step-down period of the driving voltage A and the harmonic components during the step-up period of the driving voltage B. For this reason, when the phase difference between the waveform of the driving voltage A and the waveform of the driving voltage B is simply set, there are some cases in which the phase of the harmonic components 23B does not become the antiphase of the harmonic components 23A and the harmonic components 23A can not always be canceled by the harmonic components 23B.

Such cases are described below in detail with reference to FIG. 26A to FIG. 27C.

Figure 26A:
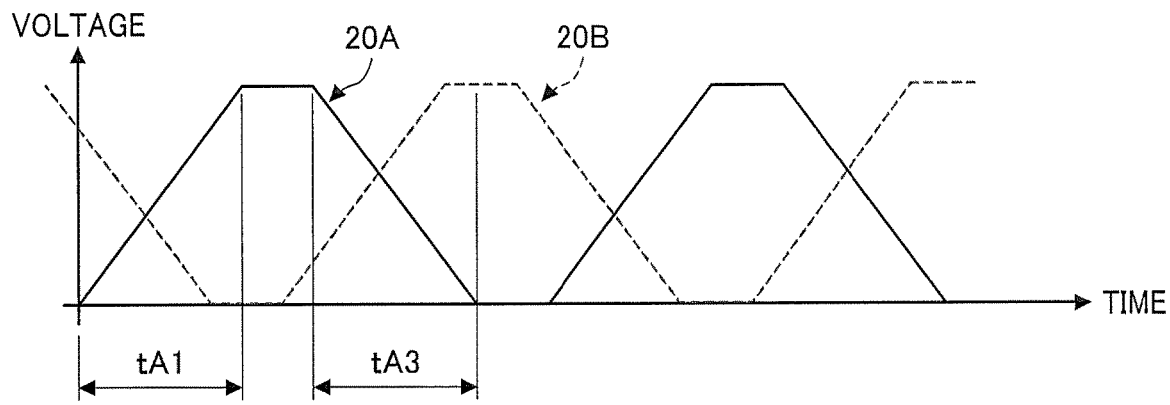
FIG. 26A, FIG. 26B, and FIG. 26C are diagrams each illustrating the cancellation of harmonic components during a step-up period, according to the first embodiment of the present disclosure.
Figure 26B:
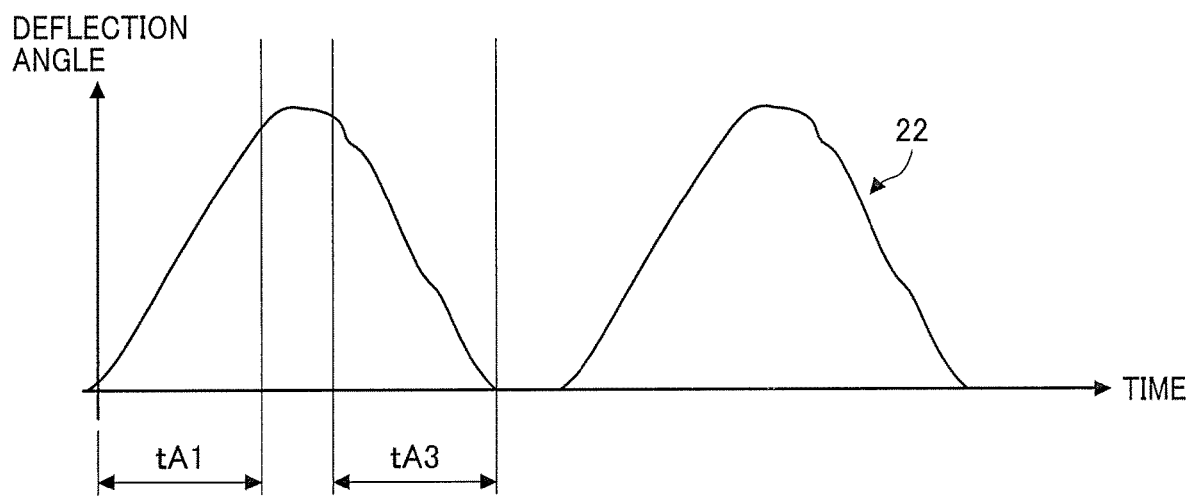
Figure 26C:
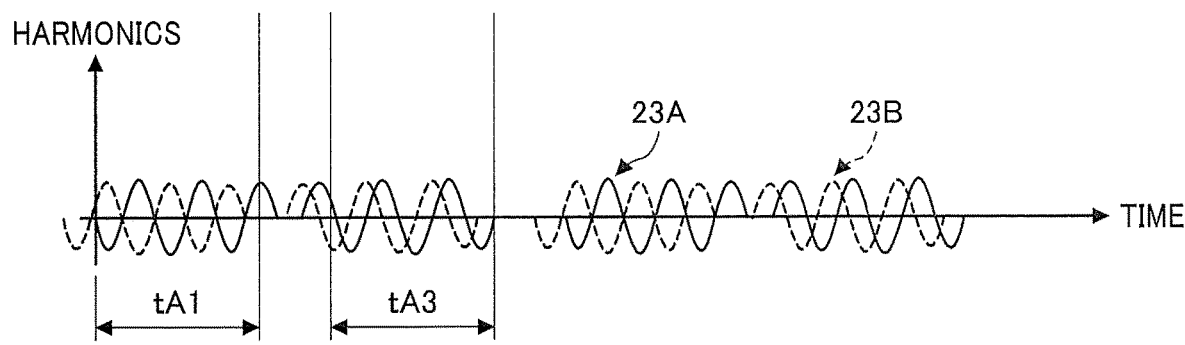

FIG. 26A, FIG. 26B, and FIG. 26C are diagrams each illustrating cases in which the harmonic components during the step-up period tA1 of the driving voltage A are canceled by the harmonic components during the step-down period of the driving voltage B, according to the first embodiment of the present disclosure.

FIG. 26A is a diagram illustrating the waveform of the driving voltage A and the waveform of the driving voltage B, according to the present embodiment.

FIG. 26B is a diagram illustrating the temporal change of the deflection angle caused by the application of the driving voltage A and the driving voltage B, according to the first embodiment of the present disclosure.

FIG. 26C is a diagram illustrating the harmonic components 23A caused by the driving voltage A and the harmonic components 23B caused by the driving voltage B, according to the first embodiment of the present disclosure.

As illustrated in FIG. 26A, if the phase difference between the waveform of the driving voltage A and the waveform of the driving voltage B is set such that the phase of the harmonic components during the step-up period tA1 of the driving voltage A will be the antiphase of the harmonic components during the step-down period of the driving voltage B, as illustrated in FIG. 26C, the harmonic components during the step-up period tA1 of the driving voltage A can be canceled by the harmonic components during the step-down period of the driving voltage B. However, there are some cases in which the phase of the harmonic components during the step-down period tA3 of the driving voltage A does not become the antiphase of the harmonic components during the step-up period of the driving voltage B and the harmonic components during the step-down period tA3 of the driving voltage A cannot be canceled by the harmonic components during the step-up period of the driving voltage B. As a result, as illustrated in FIG. 26B, the harmonic components cannot be canceled during the step-down period tA3 of the temporal change (moving speed) 22 of the deflection angle and some harmonic components remain.

Figure 27A:
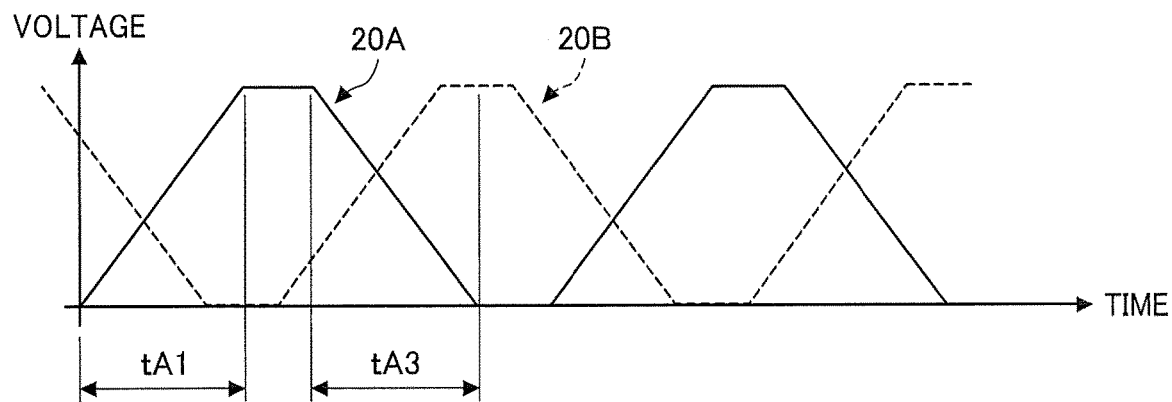
FIG. 27A, FIG. 27B, and FIG. 27C are diagrams each illustrating the cancellation of harmonic components during a step-down period, according to the first embodiment of the present disclosure.
Figure 27B:
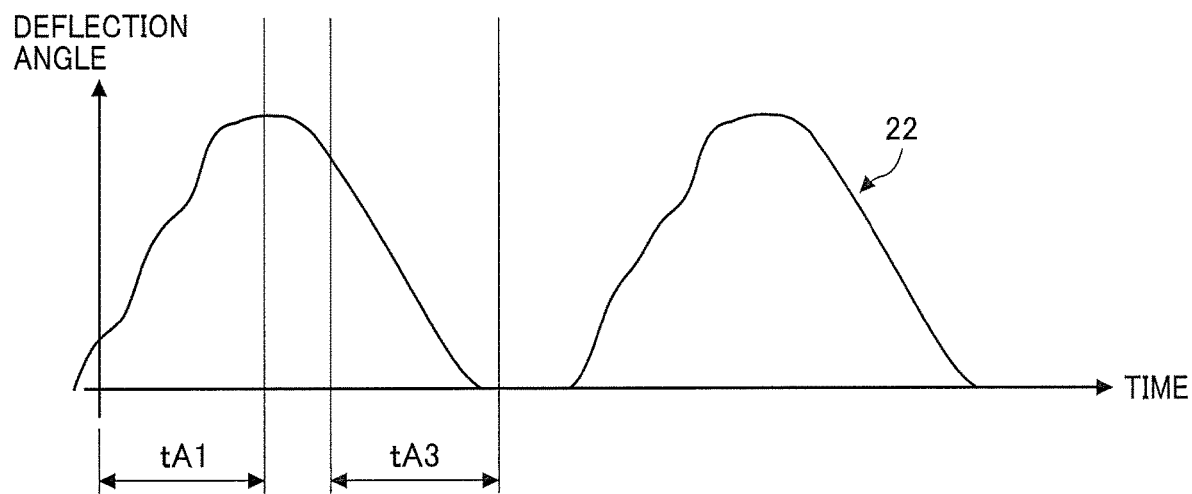
Figure 27C:
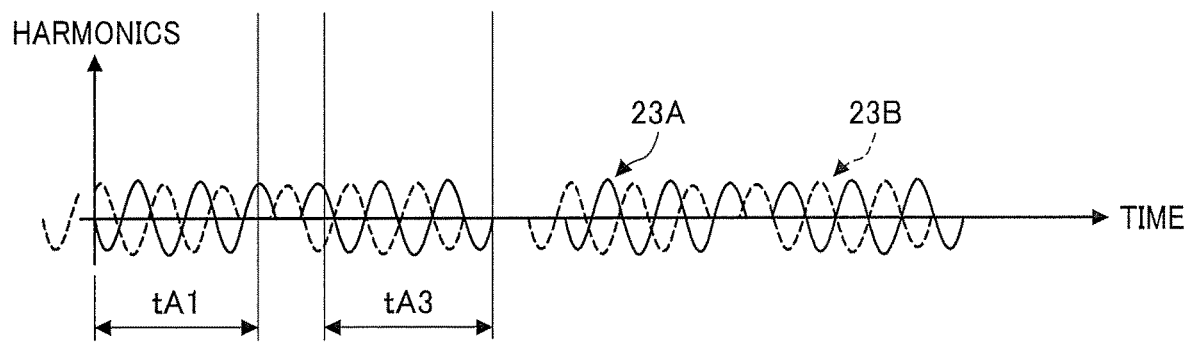

By contrast, FIG. 27A, FIG. 27B, and FIG. 27C are diagrams each illustrating cases in which the harmonic components during the step-down period tA3 of the driving voltage A are canceled by the harmonic components during the step-up period of the driving voltage B, according to the first embodiment of the present disclosure.

FIG. 27A is a diagram illustrating the waveform of the driving voltage A and the waveform of the driving voltage B, according to the present embodiment.

FIG. 27B is a diagram illustrating the temporal change of the deflection angle caused by the application of the driving voltage A and the driving voltage B, according to the first embodiment of the present disclosure.

FIG. 27C is a diagram illustrating the harmonic components 23A caused by the driving voltage A and the harmonic components 23B caused by the driving voltage B, according to the first embodiment of the present disclosure.

As illustrated in FIG. 27A, if the phase difference between the waveform of the driving voltage A and the waveform of the driving voltage B is set such that the phase of the harmonic components during the step-down period tA3 of the driving voltage A will be the antiphase of the harmonic components during the step-up period of the driving voltage B, as illustrated in FIG. 27C, the harmonic components during the step-down period tA3 of the driving voltage A can be canceled by the harmonic components during the step-up period of the driving voltage B. However, there are some cases in which the phase of the harmonic components during the step-up period tA1 of the driving voltage A does not become the antiphase of the harmonic components during the step-down period of the driving voltage B and the harmonic components during the step-up period tA1 of the driving voltage A cannot be canceled by the harmonic components during the step-down period of the driving voltage B. As a result, as illustrated in FIG. 27B, the harmonic components cannot be canceled during the step-up period tA1 of the temporal change 22 of the deflection angle and some harmonic components remain.

In order to handle such a situation, in the present embodiment, the phase difference between the waveform of the driving voltage A and the waveform of the driving voltage B is set such that the harmonic components during the step-up period tA1 of the driving voltage A are canceled by the harmonic components during the step-down period of the driving voltage B, and the timing at which the step-up of the driving voltage B starts is set such that the harmonic components during the step-down period tA3 of the driving voltage A will be canceled by the harmonic components during the step-up period of the driving voltage B.

Figure 28A:
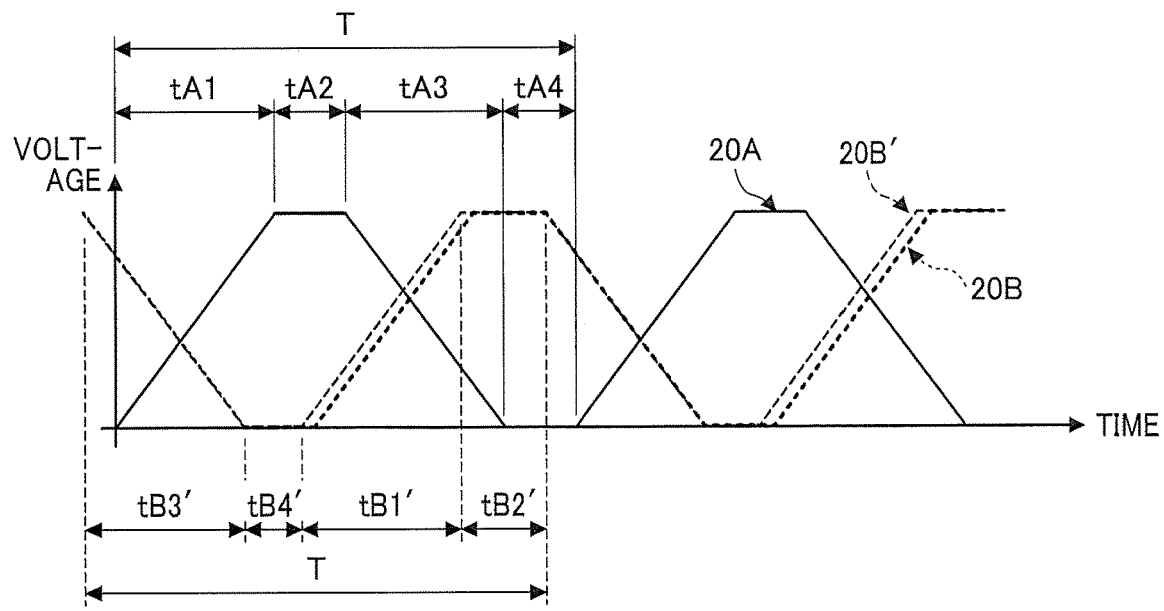
FIG. 28A, FIG. 28B, and FIG. 28C are diagrams each illustrating a method of canceling harmonic components by driving voltage, according to the first embodiment of the present disclosure.
Figure 28B:
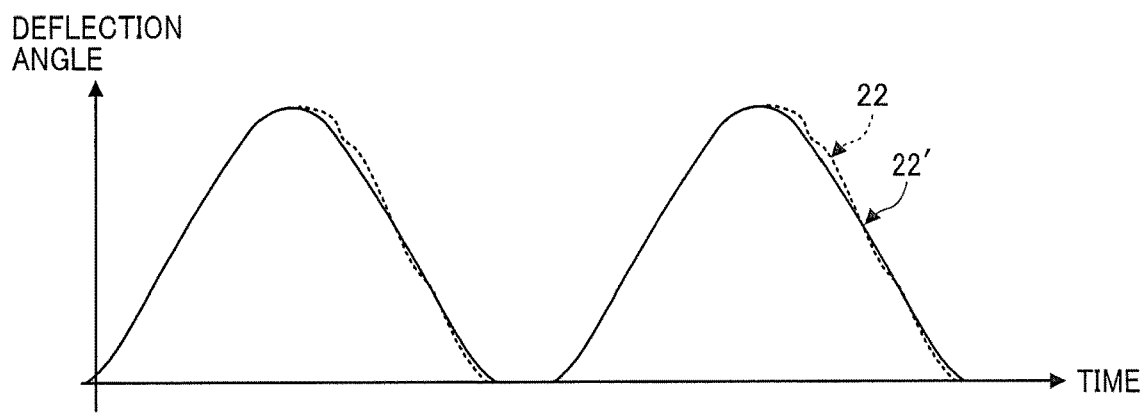
Figure 28C:
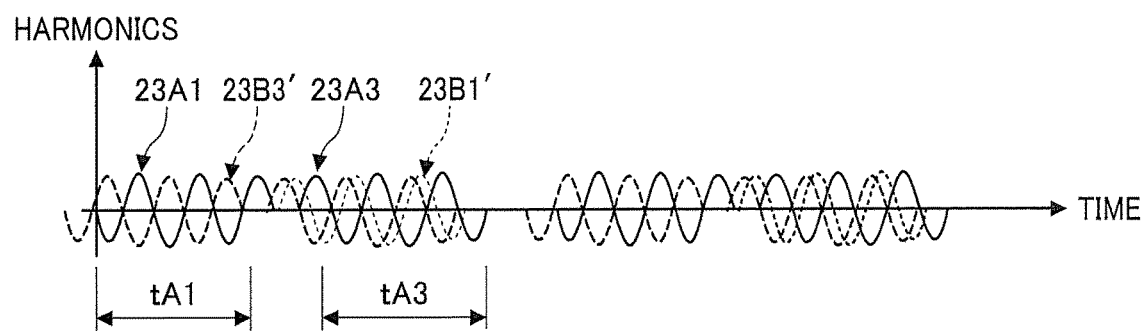

FIG. 28A, FIG. 28B, and FIG. 28C are diagrams each illustrating a method of canceling harmonic components by the driving voltage A and the driving voltage B, according to the first embodiment of the present disclosure.

FIG. 28A is a graph illustrating the waveform 20A of the driving voltage A and the waveform 20B' of the driving voltage B, according to the present embodiment.

FIG. 28B is a diagram illustrating the temporal changes of the deflection angle of the reflector 101 caused by the driving voltage as illustrated in FIG. 28A.

FIG. 28C is a graph of the harmonic components extracted from FIG. 28B.

The waveform 20A that is indicated by a solid line in FIG. 28A has the step-up period tA1 and the step-down period tA3 in one cycle T. Moreover, the waveform 20A has the first constant-voltage period tA2 where the voltage is constant after the step-up period tA1 and before the step-down period tA3, and has the second constant-voltage period tA4 where the voltage is constant before the step-up period tA1 and after the step-down period tA3.

By contrast, waveform 20B' that is indicated by a broken line has a step-up period tB1 and a step-down period tB3" in the cycle T. Moreover, the waveform 20B has a first constant-voltage period tB2' where the voltage is constant after the step-up period tB1' and before the step-down period tB3', and has a second constant-voltage period tB4' where the voltage is constant before the step-up period tB1' and after the step-down period tB3'. Moreover, regarding the waveform 20W, the ratio of the first constant-voltage period tB2' in the cycle T is different from the ratio of the second constant-voltage period tB4' in the cycle T.

The phase of the waveform 20B' may be differentiated from that of the waveform 20A to cause a phase difference. By so doing, as illustrated in FIG. 28C, the phase of harmonic components 23B3' during the step-down period tB3' of the driving voltage B can be made antiphase of the harmonic components 23A1 during the step-up period tA1 of the driving voltage A. Accordingly, the harmonic components 23A1 are canceled by the harmonic components 23B3'.

Moreover, regarding the waveform 20B', the timing at which the step-up of the driving voltage B starts may be set. By so doing, as illustrated in FIG. 28C, the phase of harmonic components 23B1' during the step-up period tB1' of the driving voltage B can be made antiphase of the harmonic components 23A3 during the step-down period tA3 of the driving voltage A. Accordingly, the harmonic components 23A3 are canceled by the harmonic components 23B1'. Regarding the waveform 20B', the timing at which the step-up of the driving voltage B starts may be set to any timing by changing the second constant-voltage period tB4'. By subtracting the amount of change Δt during the second constant-voltage period tB4' from the first constant-voltage period tB2', the displacements of the cycle of the driving voltage B with reference to the cycle of the driving voltage A can be removed. Due to such a configuration and setting, the ratio of the first constant-voltage period tB2' in the cycle T is different from the ratio of the second constant-voltage period tB4' in the cycle T.

The waveform 20B that is indicated by a dotted line in FIG. 28A, which is indicated as a control sample, is different from the waveform 20B' only in the point that the ratio of the first constant-voltage period tB2' in the cycle T is equal to the ratio of the second constant-voltage period tB4 in the cycle T. If the waveform 20B is used, only the phase difference between the waveform 20A and the waveform 20B can be set. In such a configuration, as described as above, when the phase difference between the harmonic components 23A1 and the harmonic components 23B3' and the phase difference between the harmonic components 23A3 and the harmonic components 23B1' are not equal to each other, the harmonic components 23A cannot be canceled by the harmonic components 23B.

The temporal change 22 of the deflection angle, which is indicated by a dotted line in FIG. 28B, is obtained when the driving voltage A and the driving voltage B that is indicated as a control sample are applied, and some harmonic components remain in the step-down period tA3. By contrast, the temporal change 22' of the deflection angle, which is indicated by a solid line in FIG. 28B, is obtained when the driving voltage A and the driving voltage B' according to the first embodiments of the present disclosure are applied, and more harmonic components are canceled in the temporal change 22' compared with the temporal change 22 of the deflection angle, which is indicated by a dotted line in FIG. 28B.

As a result of setting the timing at which the step-up of the driving voltage B starts, as described above, the second constant-voltage period tB4' may be 0 second.

Figure 29A:
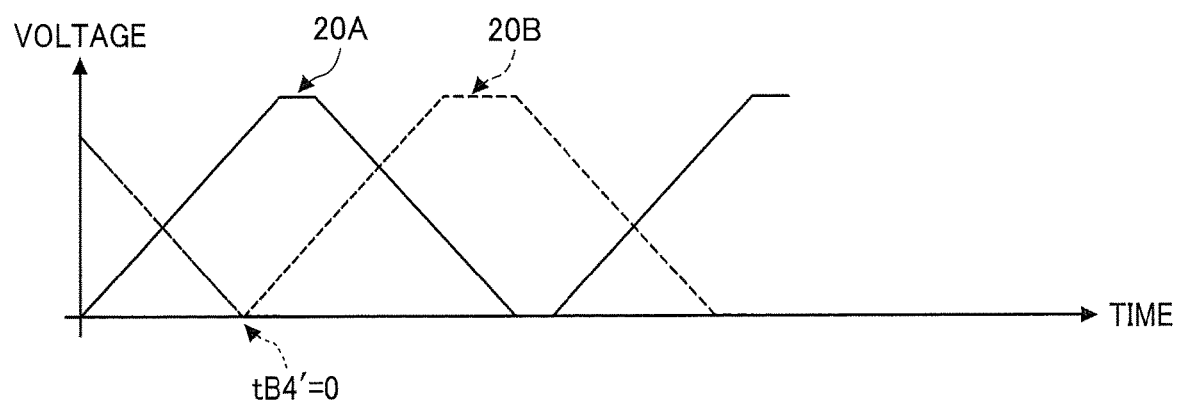
FIG. 29A and FIG. 29B are diagrams each illustrating the driving voltage when a first constant-voltage period is 0 second, according to the first embodiment of the present disclosure.
Figure 29B:
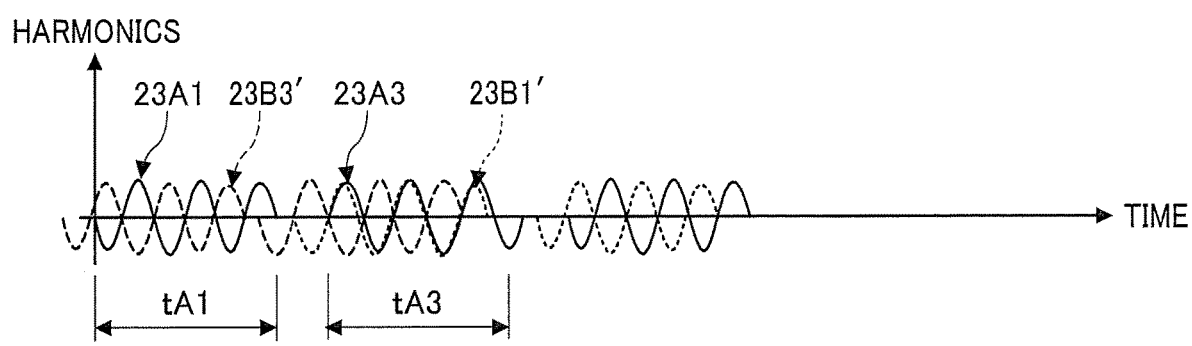

FIG. 29A and FIG. 29B are diagrams each illustrating the driving voltage when the second constant-voltage period tB4' is 0 second, according to the first embodiment of the present disclosure.

FIG. 29A is a diagram illustrating the waveform 20A and the waveform 20B, according to the present embodiment.

FIG. 29B is a diagram illustrating the harmonic components of the driving voltage as illustrated in FIG. 29A.

As illustrated in FIG. 29A, the second constant-voltage period tB4' is 0 second. Also in such a configuration as above, as illustrated in FIG. 29B, the harmonic components 23A1 can be canceled by the harmonic components 23B3', and the harmonic components can be canceled.

A functional configuration of the controller 11a provided for the light deflector 10a, according to the first embodiment, is described below.

Figure 30:
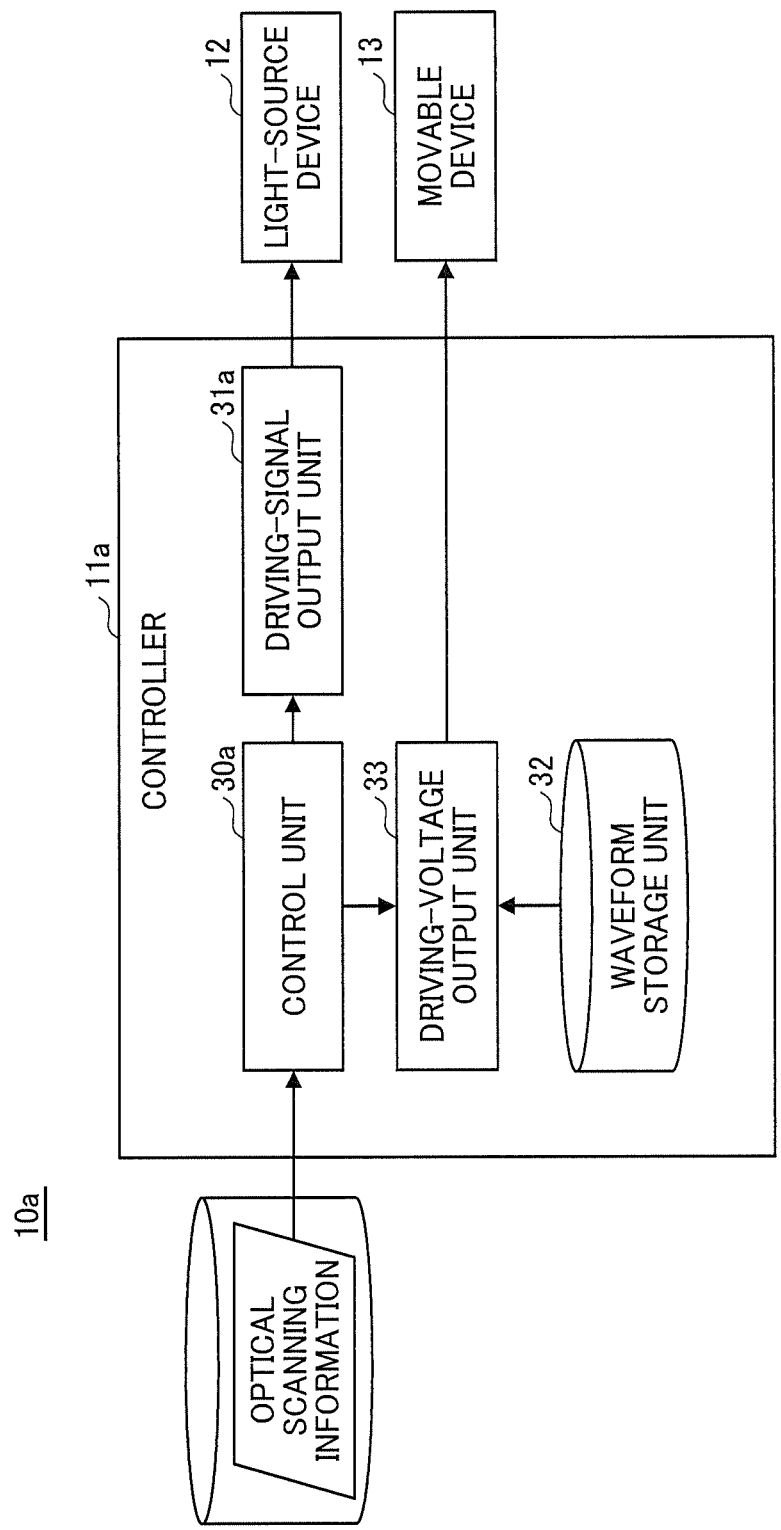
FIG. 30 is a block diagram illustrating a functional configuration of a control system according to a first embodiment of the present disclosure.

FIG. 30 is a block diagram illustrating the functional configuration of the controller 11a according to the first embodiment.

As illustrated in FIG. 30, the controller 11a includes a control unit 30a, a driving-signal output unit 31a, the waveform storage unit 32, and the driving-voltage output unit 33. The waveform storage unit 32 is implemented by a storage device such as the ROM 28 as illustrated in FIG. 2. The driving-voltage output unit 33 is implemented as the CPU 20 as illustrated in FIG. 2 executes a predetermined program.

The control unit 30a obtains optical scanning information from an external device, and generate a control signal based on the obtained optical scanning information. Then, the control unit 30a outputs the control signal for the light-source device 12 to the driving-signal output unit 31a, and outputs the control signal for the movable device 13 to the driving-voltage output unit 33.

The driving-signal output unit 31a outputs a driving signal to the light-source device 12 based on the received control signal.

The waveform storage unit 32 stores the waveform 20A and the waveform 20B' that are designed in advance by experiment or simulation. The waveform 20B' is designed to have a predetermined phase difference with reference to the waveform 20A, and is designed such that the second constant-voltage period tB4' have a predetermined length of time.

The driving-voltage output unit 33 reads the waveform 20A and the waveform 20B' stored in the waveform storage unit 32. Then, the driving-voltage output unit 33 outputs, in response to the control signal output from the control unit 30a, the driving voltage A and the driving voltage B to each one of the first piezoelectric drive circuits 112a and 112b and the second piezoelectric drive circuits 131a to 131f and 132a to 132f, which are provided for the movable device 13.

Figure 31:
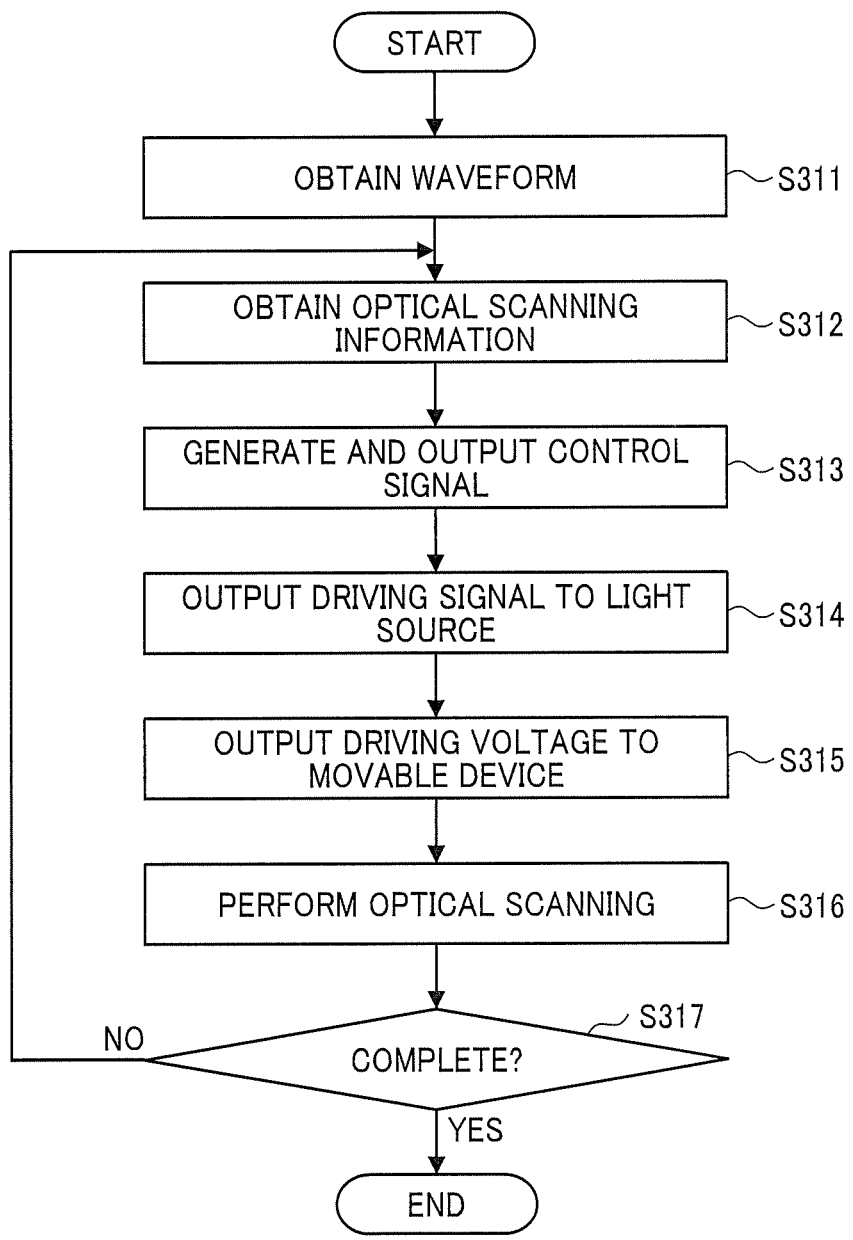
FIG. 31 is a flowchart of the processes that are performed by a controller, according to the first embodiment of the present disclosure.

FIG. 31 is a flowchart of the processes that are performed by the controller 11a, according to the present embodiment.

Firstly, in a step S311, the driving-voltage output unit 33 reads the waveform 20A and the waveform 20B' stored in the waveform storage unit 32.

Subsequently, in a step S312, the control unit 30a obtains optical scanning information from, for example, an external device.

Subsequently, in a step S313, the control unit 30a generate a control signal based on the obtained optical scanning information. Then, the control unit 30a outputs the control signal for the light-source device 12 to the driving-signal output unit 31a, and outputs the control signal for the movable device 13 to the driving-voltage output unit 33.

Subsequently, in a step S314, the driving-signal output unit 31a outputs a driving signal to the light-source device 12 based on the received control signal.

Subsequently, in a step S315, the driving-voltage output unit 33 outputs driving voltage A and driving voltage B to the movable device 13 based on the received control signal.

Subsequently, in a step S316, the light-source device 12 emits light based on the received driving signal. Moreover, the movable device 13 drives the reflector 101 based on the received driving voltage. The driving of the light source 12 and the movable device 13 causes light to be deflected in a given direction, and optical scanning is performed.

Subsequently, in a step S317, the control unit 30a determines whether or not the optically scanning is be complete.

When it is determined in the step S317 that the optical scanning is complete ("YES" in the step S317), the controller 11a terminates the processes. On the other hand, when it is determined that the optical scanning is not complete ("NO" in the step S317), the process returns to the step S312, and the controller 11a repeats the processes in the S312 and the following steps.

The controller 11a can implement the optical scanning as described above.

As described above with the accompanying drawings, in the first embodiment of the present disclosure, the phase difference between the waveform 20A of the driving voltage A and the waveform 20B' of the driving voltage B is set such that the harmonic components 23A1 during the step-up period tA1 of the driving voltage A are canceled by the harmonic components 23B3' during the step-down period tB3' of the driving voltage B, and regarding the waveform 20B', the timing at which the step-up of the driving voltage B starts may be set such that the harmonic components 23A3 during the step-down period tA3 of the driving voltage A will be canceled by the harmonic components 23B1' during the step-up period tB1' of the driving voltage B. In other words, the second constant-voltage period tB4' in the waveform 20B' is set such that the harmonic components 23A3 during the step-down period tA3 of the driving voltage A will be canceled by the harmonic components 23B1' during the step-up period tB1' of the driving voltage B.

Due to this configuration, the harmonic components 23A are canceled by the harmonic components 23B and the harmonic components of the moving speed of the reflector 101 can be canceled without being influenced by, for example, the variations in the properties and characteristics of the piezoelectric circuit 202. As a result, the deterioration in image quality such as distortion and variations in brightness on a projected image can be controlled.

The phase difference between the waveform 20A of the driving voltage A and the waveform 20B' of the driving voltage B is set such that the harmonic components 23A3 during the step-down period tA3 of the driving voltage A are canceled by the harmonic components 23B1' during the step-up period tB1' of the driving voltage B, and regarding the waveform 20B', the timing at which the step-up of the driving voltage B starts may be set such that the harmonic components 23A1 during the step-up period tA1 of the driving voltage A will be canceled by the harmonic components 23B3' during the step-down period tB3' of the driving voltage B. In other words, the first constant-voltage period tB2' in the waveform 20B' may be set such that the harmonic components 23A1 during the step-up period tA1 of the driving voltage A will be canceled by the harmonic components 23B3' during the step-down period tB3' of the driving voltage B.

In the above-described first embodiment of the present disclosure, the waveform 20A is fixed, and the waveform 20B' is changed. However, no limitation is indicated thereby, and the waveform 20B' may be fixed, and the waveform 20A may be changed. Alternatively, both the waveform 20A and the waveform 20B' may be changed.

In other words, regarding the waveform 20A, the ratio of the first constant-voltage period tA2 in the cycle T may be made different from the ratio of the second constant-voltage period tA4 in the cycle T. Alternatively, regarding both the waveform 20A and the waveform 20B', the ratio of the first constant-voltage period in the cycle T may be made different from the ratio of the second constant-voltage period in the cycle T.

When the harmonic components are canceled in either one of the first and second half of the go and return optical scanning, only the scanning light of either one of the first and second half of the go and return optical scanning from which the harmonic components are removed may be used for the image projection. By contrast, in the first embodiment of the present disclosure, the harmonic components are canceled in both the first and second half of the go and return optical scanning. Due to this configuration, the scanning light of both the first and second half of the go and return optical scanning can be used for the image projection. Accordingly, the number of scanning lines of light that can be used for image projection can be increased and the maximum scanning area can be widened.

Figure 32:
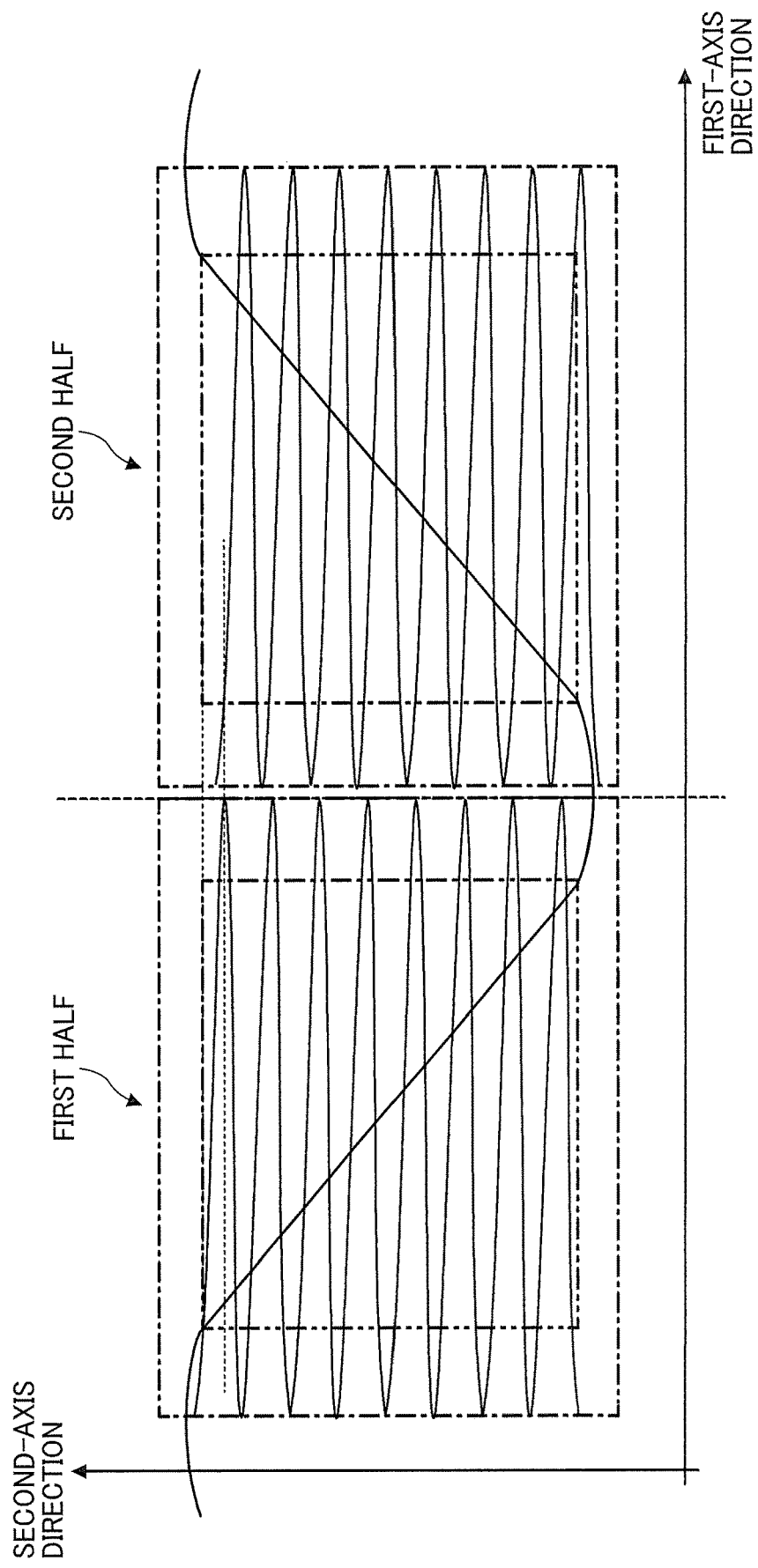
FIG. 32 is a diagram illustrating the prevention of flickering on an image, using interlaced scan, according to the first embodiment of the present disclosure.

As illustrated in FIG. 32, interlaced scan may be adopted to control the flickering on the image. In the interlaced scan, the odd-numbered scanning lines of the image in the second-axis direction are projected in the first half of the go and return scanning, and the even-numbered scanning lines of the image in the second-axis direction are projected in the second half of the go and return scanning.

Figure 33:
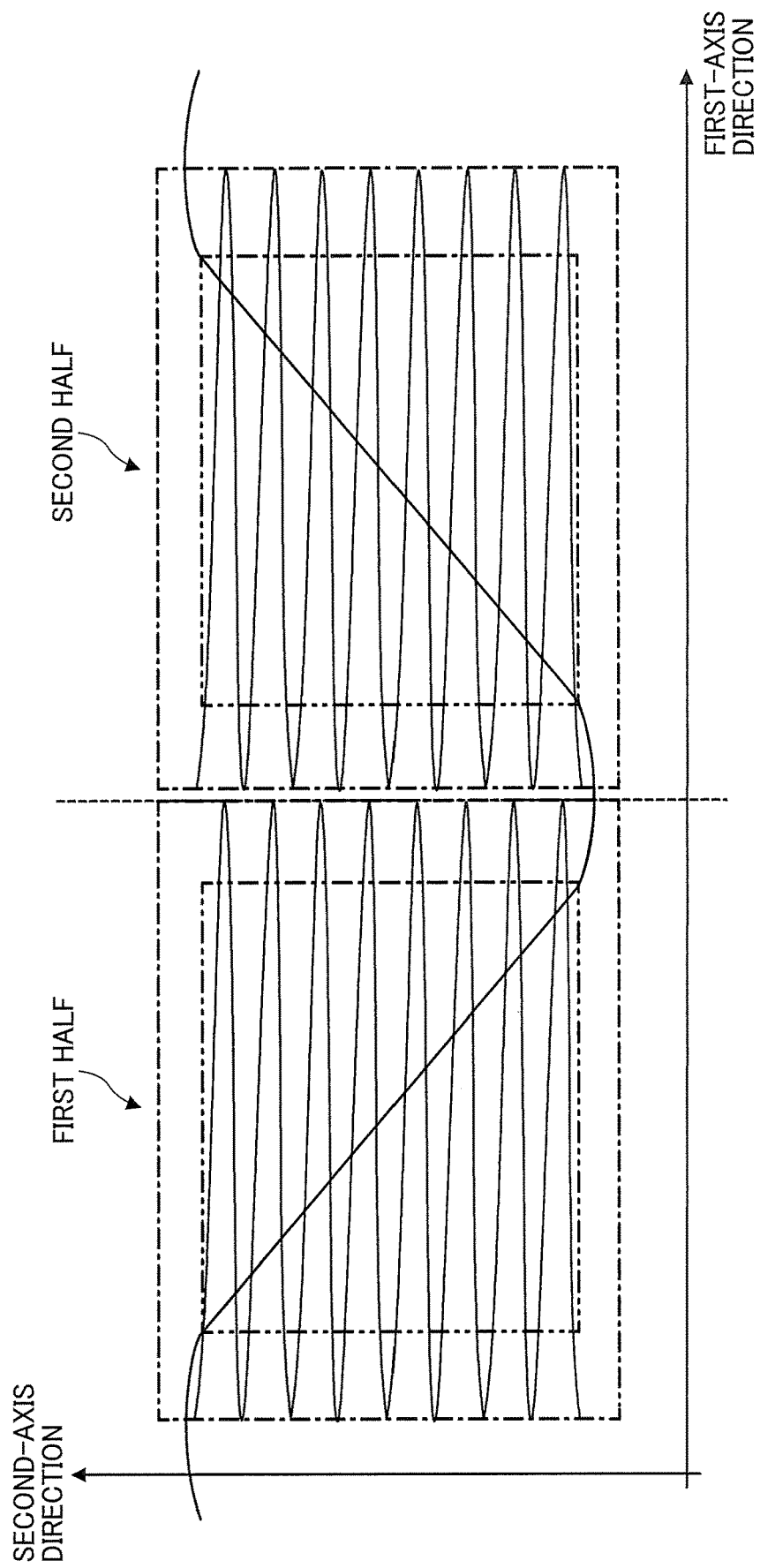
FIG. 33 is a diagram illustrating how the brightness is improved on a projected image, according to the first embodiment of the present disclosure.

Alternatively, as illustrated in FIG. 33, the same scanning lines of the image in the second-axis direction may be projected in the first half and second half of the go and return scanning to enhance the brightness of the projected image.

A desirable range of a constant-voltage period such as the second constant-voltage period tB4' is described below.

It is assumed that the displacement of the timing at which the step-up of the driving voltage A starts from the timing at which the step-down of the driving voltage B starts when the harmonic components 23A1 are canceled by the harmonic components 23B3' in the first half of the go and return optical scanning performed by the reflector 101 is a phase difference φ1 (deg). By contrast, it is assumed that the displacement of the timing at which the step-down of the driving voltage A starts from the timing at which the step-up of the driving voltage B starts when the harmonic components 23A3 are canceled by the harmonic components 23B1' in the second half of the go and return optical scanning performed by the reflector 101 is a phase difference φ2 (deg). According to the experiments, it is understood that a desirable range for the difference between the phase difference φ1 and the phase difference φ2 is equal to or less than 10 degrees and is equal to or less than 2.78% (=10/360) of the cycle T.

Accordingly, in the first embodiment of the present disclosure, the sum of the first constant-voltage period tB2' and the second constant-voltage period tB4' in the waveform 20B' is controlled to be equal to or smaller than 10% of the cycle T. Due to this configuration, while sufficiently maintaining the harmonic components in the first half of the go and return optical scanning or the second half of the go and return optical scanning, the harmonic components in the first half of the go and return optical scanning or the second half of the go and return optical scanning can be canceled in a more desirable manner. It is further desirable if the difference between the phase difference φ1 and the phase difference φ2 is made equal to or less than 5% of the cycle T.

Second Embodiment

A second embodiment of the present disclosure is described below.

In the first embodiment of the present disclosure, an embodiment is described as above in which the waveform 20B' is designed in advance and the phase difference between the waveform 20A and the waveform 20B' and the second constant-voltage period tB4' in the waveform 20B' are set such that the harmonic components of the moving speed during each of the step-up period tA1 and the step-down period tA3 will be canceled.

By contrast, in the light deflector 10b according to the second embodiment of the present disclosure, the deflection angle of the reflector 101 is detected by the detection units 140a and 140b provided for the movable device 13b. Then, the phase difference between the waveform 20A and the waveform 20B' and the second constant-voltage period tB4' of the waveform 20B' are adjusted based on the results of detection such that the harmonic components of the moving speed during each of the step-up period tA1 and the step-down period tA3 will be canceled.

Firstly, a light deflector 10B according to the second embodiment is described below.

Figure 34:
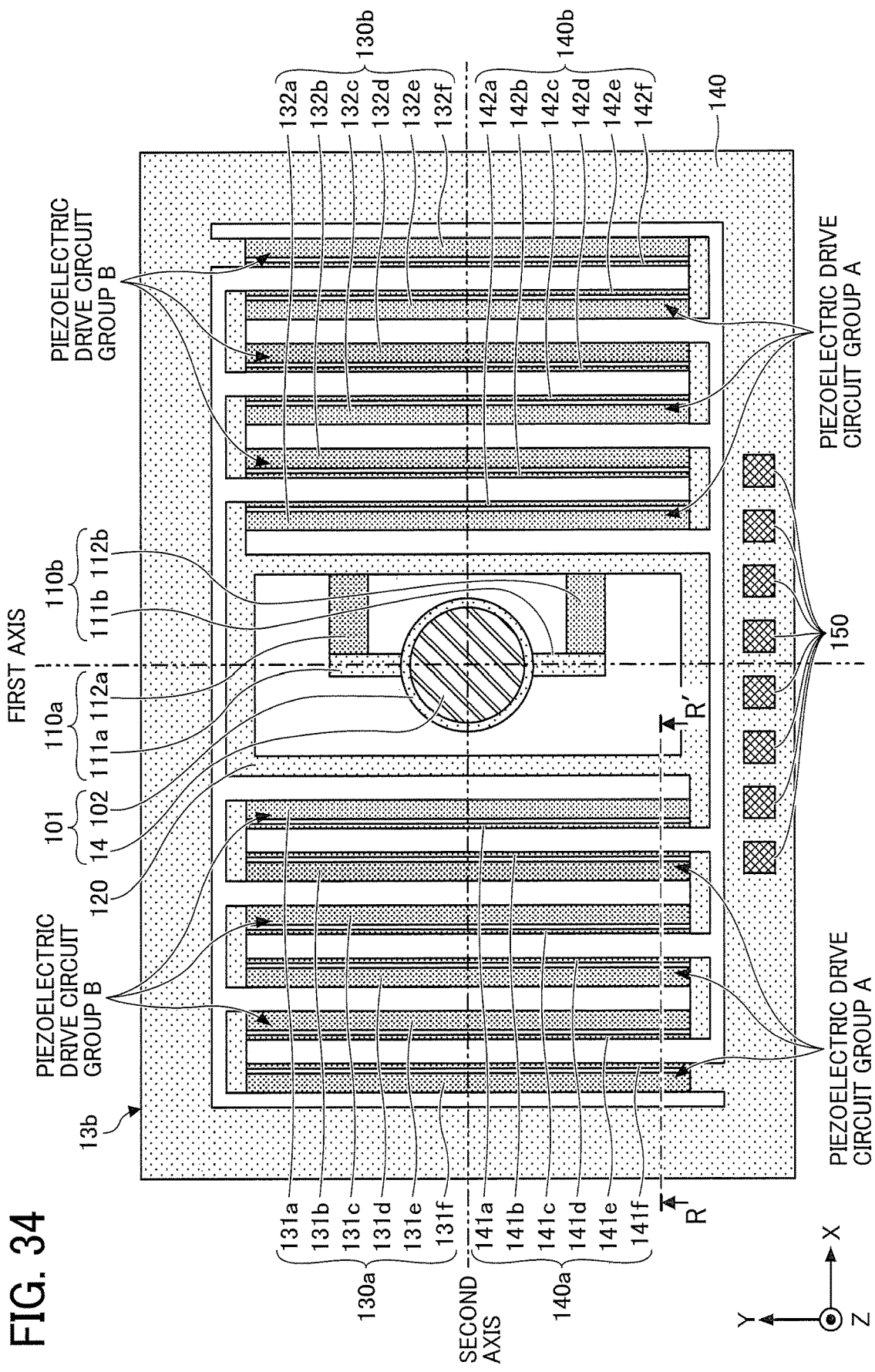
FIG. 34 is a plan view of a movable device according to a second embodiment of the present disclosure.

FIG. 34 is a plan view of a movable device 13b provided for the light deflector 10b according to the present embodiment, when viewed from +Z-direction, according to the second embodiment.

Figure 35:
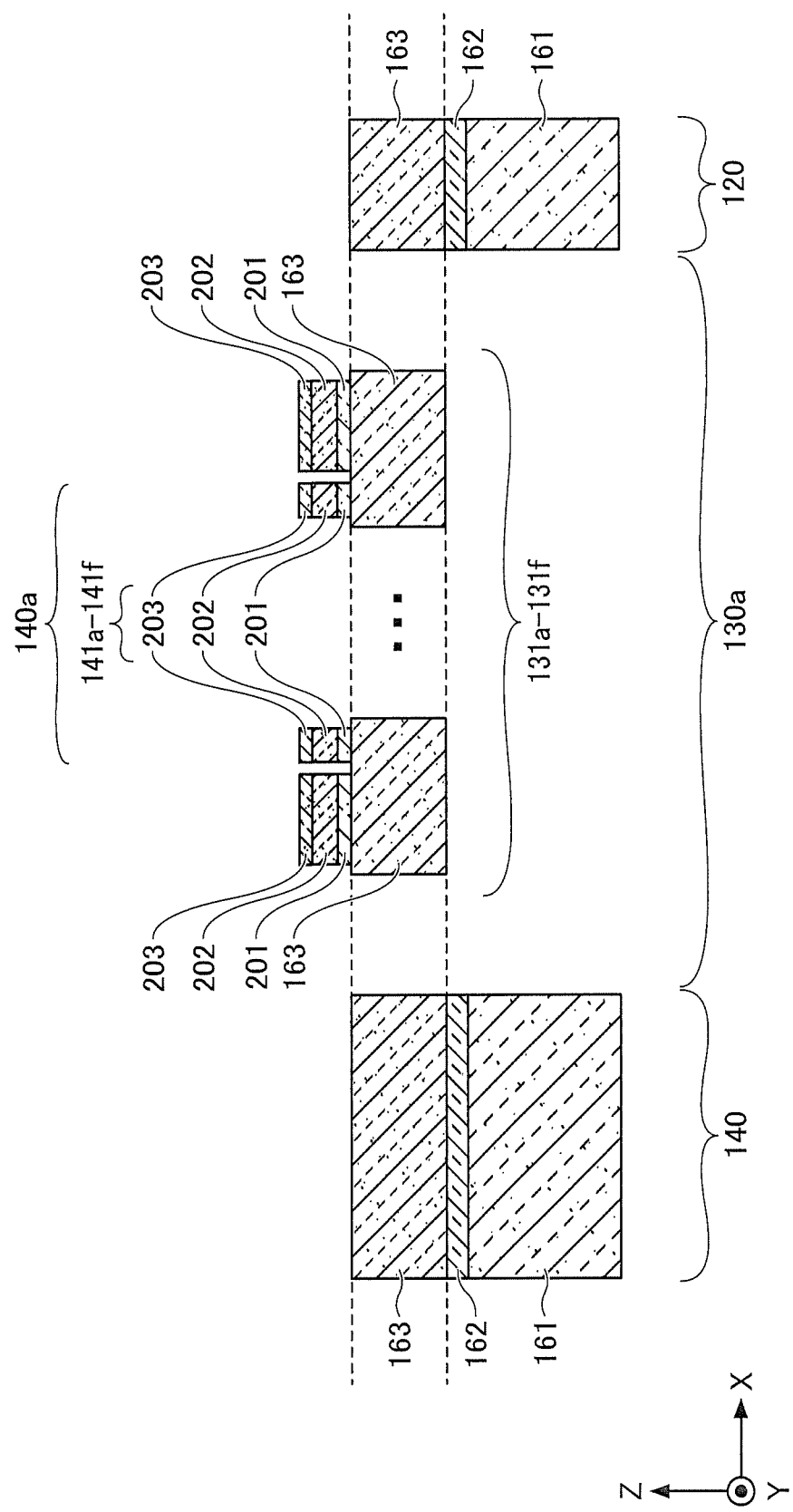
FIG. 35 is a diagram illustrating a R-R' sectional view as indicated in FIG. 34.

FIG. 35 is a R-R' sectional view of the movable device 13b as illustrated in FIG. 34, according to the second embodiment.

As illustrated in FIG. 34, the movable device 13b includes detection units 140a and 140b. The detection unit 140a consist of piezoelectric sensors 141a to 141f, and the detection unit 140b consist of piezoelectric sensors 142a to 142f.

The piezoelectric sensor 141a is disposed on the silicon active layer of the second piezoelectric drive circuit 131a, and the piezoelectric sensor 141b is disposed on the silicon active layer of the second piezoelectric drive circuit 131b. Moreover, the piezoelectric sensor 141c is disposed on the silicon active layer of the second piezoelectric drive circuit 131c, and the piezoelectric sensor 141d is disposed on the silicon active layer of the second piezoelectric drive circuit 131d. Further, the piezoelectric sensor 141e is disposed on the silicon active layer of the second piezoelectric drive circuit 131e, and the piezoelectric sensor 141f is disposed on the silicon active layer of the second piezoelectric drive circuit 131f.

In a similar manner to the above, the piezoelectric sensor 142a is disposed on the silicon active layer of the second piezoelectric drive circuit 132a, and the piezoelectric sensor 142b is disposed on the silicon active layer of the second piezoelectric drive circuit 132b. Moreover, the piezoelectric sensor 142c is disposed on the silicon active layer of the second piezoelectric drive circuit 132c, and the piezoelectric sensor 142d is disposed on the silicon active layer of the second piezoelectric drive circuit 132d. Further, the piezoelectric sensor 142e is disposed on the silicon active layer of the second piezoelectric drive circuit 132e, and the piezoelectric sensor 142f is disposed on the silicon active layer of the second piezoelectric drive circuit 132f.

As illustrated in FIG. 35, in a similar manner to the second driving unit 130a, the detection unit 140a include the silicon active layer 163, the lower electrode 201, a piezoelectric circuit 202, and an upper electrode 203. The lower electrode 201, the piezoelectric circuit 202, and the upper electrode 203 are formed in this order on the +Z surface of the silicon active layer 163 that serves as an elastic member. For example, each of the upper electrode 203 and the lower electrode 201 is made of gold (Au) or platinum (Pt). For example, the piezoelectric circuit 202 is made of lead zirconate titanate (PZT), which is a piezoelectric material.

The length of the detection unit 140a in the Y-direction is formed approximately equal to that of the second piezoelectric drive circuits 131a to 131f, and the width of the detection unit 140a in the X-direction is formed narrower than in the Y-direction is formed approximately equal to that of the second piezoelectric drive circuits 131a to 131f. Each one of the piezoelectric sensors 141a to 141f of the detection unit 140a is disposed on the +Z surface of the silicon active layer included in each of the second piezoelectric drive circuits 131a to 131f, with sufficient space, so as not to contact each of the second piezoelectric drive circuits 131a to 131f of the second driving unit 130a. The detection unit 140b has a configuration and structure similar to that of the detection unit 140a.

The second driving units 130a and 130b are moved as the piezoelectric drive circuit groups A and B are elastically deformed in response application of driving voltage. On the other hand, the detection units 140a and 140b can detect the voltage that is generated by the piezoelectric circuit 202 in response to the deformation of the silicon active layer 163 driven by the second driving units 130a and 130b, as a detection signal that indicates the deflection angle of the reflector 101, and can output the detection signal to the controller 11b.

Figure 36:
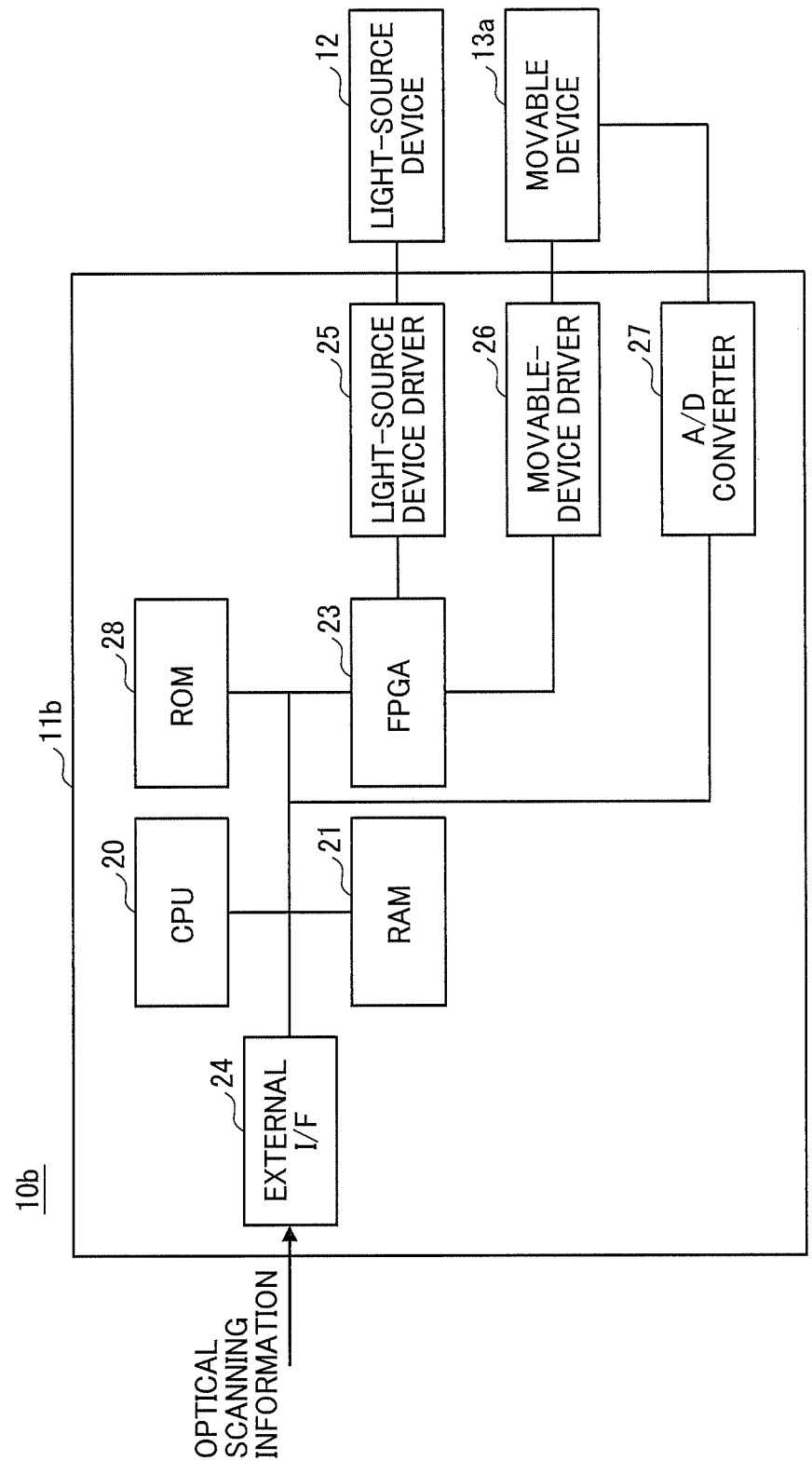
FIG. 36 is a diagram illustrating a hardware configuration of a controller, according to a second embodiment of the present disclosure.

FIG. 36 is a diagram illustrating a hardware configuration of the controller 11b provided for the light deflector 10b, according to the second embodiment.

As illustrated in FIG. 36, the controller 11b includes an analog-to-digital (A/D) converter 27.

The A/D converter 27 is an electric circuit used to receive and amplify an analog voltage signal generated by the piezoelectric circuit 202 and then output a digital voltage signal obtained by converting the amplified analog voltage signal.

Figure 37:
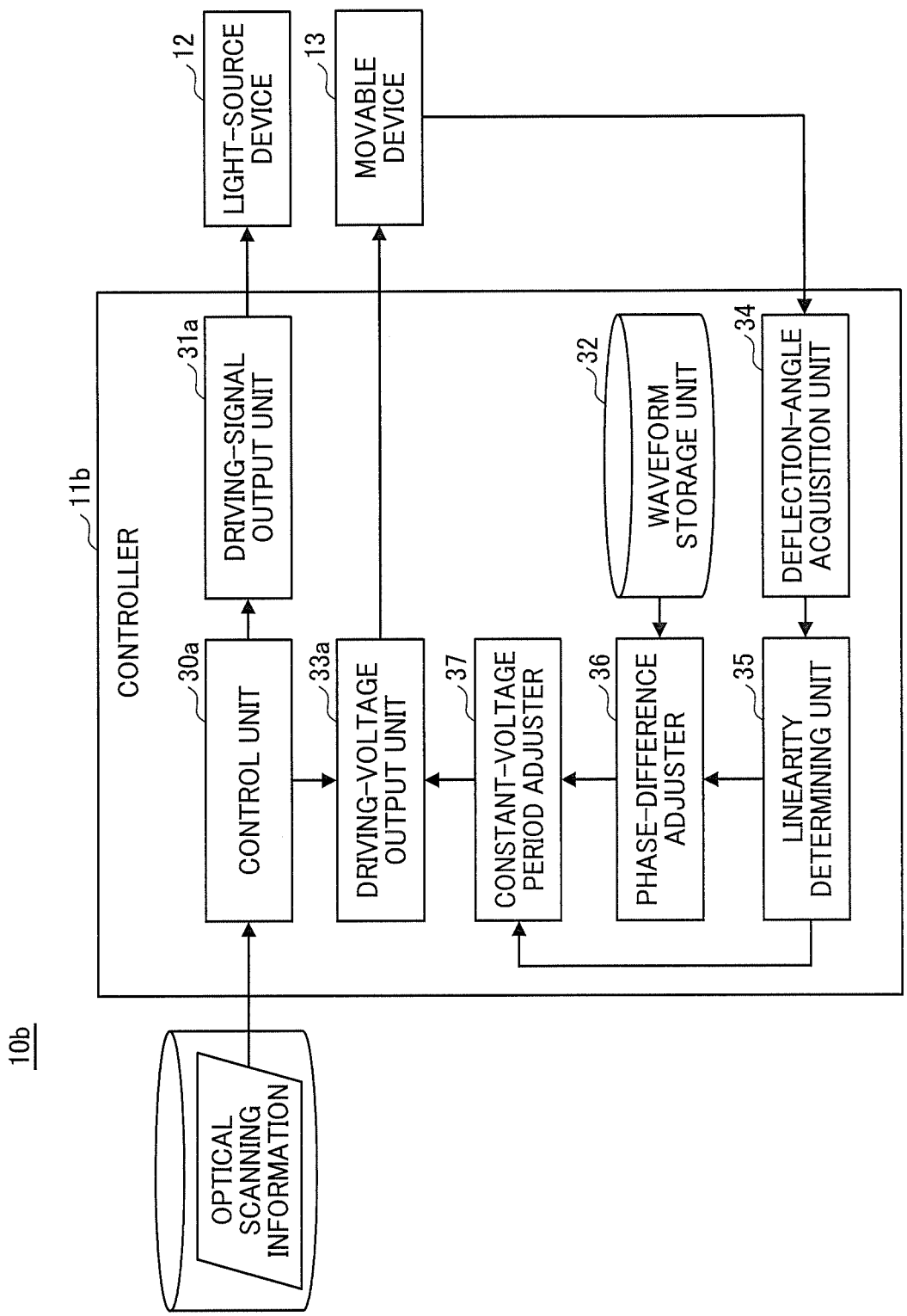
FIG. 37 is a diagram illustrating a functional configuration of a controller, according to the second embodiment of the present disclosure.

FIG. 37 is a block diagram illustrating the functional configuration of the controller 11b, according to the second embodiment.

As illustrated in FIG. 37, the controller 11b includes a driving-voltage output unit 33a, a deflection-angle acquisition unit 34, a linearity determining unit 35, a phase-difference adjuster 36, and a constant-voltage period adjuster 37. The deflection-angle acquisition unit 34 is implemented by, for example, the A/D converter 27. Each of the driving-voltage output unit 33a, the linearity determining unit 35, the phase-difference adjuster 36, and the constant-voltage period adjuster 37 is implemented as the CPU 20 as illustrated in FIG. 36 executes a predetermined program.

The driving-voltage output unit 33a receives the waveform 20A and the waveform 20B' from the constant-voltage period adjuster 37. Then, the driving-voltage output unit 33a in response to the control signal output from the control unit 30a outputs the driving voltage A and the driving voltage B to each one of the first piezoelectric drive circuits 112a and 112b and the second piezoelectric drive circuits 131a to 131f and 132a to 132f, which are provided for the movable device 13b.

The deflection-angle acquisition unit 34 converts the analog voltage signal generated at the detection units 140a and 140b of the movable device 13b into a digital signal to obtain the detection data of the deflection angle of the reflector 101. Then, the deflection-angle acquisition unit 34 outputs the obtained detection data of the deflection angle to the linearity determining unit 35.

The linearity determining unit 35 determines whether or not to adjust the phase difference between the waveform 20A and the waveform 20B', and determines whether or not the second constant-voltage period tB4' in the waveform 20B' is to be adjusted. Then, the linearity determining unit 35 outputs the result of determination to each one of the phase-difference adjuster 36 and the constant-voltage period adjuster 37.

More specifically, the linearity determining unit 35 approximates the detection data of the deflection angle during the step-up period tA1 in a straight line to calculate and obtain a regression line, and determines that the phase difference is to be adjusted when the difference between the regression line and the detection data of the deflection angle is equal to or greater than a predetermined threshold. Moreover, the linearity determining unit 35 approximates the detection data of the deflection angle during the step-down period tA3 in a straight line to calculate and obtain a regression line, and determines that the second constant-voltage period tB4' in the waveform 20B' is to be adjusted when the difference between the regression line and the detection data of the deflection angle is equal to or greater than a predetermined threshold.

The phase-difference adjuster 36 reads the waveform 20A and the waveform 20B' stored in the waveform storage unit 32, and receives from the linearity determining unit 35 the result of determination as to whether the phase difference is to be adjusted.

When it is determined that the phase difference is to be adjusted, the phase-difference adjuster 36 adjusts the phase difference between the waveform 20A and the waveform 20B', and outputs the waveform 20A and the waveform 20B' that have been adjusted to the constant-voltage period adjuster 37. On the other hand, when it is determined that phase difference is not to be adjusted, the phase-difference adjuster 36 outputs the waveform 20A and the waveform 20B' to the constant-voltage period adjuster 37 without adjusting the phase difference between the waveform 20A and the waveform 20B'.

The constant-voltage period adjuster 37 receives the waveform 20A and the waveform 20B' from the phase-difference adjuster 36, and receives from the linearity determining unit 35 the result of determination as to whether the constant-voltage period is to be adjusted.

When it is determined that the second constant-voltage period tB4' is to be adjusted, the constant-voltage period adjuster 37 adjusts the timing at which the step-up in the waveform 20B' starts to adjust the second constant-voltage period tB4', and outputs the waveform 20A and the waveform 20B' that have been adjusted to the driving-voltage output unit 33a. On the other hand, when it is determined that the second constant-voltage period tB4' is not to be adjusted, the constant-voltage period adjuster 37 outputs the waveform 20A and the waveform 20B' to the driving-voltage output unit 33a without adjusting the second constant-voltage period tB4'.

The driving-voltage output unit 33a receives the waveform 20A and the waveform 20B' from the constant-voltage period adjuster 37, and outputs, in response to the control signal output from the control unit 30a, the driving voltage A and the driving voltage B to each one of the first piezoelectric drive circuits 112a and 112b and the second piezoelectric drive circuits 131a to 131f and 132a to 132f, which are provided for the movable device 13b.

In the second embodiment of the present disclosure, the phase-difference adjuster 36 adjusts the phase difference as a predetermined amount of the phase of the waveform 20B' that is not-yet adjusted is shifted and made different from each other in the normal direction or the inverse direction. Subsequently, the linearity determining unit 35 determines whether or not the difference between the regression line and the detection data of the deflection angle during the step-up period tA1 after the phase difference has been adjusted is equal to or greater than a threshold. Then, when the above difference is equal to or greater than the threshold and it is determined that the phase difference is to be adjusted, the phase-difference adjuster 36 adjusts again the phase difference between the waveform 20A and the waveform 20B'. The phase difference is adjusted until the difference between the regression line and the detection data of the deflection angle during the step-up period tA1 becomes smaller than a threshold.

The second constant-voltage period tB4' is adjusted by the constant-voltage period adjuster 37 as the timing at which the step-up of the driving voltage B starts in the waveform 20B' that is not-yet adjusted is shifted and made different from each other in the normal direction or the inverse direction by a predetermined amount. Subsequently, the linearity determining unit 35 determines whether or not the difference between the regression line and the detection data of the deflection angle during the step-down period tA3 after the second constant-voltage period tB4' has been adjusted is equal to or greater than a threshold. Then, when the above difference is equal to or greater than the threshold and it is determined that the second constant-voltage period tB4' is to be adjusted, the constant-voltage period adjuster 37 adjusts the timing at which the step-up in the waveform 20B' starts again to adjust the second constant-voltage period tB4'. The second constant-voltage period tB4' is adjusted until the difference between the regression line and the detection data of the deflection angle during the step-down period tA3 becomes smaller than a threshold.

The processes that are performed by the controller 11b according to the second embodiment are described below.

Figure 38:
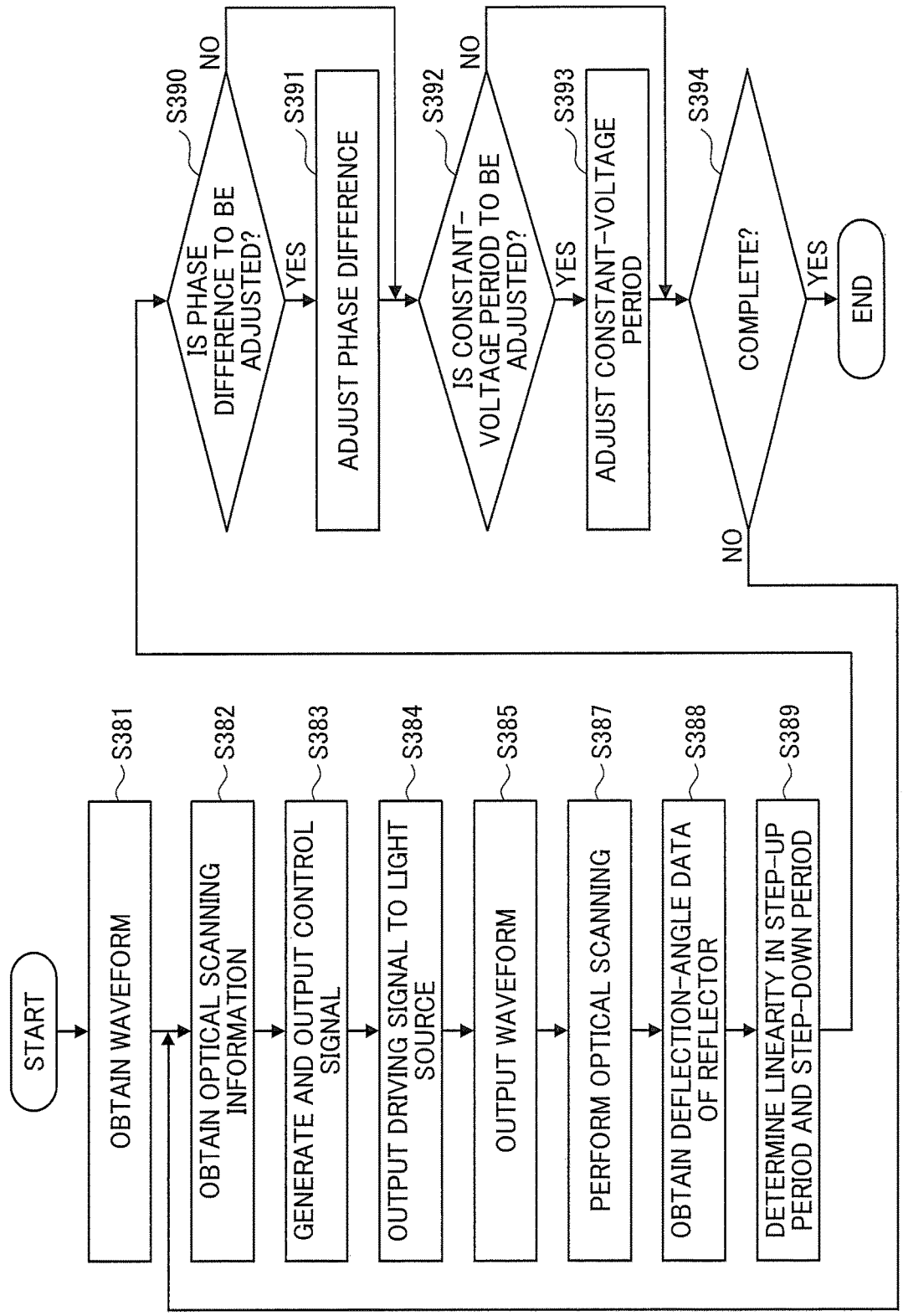
FIG. 38 is a flowchart of the processes that are performed by a controller, according to the second embodiment of the present disclosure.

FIG. 38 is a flowchart of the processes that are performed by the controller 11b, according to the second embodiment.

Firstly, in a step S381, the phase-difference adjuster 36 reads the waveform 20A and the waveform 20B' stored in the waveform storage unit 32.

Subsequently, in a step S382, the control unit 30a obtains optical scanning information from, for example, an external device.

Subsequently, in a step S383, the control unit 30a generate a control signal based on the obtained optical scanning information. Then, the control unit 30a outputs the control signal for the light-source device 12 to the driving-signal output unit 31a, and outputs the control signal for the movable device 13b to the driving-voltage output unit 33.

Subsequently, in a step S384, the driving-signal output unit 31a outputs a driving signal to the light-source device 12 based on the received control signal.

Subsequently, in a step S385, the driving-voltage output unit 33 outputs driving voltage A and driving voltage B to the movable device 13b based on the received control signal.

Subsequently, in a step S387, the light-source device 12 emits light based on the received driving signal. Moreover, the movable device 13b drives the reflector 101 based on the received driving voltage. The driving of the light source 12 and the movable device 13b causes light to be deflected in a given direction, and optical scanning is performed.

Subsequently, in a step S388, the deflection-angle acquisition unit 34 converts the analog voltage signal generated at the detection units 140a and 140b of the movable device 13b into a digital signal to obtain the detection data of the deflection angle of the reflector 101. Then, the deflection-angle acquisition unit 34 outputs the obtained detection data of the deflection angle to the linearity determining unit 35.

Subsequently, in a step S389, the linearity determining unit 35 determines whether or not to adjust the phase difference between the waveform 20A and the waveform 20B', and outputs the result of determination to the phase-difference adjuster 36. Moreover, the linearity determining unit 35 determines whether or not the second constant-voltage period tB4' in the waveform 20B' is to be adjusted, and outputs the result of determination to the constant-voltage period adjuster 37.

Subsequently, in a step S390, the phase-difference adjuster 36 determines whether or not the phase difference is to be adjusted, based on the result of determination received from the linearity determining unit 35.

When it is determined in the Step S390 that the phase difference is to be adjusted ("YES" in the step S390), the process shifts to the processes in a step S391, and the phase-difference adjuster 36 adjusts the phase difference between the waveform 20A and the waveform 20B' and outputs the waveform 20A and the waveform 20B', which have been adjusted, to the constant-voltage period adjuster 37. On the other hand, when it is determined in the Step S390 that the phase difference is not to be adjusted ("NO" in the step S390), the phase-difference adjuster 36 outputs the waveform 20A and the waveform 20B' to the constant-voltage period adjuster 37 without adjusting the phase difference between the waveform 20A and the waveform 20B'. Then, the process shifts to in a step S392.

Subsequently, in a step S392, the constant-voltage period adjuster 37 determines whether or not the second constant-voltage period tB4' is to be adjusted, based on the result of determination received from the linearity determining unit 35.

When it is determined in the Step S392 that the second constant-voltage period tB4' is to be adjusted ("YES" in the Step S392), the process shifts to a step S394, and the constant-voltage period adjuster 37 adjusts the second constant-voltage period tB4' and outputs the waveform 20A and the waveform 20B', which have been adjusted, to the driving-voltage output unit 33a. On the other hand, when it is determined in the Step S392 that the second constant-voltage period tB4' is not to be adjusted ("NO" in the Step S392), the constant-voltage period adjuster 37 outputs the waveform 20A and the waveform 20B' to the driving-voltage output unit 33a without adjusting the second constant-voltage period tB4'. Then, the process shifts to in a step S394.

Subsequently, in the step S394, the control unit 30a determines whether or not the optically scanning is be complete.

When it is determined in the step S394 that the optical scanning is complete ("YES" in the step S394), the controller 11b terminates the processes. On the other hand, when it is determined that the optical scanning is not complete ("NO" in the step S394), the process returns to the step S382, and the controller 11b repeats the processes in the S382 and the following steps.

The controller 11b can implement the optical scanning processes as described above.

As described above, in the light deflector 10b according to the present embodiment, the deflection angle of the reflector 101 is detected by the detection units 140a and 140b provided for the movable device 13b. Then, the phase difference between the waveform 20A and the waveform 20B' and the second constant-voltage period tB4' of the waveform 20B' are adjusted based on the results of detection such that the harmonic components of the moving speed during each of the step-up period tA1 and the step-down period tA3 will be canceled.

The phase difference and the second constant-voltage period tB4' is adjusted based on the data about the deflection angle of the reflector 101, which is detected while the movable device 13b is moving. Due to this configuration, even if the deflection angle of the reflector 101 changes over time, the phase difference and the second constant-voltage period tB4' can be adjusted in response to the deflection angle of the reflector 101 that has been changed over time. As a result, the harmonic components of the moving speed can be canceled regardless of the changes over time in the deflection angle of the reflector 101.

In the second embodiment of the present disclosure as described above, the second constant-voltage period tB4' is adjusted as a target constant-voltage period. However, no limitation is indicated thereby, and the first constant-voltage period tB2', the first constant-voltage period tA2, or the second constant-voltage period tA4 may be adjusted.

Modifications and the other effects of the second embodiment of the present disclosure are equivalent to those as described above in the first embodiment of the present disclosure.

In the embodiments as described above, the movable device 13 (see FIG. 16) and the movable device 13b (see FIG. 34) of a cantilever-supported type, by which light can be deflected biaxially, are described. However, the configuration or structure of the movable device is not limited thereby, and various kinds of modifications may be made. Some modifications of the above embodiments are described below.

First Modification

Figure 39:
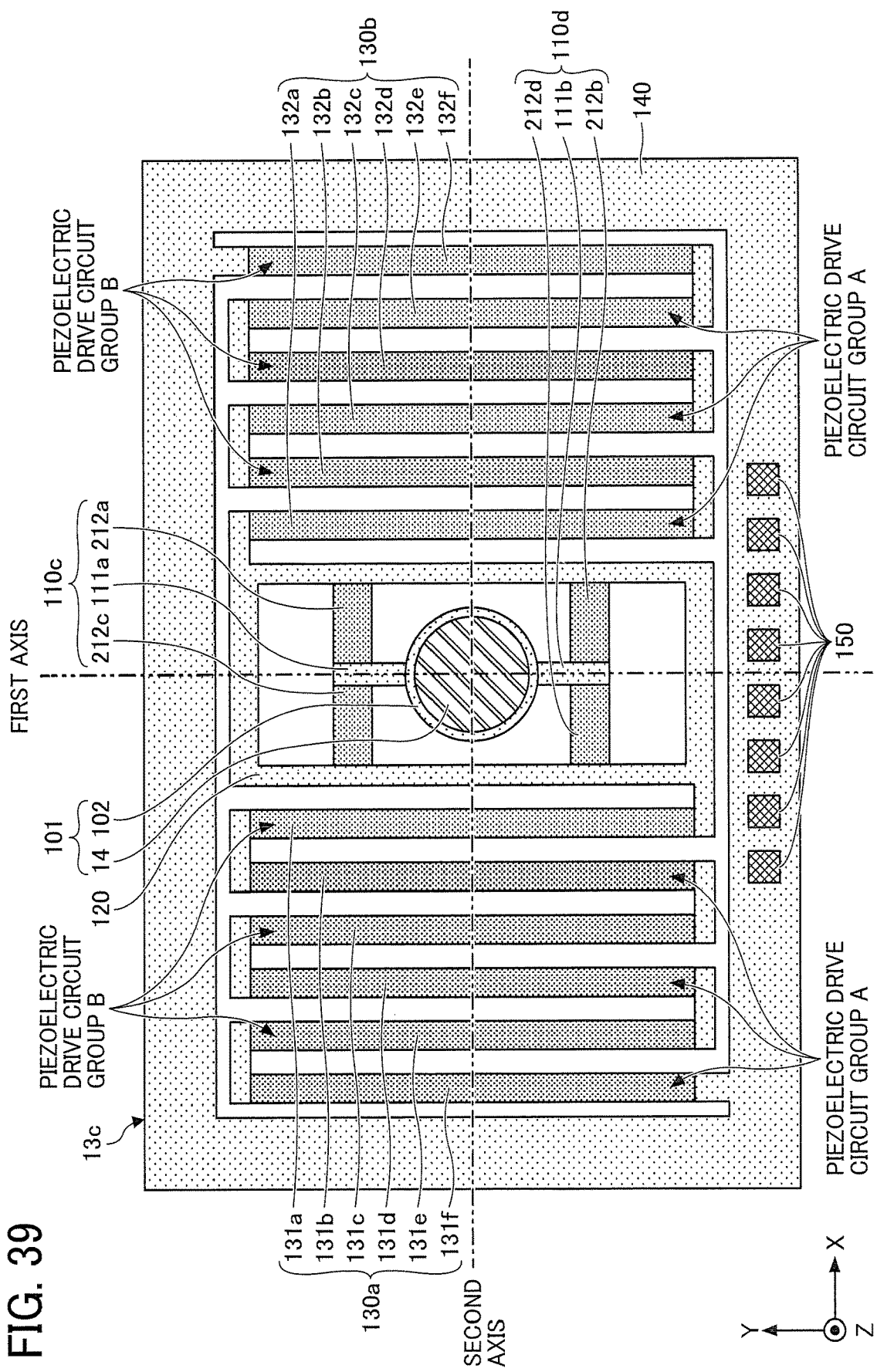
FIG. 39 is a plan view of a movable device according to a first modification of the above embodiments.

FIG. 39 is a diagram illustrating a configuration of a movable device 13c according to a first modification of the above embodiments.

The movable device 13b is a movable device of a both-side-supported type (both-end supported beam), by which light can be deflected biaxially.

As illustrated in FIG. 39, the movable device 13c includes first driving units 110c and 110d. As illustrated in FIG. 39, the first driving unit 110c includes a torsion bars 111a and first piezoelectric drive circuits 212a and 212c. An end of the torsion bar 111a is coupled to the reflector base 102, and the torsion bar 111a extends in the Y-directional (first axis direction) to support the reflector 101 in a movable manner. An end of each of the first piezoelectric drive circuits 212a and 212c is coupled to the torsion bar 111a, and the other end thereof is connected to an internal circumferential portion of the first supporting unit 120. As illustrated in FIG. 39, the first driving unit 110d includes a torsion bars 111b and first piezoelectric drive circuits 212b and 212b. An end of the torsion bar 111b is coupled to the reflector base 102, and the torsion bar 111b extends in the Y-directional to support the reflector 101 in a movable manner. An end of each of the first piezoelectric drive circuits 212b and 212d is coupled to the torsion bar 111b, and the other end thereof is connected to an internal circumferential portion of the first supporting unit 120. The operation of the reflector 101 that is driven by the first driving units 110c and 110d is equivalent to that of the movable device 13.

The embodiments of the present disclosure may be applied to the movable device 13c of such a both-side-supported type, by which light can be deflected biaxially.

Second Modification

Figure 40:
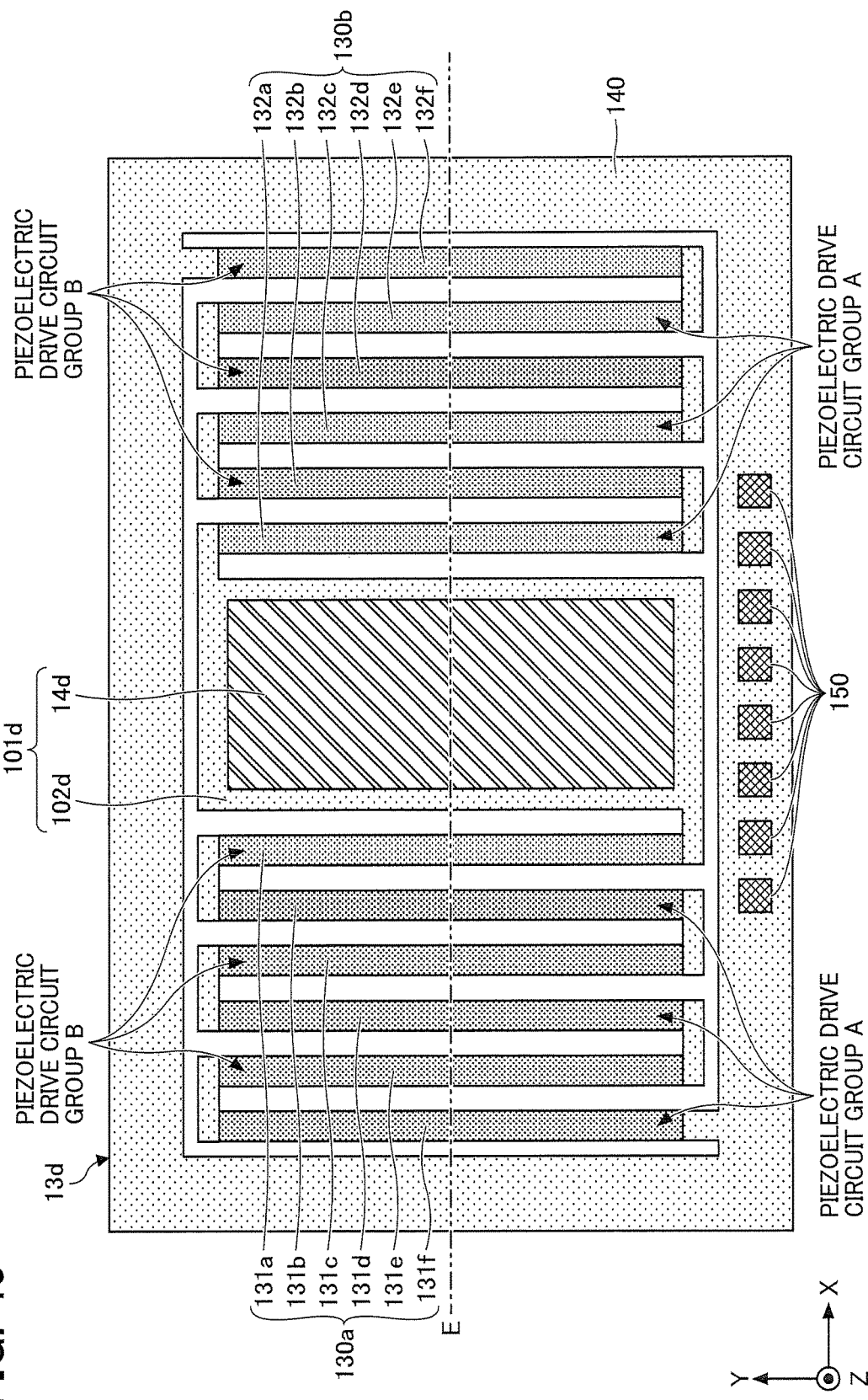
FIG. 40 is a plan view of a movable device according to a second modification of the above embodiments.

FIG. 40 is a diagram illustrating a configuration of a movable device 13d according to a second modification of the above embodiments.

The movable device 13d is a movable device of a both-side-supported type, by which light can be deflected uniaxially.

As illustrated in FIG. 40, the movable device 13d includes a reflector 101d consisting of a reflection plane 14d that reflects incident light and a reflector base 102d on which the reflection plane 14d is formed. The reflector 101d is coupled to second driving units 130a and 130b, and is driven around an axis parallel to the X-axis.

The embodiments of the present disclosure may be applied to the movable device 13d of such a both-side-supported type, by which light can be deflected uniaxially.

Note that numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A light deflector comprising:
a reflector having a reflection plane;
a pair of movable parts that support the reflector;
a supporting unit configured to support the pair of movable parts;
a piezoelectric drive circuit provided for the pair of movable parts, the piezoelectric drive circuit being configured to drive the reflector in response to waveform of driving voltage; and
circuitry configured to output two different driving voltages to the piezoelectric drive circuit,
wherein each one of the two different driving voltages has waveform, and the waveform of each one of the two different driving voltages includes, in one cycle,
a step-up period where voltage increases,
a step-down period where voltage decreases,
a first constant-voltage period where voltage is constant after the step-up period and before the step-down period, and
a second constant-voltage period where voltage is constant before the step-up period and after the step-down period, and
wherein, in at least one of the waveform of the two different driving voltages, a ratio of the first constant-voltage period in the one cycle is different from a ratio of the second constant-voltage period in the one cycle.

2. The light deflector according to claim 1, wherein a sum of the first constant-voltage period and the second constant-voltage period in the one cycle is equal to or smaller than 10% of the one cycle.

3. The light deflector according to claim 1, wherein a change in voltage over time during each of the step-up period and the step-down period is constant.

4. The light deflector according to claim 1, wherein a difference between a ratio of the first constant-voltage period in the one cycle and a ratio of the second constant-voltage period in the one cycle is equal to or less than 5%.

5. An image projection apparatus comprising a light deflector including:
a reflector having a reflection plane;
a pair of movable parts that support the reflector;
a supporting unit configured to support the pair of movable parts;
a piezoelectric drive circuit provided for the pair of movable parts, the piezoelectric drive circuit being configured to drive the reflector in response to waveform of driving voltage; and
circuitry configured to output two different driving voltages to the piezoelectric drive circuit,
wherein each one of the two different driving voltages has waveform, and the waveform of each one of the two different driving voltages includes, in one cycle,
a step-up period where voltage increases,
a step-down period where voltage decreases,
a first constant-voltage period where voltage is constant after the step-up period and before the step-down period, and
a second constant-voltage period where voltage is constant before the step-up period and after the step-down period, and
wherein, in at least one of the waveform of the two different driving voltages, a ratio of the first constant-voltage period in the one cycle is different from a ratio of the second constant-voltage period in the one cycle.

6. A vehicle comprising the image projector according to claim 5.

7. A method of adjusting a light deflector in which waveform of each one of two different driving voltages includes, in one cycle,
- a step-up period where voltage increases,
- a step-down period where voltage decreases,
- a first constant-voltage period where voltage is constant after the step-up period and before the step-down period, and
- a second constant-voltage period where voltage is constant before the step-up period and after the step-down period,
- the method comprising, in at least one of the waveform of the two different driving voltages, making a ratio of the first constant-voltage period in the one cycle different from a ratio of the second constant-voltage period in the one cycle.

\* \* \* \* \*